(12) United States Patent
Iiyama et al.

(10) Patent No.: US 8,179,611 B2
(45) Date of Patent: May 15, 2012

(54) ZOOM LENS SYSTEM, IMAGING DEVICE AND CAMERA

(75) Inventors: Tomoko Iiyama, Osaka (JP); Kyoichi Miyazaki, Osaka (JP); Kazuhiko Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 262 days.

(21) Appl. No.: 12/581,561

(22) Filed: Oct. 19, 2009

(65) Prior Publication Data

US 2010/0128362 A1 May 27, 2010

Related U.S. Application Data

(62) Division of application No. 12/022,791, filed on Jan. 30, 2008, now Pat. No. 7,817,350.

(30) Foreign Application Priority Data

| Jan. 30, 2007 | (JP) | 2007-019924 |
| Jan. 30, 2007 | (JP) | 2007-019925 |
| Jan. 30, 2007 | (JP) | 2007-019926 |

(51) Int. Cl.
*G02B 15/14* (2006.01)
(52) U.S. Cl. ........................ 359/689; 359/676
(58) Field of Classification Search ............... 359/676, 359/686, 689, 680–682
See application file for complete search history.

(56) References Cited

U.S. PATENT DOCUMENTS 4,838,666 A 6/1989 Shiraishi
(Continued)

FOREIGN PATENT DOCUMENTS

JP 2002-372667 12/2002
(Continued)

OTHER PUBLICATIONS

United States Notice of Allowance issued in U.S. Appl. No. 12/022,791 dated Jul. 19, 2010.
(Continued)

*Primary Examiner* — James Greece
(74) *Attorney, Agent, or Firm* — McDermott Will & Emery LLP

(57) ABSTRACT

An object of the present invention is to provide: a zoom lens system that has a high resolution, high capability of compensating curvature of field, a high zoom ratio of, for example, 3 or greater, a reduced weight, and a reduced overall optical length at the time of non-use; and an imaging device and a camera that employ this zoom lens system so as to have a reduced thickness and excellent portability as well as high performance. The zoom lens system forms an optical image of an object with variable magnification and, in order from the object side to the image side, comprises: a first lens unit having negative optical power; a second lens unit that has positive optical power and that contains a bi-convex lens element composed of a resin material and serving as the most image side lens element; and a third lens unit having positive optical power. Then, the lens units move respectively along the optical axis in such a manner that intervals between the individual lens units should vary so that the variable magnification is achieved. Further, the condition $|(R_{2mi1}+R_{2mi2})/(R_{2mi1}-R_{2mi2})| \leq 1.0$ ($R_{2mi1}$ is a radius of curvature on the object side of the most image side lens element of the second lens unit, while $R_{2mi2}$ is a radius of curvature on the image side of the most image side lens element of the second lens unit) is satisfied. The imaging device and the camera employ this zoom lens system.

8 Claims, 25 Drawing Sheets

U.S. PATENT DOCUMENTS

| | | | |
|---|---|---|---|
| 5,455,714 A | 10/1995 | Kohno | |
| 5,684,639 A * | 11/1997 | Ohtake | 359/693 |
| 5,946,144 A | 8/1999 | Yamamoto | |
| 6,081,389 A | 6/2000 | Takayama et al. | |
| 6,392,815 B2 | 5/2002 | Toyama | |
| 6,853,498 B2 * | 2/2005 | Kim et al. | 359/689 |
| 6,909,846 B2 | 6/2005 | Suzuki | |
| 7,075,734 B2 | 7/2006 | Suzuki | |
| 7,133,215 B2 | 11/2006 | Otake | |
| 7,471,459 B2 | 12/2008 | Hankawa et al. | |
| 2004/0004772 A1 | 1/2004 | Ohashi et al. | |
| 2004/0136087 A1 | 7/2004 | Hirakawa | |
| 2004/0156121 A1 | 8/2004 | Ori et al. | |
| 2005/0030640 A1 | 2/2005 | Hirakawa | |
| 2005/0057816 A1 | 3/2005 | Sato | |
| 2005/0057817 A1 | 3/2005 | Ori | |
| 2005/0141101 A1 | 6/2005 | Itoh | |
| 2005/0185287 A1 | 8/2005 | Sekita | |
| 2005/0200972 A1 | 9/2005 | Nose et al. | |
| 2005/0259333 A1 | 11/2005 | Matsusaka | |
| 2005/0286138 A1 | 12/2005 | Matsusaka | |
| 2005/0286140 A1 | 12/2005 | Tomioka | |
| 2006/0023319 A1 | 2/2006 | Terada et al. | |
| 2006/0114574 A1 | 6/2006 | Sekita | |
| 2006/0152815 A1 | 7/2006 | Satori | |
| 2007/0217025 A1 | 9/2007 | Kurioka | |

FOREIGN PATENT DOCUMENTS

| | | |
|---|---|---|
| JP | 2004-144947 | 5/2004 |
| JP | 2005-084597 | 3/2005 |
| JP | 2005-084649 A | 3/2005 |
| JP | 2005-134746 | 5/2005 |
| JP | 2005-258059 A | 9/2005 |
| JP | 2005-331860 | 12/2005 |
| JP | 2006-010895 | 1/2006 |
| JP | 2006-011096 | 1/2006 |
| JP | 2006-023679 | 1/2006 |
| JP | 2006-039180 | 2/2006 |
| JP | 2006-084829 A | 3/2006 |
| JP | 2006-139164 A | 6/2006 |
| JP | 2006-194974 | 7/2006 |

OTHER PUBLICATIONS

United States Office Action issued in U.S. Appl. No. 12/022,791 dated Jan. 7, 2010.

United States Office Action issued in U.S. Appl. No. 11/712,483, mailed Mar. 10, 2009.

United States Office Action issued in U.S. Appl. No. 12/581,543 dated May 13, 2011.

Partial English translation of Japanese Office Action, issued in Japanese Patent Application No. 2007.019926, dated Dec. 27, 2011.

Partial English translation of Japanese Office Action, issued in Japanese Patent Application No. 2007-019925, dated Dec. 27, 2011.

Partial English translation of Japanese Office Action, issued in Japanese Patent Application No. 2007-019924, dated Dec. 27, 2011.

* cited by examiner

ZOOM LENS SYSTEM, IMAGING DEVICE AND CAMERA

RELATED APPLICATIONS

This application is a Divisional of U.S. patent application Ser. No. 12/022,791, filed on Jan. 30, 2008, now U.S. Pat. No. 7,817,350 claiming priority of Japanese Patent Application Nos. 2007-019924, 2007-019925, and 2007-019926, filed on Jan. 30, 2007, the entire contents of each of which are hereby incorporated by reference.

BACKGROUND OF THE INVENTION

1. Field of the Invention

The present invention relates to a zoom lens system, an imaging device and a camera. In particular, the present invention relates to a zoom lens system that has a high resolution, high capability of compensating curvature of field, a high zoom ratio of, for example, 3 or greater, a reduced weight, and a reduced overall optical length at the time of non-use; and an imaging device and a camera that employ the zoom lens system so as to have a reduced thickness and excellent portability as well as high performance.

2. Description of the Background Art

In the prior art, a large number of optical instruments have been developed that form an image of a photographic object onto an image sensor through a lens and then acquire the object image as an image. Recently, products such as digital still cameras and digital video cameras are spreading. Then, with the increase in the number of users, desire on these products is also growing. Among various types of these products, optical instruments having a zoom ratio of approximately 3 are relatively small and still have an optical zoom function. Thus, these types are spreading remarkably widely as digital cameras of compact type or stylish type.

In the digital cameras of compact type, for the purpose of the property of easy carrying, further size reduction of the instruments is desired. In order to achieve the further size reduction of the digital cameras, the lens arrangement need be adopted such that the overall optical length (the distance measured from the top of the most object side lens surface of the entire lens system to the image surface) at the time of non-use should be reduced while lens elements that extend out relative to the main body by means of a multi-stage lens barrel at the time of use could be accommodated into the main body. Further, in the digital cameras to spread widely, cost reduction is also desired.

Meanwhile, as zoom lens systems suitable for digital still cameras of compact type, a large number of zoom lens systems of three-unit construction have been proposed that, for example, in order from the object side to the image side, comprise a first lens unit having negative optical power, a second lens unit having positive optical power, and a third lens unit having positive optical power.

In such a zoom lens system of three-unit construction, in zooming (magnification change) from a wide-angle limit to a telephoto limit, the air space between the first lens unit and the second lens unit decreases monotonically, while the air space between the second lens unit and the third lens unit varies, and while the third lens unit is fixed or moved.

Focus adjustment in the zoom lens system of three-unit construction is performed by moving the first lens unit or the third lens unit in the optical axis direction. In particular, from the perspective of size reduction of the entire optical instrument, in many cases, the focus adjustment is performed using the third lens unit which is less heavy, so that focusing onto the photographic object is achieved ranging from the infinity to a short distance. In contrast, when the focus adjustment is performed using the first lens unit, the first lens unit is larger than the third lens unit and hence requires a large size motor. This causes a tendency of size increase in the entire optical instrument.

The third lens unit having positive optical power has the effects of compensating curvature of field and bringing into a telecentric state the incident light onto the imaging surface. Further, in many cases, the third lens unit is composed of one or two lens elements having a small outer diameter, and hence can be driven at a high speed using a small size motor. Thus, when the third lens unit is adopted as a lens unit for focus adjustment, an optical instrument is realized that has a reduced size and permits rapid focusing.

The first lens unit and the second lens unit move in parallel to the optical axis along a cam groove formed in a cylindrical cam. In the cam groove, a groove for zooming and a groove for the time of non-use are connected to each other. The groove for the time of non-use reduces the interval between the lens units and moves all the three lens units to the image sensor side. This configuration reduces the overall optical length at the time of non-use. In this case, if the thickness of each lens unit could be reduced, the overall optical length at the time of non-use would be reduced further.

As such, in the prior art, design has been performed such that the zoom lens system should have the above-mentioned configuration where the size is reduced in the part relevant to focus adjustment and in the entire lens system at the time of non-use, so that the overall optical length of the digital still camera has been reduced and so has been the cost.

For example, Japanese Laid-Open Patent Publication No. 2006-10895 discloses a three-unit zoom lens, in order from the object side to the image side, comprising: a first lens unit having negative optical power which is composed of a negative power lens and a positive power lens; a second lens unit having positive optical power which is composed of a cemented lens consisting of a convex lens and a concave lens and a single lens; and a third lens unit having positive optical power. In this three-unit zoom lens, an aspheric surface is employed in the first lens unit and in the second lens unit, while a synthetic resin lens is employed as the single lens of the second lens unit and in the third lens unit. By virtue of this, in a state that aberration is compensated satisfactorily, the individual lens thicknesses are reduced so that size reduction and cost reduction are achieved in the optical system.

Further, for example, in a zoom lens disclosed in Japanese Laid-Open Patent Publication No. 2004-144947, two positive lenses are provided on the image side relative to the second unit so that the optical power per lens is reduced. Then, these lenses having relatively low optical power are composed of plastic lenses. In general, in plastic lenses, the image surface position and the like easily fluctuate owing to environmental variation. However, in the zoom lens disclosed in Japanese Laid-Open Patent Publication No. 2004-144947 where such plastic lenses having relatively low optical power are employed, influence of environmental variation is rather small, and hence view angle enhancement in the shooting view angle and weight reduction in the lens system are achieved simultaneously.

Further, for example, in a zoom lens disclosed in Japanese Laid-Open Patent Publication No. 2002-372667, an aspheric surface is employed in the most image side lens of the second lens unit, so that astigmatism is compensated. Further, within the second lens unit, at least a lens arrangement of positive, positive and negative in order from the object side is included. Further, an aspheric plastic lens is arranged on the most image side. By virtue of this, spherical aberration and coma aberration are compensated, while the Petzval sum is reduced so that curvature of field is reduced. As such, in the zoom lens disclosed in Japanese Laid-Open Patent Publication No. 2002-372667, aberration generated in the second lens unit is reduced so that aberration fluctuation during zooming is reduced. Further, the optical power in one lens unit is divided so that the optical power per lens is reduced. This reduces spherical aberration and coma aberration generated in the positive lenses. Moreover, since a plastic lens is employed, injection molding is adopted and permits easy aspheric surface formation, manufacturing error reduction, and weight reduction in the entire lens.

Further, for example, in a variable magnification optical system disclosed in Japanese Laid-Open Patent Publication No. 2006-11096, at least one aspheric surface is employed in the first lens unit so as to compensate astigmatism and distortion generated when the negative optical power of the first lens unit is increased. This permits size reduction. Further, in the first lens unit, a lower limit is placed on the absolute value of the refractive index difference of the lenses, so that the Petzval sum is reduced. Then, astigmatism and curvature of field are compensated.

In the configuration of the variable magnification optical system disclosed in Japanese Laid-Open Patent Publication No. 2006-11096, a negative lead is adopted in the first lens unit on the most object side such that that the light beam incident at a large angle from the object side to the lens surface should be refracted greatly, so that size reduction is achieved. Further, a lower limit is placed on the maximum value of refractive index in the lenses within the first lens unit. This reduces the radii of curvature of the lenses, and hence suppresses an increase in the generated aberration. Moreover, a limit is placed on the optical power of the second lens unit, so that an increase is suppressed in decentration error sensitivity and manufacturing difficulty generated in the second lens unit in a state that the variable magnification ratio and compactness are maintained satisfactorily.

Further, for example, in a zoom lens disclosed in Japanese Laid-Open Patent Publication No. 2006-194974, a two-lens construction is adopted in the first lens unit so that the size in the retracted state is reduced and hence overall thickness reduction is achieved. Further, various kinds of aberration generated in the first lens unit in association with the thickness reduction are suppressed by increasing the refractive indices of the individual lenses and increasing the curvatures of the lens surfaces. In particular, axial chromatic aberration and magnification chromatic aberration are suppressed by placing upper and lower limits on the refractive index difference between the second lens and the first lens in the first lens unit and on the Abbe number of the second lens.

Nevertheless, in the configuration of the three-unit zoom lens disclosed in Japanese Laid-Open Patent Publication No. 2006-10895, the image side positive power lens of the first lens unit has a low refractive index and still is a spherical lens. This causes a problem of insufficiency in the compensation of curvature of field.

Further, in the three-unit zoom lens disclosed in Japanese Laid-Open Patent Publication No. 2006-10895, when the focal length of the first lens unit is set up shorter for the purpose of size reduction, the diameter of the lens can be constructed relatively small. Nevertheless, when the first lens unit is constructed from two lenses, the optical power of the object side lens need be increased, and hence the thickness of the image side lens also need be increased for the purpose of compensation of chromatic aberration. This causes a problem of increase in the overall optical length at the time of non-use.

In the zoom lens of three-unit construction disclosed in Japanese Laid-Open Patent Publication No. 2004-144947, the optical power of the plastic lenses has a high ratio within the optical power of the entire second unit. Thus, when the optical power of the plastic lens is to be maintained low, the optical power of the entire second unit also becomes low. Thus, for the purpose of view angle enhancement, the amount of movement of the second unit during variable magnification need be increased. This causes difficulty in thickness reduction of the entire zoom lens.

In the zoom lens of three-unit construction disclosed in Japanese Laid-Open Patent Publication No. 2002-372667, since a plastic lens is employed, weight reduction and manufacturing error reduction are achieved to some extent. Nevertheless, these weight reduction and manufacturing error reduction are not satisfactorily achieved simultaneously to improvement in the optical performance and thickness reduction of the entire zoom lens.

In the variable magnification optical system of three-unit construction disclosed in Japanese Laid-Open Patent Publication No. 2006-11096, importance is imparted to the compactness. Thus, a problem of insufficient compensation of curvature of field is present. Further, the optical power of the second lens unit is low, and hence a zoom ratio of 3 or greater is difficult to be achieved.

In the zoom lens of three-unit construction disclosed in Japanese Laid-Open Patent Publication No. 2006-194974, compensation of magnification chromatic aberration is performed mainly by adjusting the refractive indices and the Abbe numbers of the lenses in the first lens unit as well as by adopting a cemented lens for the second lens unit. Nevertheless, compensation of various kinds of aberration is insufficient for the purpose of achieving a zoom ratio of 3 or greater. Further, view angle enhancement is also difficult to be achieved.

SUMMARY OF THE INVENTION

The present invention has been made in order to resolve the problems described in the background art. An object of the present invention is to provide: a zoom lens system that has a high resolution, high capability of compensating curvature of field, a high zoom ratio of for example 3 or greater, a reduced weight, and a reduced overall optical length at the time of non-use; and an imaging device and a camera that employ this zoom lens system so as to have a reduced thickness and excellent portability as well as high performance.

(I) The above-mentioned object is achieved by a zoom lens system, an imaging device and a camera described below. That is, the present invention relates to:

a zoom lens system that forms an optical image of an object with variable magnification and that, in order from the object side to the image side, comprises:

a first lens unit having negative optical power;

a second lens unit that has positive optical power and that contains a bi-convex lens element composed of a resin material and serving as the most image side lens element; and a third lens unit having positive optical power, wherein the lens units move respectively along an optical axis in such a manner that intervals between the individual lens units should vary so that the variable magnification is achieved, and the following condition (I-1) is satisfied:

$$|(R_{2mi1}+R_{2mi2})/(R_{2mi1}-R_{2mi2})|<1.0 \qquad \text{(I-1)}$$

where, $R_{2mi1}$ is a radius of curvature on the object side of the most image side lens element of the second lens unit, and $R_{2mi2}$ is a radius of curvature on the image side of the most image side lens element of the second lens unit;

an imaging device capable of converting an optical image of a photographic object into an electric image signal and then outputting the signal, comprising:

a zoom lens system that forms the optical image of the photographic object with variable magnification; and an image sensor that converts the optical image formed by the zoom lens system into the electric image signal, wherein in the zoom lens system, the system, in order from the object side which is the photographic object side to the image side, comprises:

a first lens unit having negative optical power;

a second lens unit that has positive optical power and that contains a bi-convex lens element composed of a resin material and serving as the most image side lens element; and a third lens unit having positive optical power, wherein the lens units move respectively along an optical axis in such a manner that intervals between the individual lens units should vary so that the variable magnification is achieved, and the following condition (I-1) is satisfied:

$$|(R_{2mi1}+R_{2mi2})/(R_{2mi1}-R_{2mi2})|<1.0 \qquad (I-1)$$

where, $R_{2mi1}$ is a radius of curvature on the object side of the most image side lens element of the second lens unit, and $R_{2mi2}$ is a radius of curvature on the image side of the most image side lens element of the second lens unit; and a camera capable of shooting a photographic object and then outputting its image as an electric image signal, comprising an imaging device including a zoom lens system that forms the optical image of the photographic object with variable magnification and an image sensor that converts the optical image of the photographic object formed by the zoom lens system into the electric image signal, wherein in the zoom lens system, the system, in order from the object side which is the photographic object side to the image side, comprises:

a first lens unit having negative optical power;

a second lens unit that has positive optical power and that contains a bi-convex lens element composed of a resin material and serving as the most image side lens element; and a third lens unit having positive optical power, wherein the lens units move respectively along an optical axis in such a manner that intervals between the individual lens units should vary so that the variable magnification is achieved, and the following condition (I-1) is satisfied:

$$|(R_{2mi1}+R_{2mi2})/(R_{2mi1}-R_{2mi2})|<1.0 \qquad (I-1)$$

where, $R_{2mi1}$ is a radius of curvature on the object side of the most image side lens element of the second lens unit, and $R_{2mi2}$ is a radius of curvature on the image side of the most image side lens element of the second lens unit.

(II) The above-mentioned object is achieved by a zoom lens system, an imaging device and a camera described below. That is, the present invention relates to:

a zoom lens system that forms an optical image of an object with variable magnification and that, in order from the object side to the image side, comprises:

a first lens unit having negative optical power;

a second lens unit having positive optical power; and a third lens unit having positive optical power, wherein in zooming from a wide-angle limit to a telephoto limit, the lens units move respectively along an optical axis in such a manner that an interval between the first lens unit and the second lens unit should decrease while an interval between the second lens unit and the third lens unit should vary so that the variable magnification is achieved, the first lens unit is composed of one object side lens element and one image side lens element, the image side lens element of the first lens unit has positive optical power, the most image side lens element constituting the second lens unit is a lens element composed of a resin and having at least one aspheric surface, and the following condition (II-1) is satisfied:

$$0.7<f_2/f_{2r}<1.5 \qquad (II-1)$$

where, $f_2$ is a composite focal length of the second lens unit, and $f_{2r}$ is a focal length of the most image side lens element of the second lens unit;

an imaging device capable of converting an optical image of a photographic object into an electric image signal and then outputting the signal, comprising:

a zoom lens system that forms the optical image of the photographic object with variable magnification; and an image sensor that converts the optical image formed by the zoom lens system into the electric image signal, wherein in the zoom lens system, the system, in order from the object side which is the photographic object side to the image side, comprises:

a first lens unit having negative optical power;

a second lens unit having positive optical power; and a third lens unit having positive optical power, wherein in zooming from a wide-angle limit to a telephoto limit, the lens units move respectively along an optical axis in such a manner that an interval between the first lens unit and the second lens unit should decrease while an interval between the second lens unit and the third lens unit should vary so that the variable magnification is achieved, the first lens unit is composed of one object side lens element and one image side lens element, the image side lens element of the first lens unit has positive optical power, the most image side lens element constituting the second lens unit is a lens element composed of a resin and having at least one aspheric surface, and the following condition (II-1) is satisfied:

$$0.7<f_2/f_{2r}<1.5 \qquad (II-1)$$

where, $f_2$ is a composite focal length of the second lens unit, and $f_{2r}$ is a focal length of the most image side lens element of the second lens unit; and a camera capable of shooting a photographic object and then outputting its image as an electric image signal, comprising an imaging device including a zoom lens system that forms the optical image of the photographic object with variable magnification and an image sensor that converts the optical image of the photographic object formed by the zoom lens system into the electric image signal, wherein in the zoom lens system, the system, in order from the object side which is the photographic object side to the image side, comprises:

a first lens unit having negative optical power;

a second lens unit having positive optical power; and a third lens unit having positive optical power, wherein in zooming from a wide-angle limit to a telephoto limit, the lens units move respectively along an optical axis in such a manner that an interval between the first lens unit and the second lens unit should decrease while an interval between the second lens unit and the third lens unit should vary so that the variable magnification is achieved, the first lens unit is composed of one object side lens element and one image side lens element, the image side lens element of the first lens unit has positive optical power, the most image side lens element constituting the second lens unit is a lens element composed of a resin and having at least one aspheric surface, and the following condition (II-1) is satisfied:

$$0.7 < f_2/f_{2r} < 1.5 \tag{II-1}$$

where, $f_2$ is a composite focal length of the second lens unit, and $f_{2r}$ is a focal length of the most image side lens element of the second lens unit.

(III) The above-mentioned object is achieved by a zoom lens system, an imaging device and a camera described below. That is, the present invention relates to:

a zoom lens system that forms an optical image of an object with variable magnification of a factor of 3 or greater and that, in order from the object side to the image side, comprises:

a first lens unit having negative optical power;

a second lens unit having positive optical power; and a third lens unit having positive optical power, wherein in zooming from a wide-angle limit to a telephoto limit, the lens units move respectively along an optical axis in such a manner that an interval between the first lens unit and the second lens unit should decrease while an interval between the second lens unit and the third lens unit should vary so that the variable magnification is achieved, the first lens unit is composed of one object side lens element and one image side lens element, in the first lens unit, the object side lens element has negative optical power while the image side lens element has positive optical power, and the following condition (III-1) is satisfied:

$$1.5 < f_2/f_W < 2.8 \tag{III-1}$$

(here, $\omega_W > 36$)

where, $f_2$ is a composite focal length of the second lens unit, $f_W$ is a focal length of the entire system at a wide-angle limit, and $\omega_W$ is a half view angle at a wide-angle limit;

an imaging device capable of converting an optical image of a photographic object into an electric image signal and then outputting the signal, comprising:

a zoom lens system that forms the optical image of the photographic object with variable magnification of a factor of 3 or greater; and an image sensor that converts the optical image formed by the zoom lens system into the electric image signal, wherein in the zoom lens system, the system, in order from the object side which is the photographic object side to the image side, comprises:

a first lens unit having negative optical power;

a second lens unit having positive optical power; and a third lens unit having positive optical power, wherein in zooming from a wide-angle limit to a telephoto limit, the lens units move respectively along an optical axis in such a manner that an interval between the first lens unit and the second lens unit should decrease while an interval between the second lens unit and the third lens unit should vary so that the variable magnification is achieved, the first lens unit is composed of one object side lens element and one image side lens element, in the first lens unit, the object side lens element has negative optical power while the image side lens element has positive optical power, and the following condition (III-1) is satisfied:

$$1.5 < f_2/f_W < 2.8 \tag{III-1}$$

(here, $\omega_W > 36$) where, $f_2$ is a composite focal length of the second lens unit, $f_W$ is a focal length of the entire system at a wide-angle limit, and $\omega_W$ is a half view angle at a wide-angle limit; and a camera capable of shooting a photographic object and then outputting its image as an electric image signal, comprising an imaging device including a zoom lens system that forms the optical image of the photographic object with variable magnification of a factor of 3 or greater and an image sensor that converts the optical image of the photographic object formed by the zoom lens system into the electric image signal, wherein in the zoom lens system, the system, in order from the object side which is the photographic object side to the image side, comprises:

a first lens unit having negative optical power;

a second lens unit having positive optical power; and a third lens unit having positive optical power, wherein in zooming from a wide-angle limit to a telephoto limit, the lens units move respectively along an optical axis in such a manner that an interval between the first lens unit and the second lens unit should decrease while an interval between the second lens unit and the third lens unit should vary so that the variable magnification is achieved, the first lens unit is composed of one object side lens element and one image side lens element, in the first lens unit, the object side lens element has negative optical power while the image side lens element has positive optical power, and the following condition (III-1) is satisfied:

$$1.5 < f_2/f_W < 2.8 \tag{III-1}$$

(here, $\omega_W > 36$)

where, $f_2$ is a composite focal length of the second lens unit, $f_W$ is a focal length of the entire system at a wide-angle limit, and $\omega_W$ is a half view angle at a wide-angle limit.

According to the present invention, a zoom lens system is provided that has a high resolution, high capability of compensating curvature of field, a high zoom ratio of, for example, 3 or greater, a reduced weight, and a reduced overall optical length at the time of non-use. Further, the present invention provides: an imaging device that employs this zoom lens system so as to have a reduced thickness and excellent portability as well as high performance: and a camera such as a digital still camera and a digital video camera that has a reduced thickness and excellent portability as well as high performance.

These and other objects, features, aspects and effects of the present invention will become clearer on the basis of the following detailed description with reference to the accompanying drawings.

DESCRIPTION OF THE PREFERRED EMBODIMENTS

Embodiments I-1 to I-4

Figure 1:
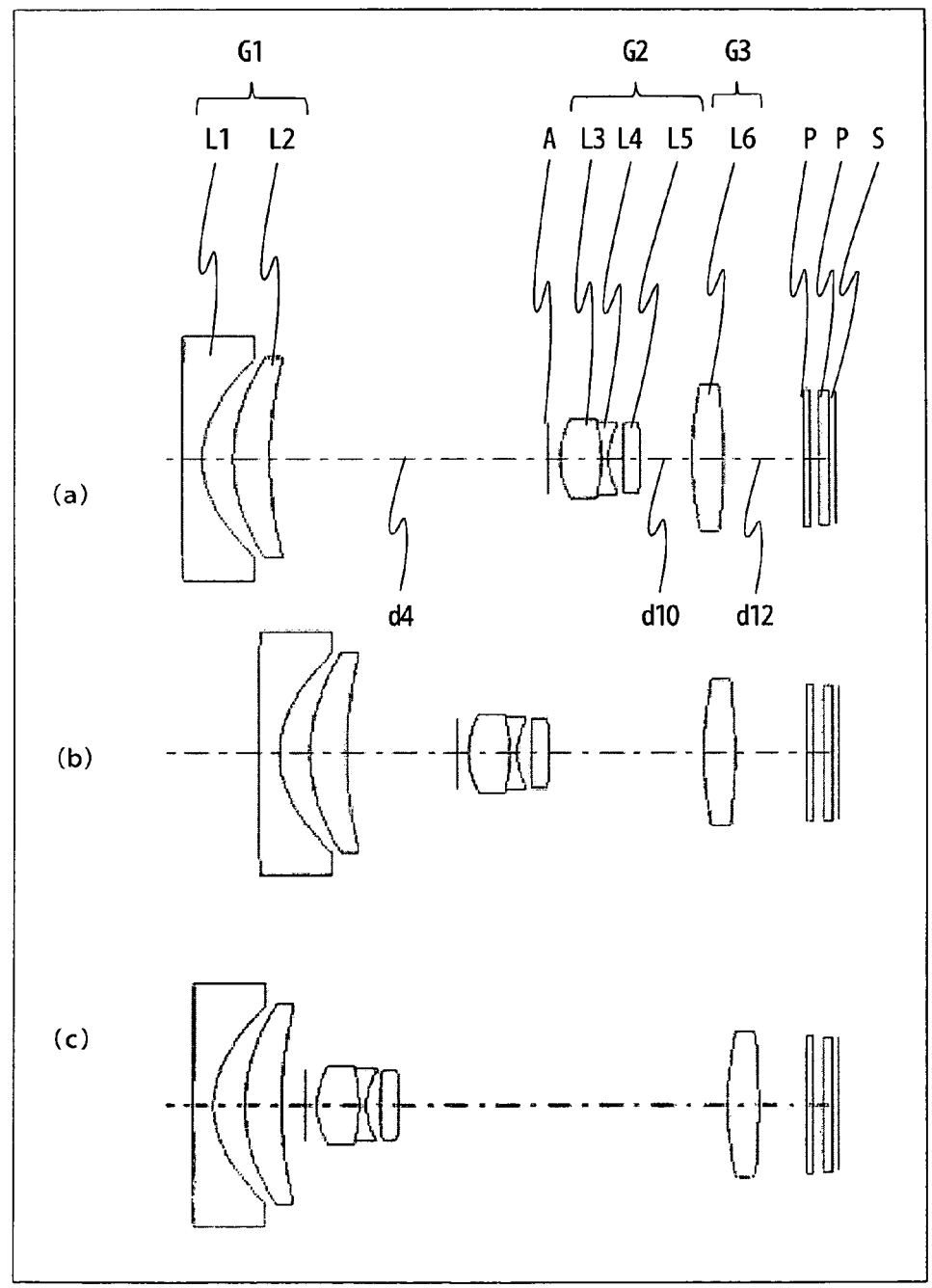
FIG. 1 is a configuration diagram of a zoom lens system according to Embodiment I-1 (Example I-1)
Figure 3:
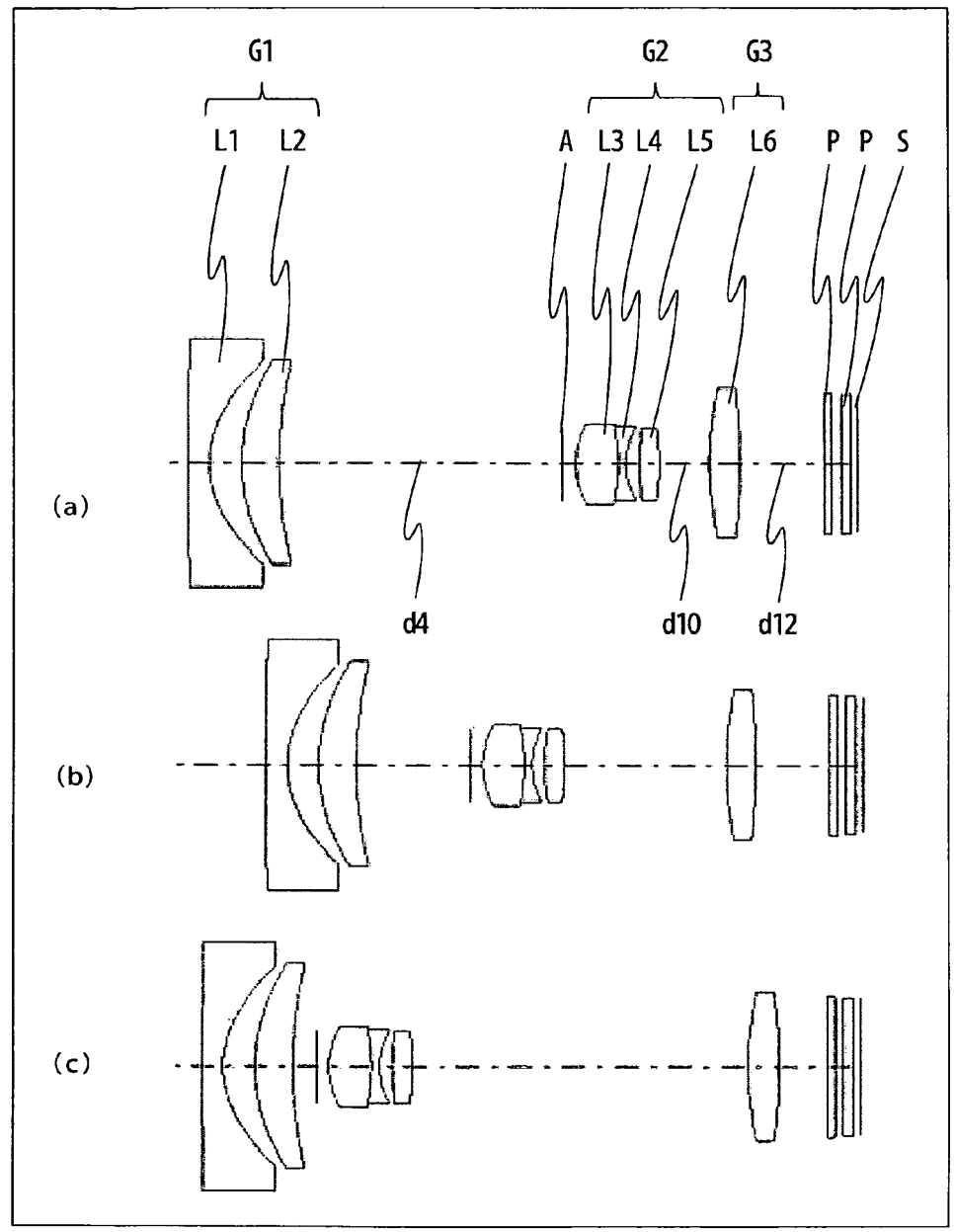
FIG. 3 is a configuration diagram of a zoom lens system according to Embodiment I-2 (Example I-2)
Figure 5:
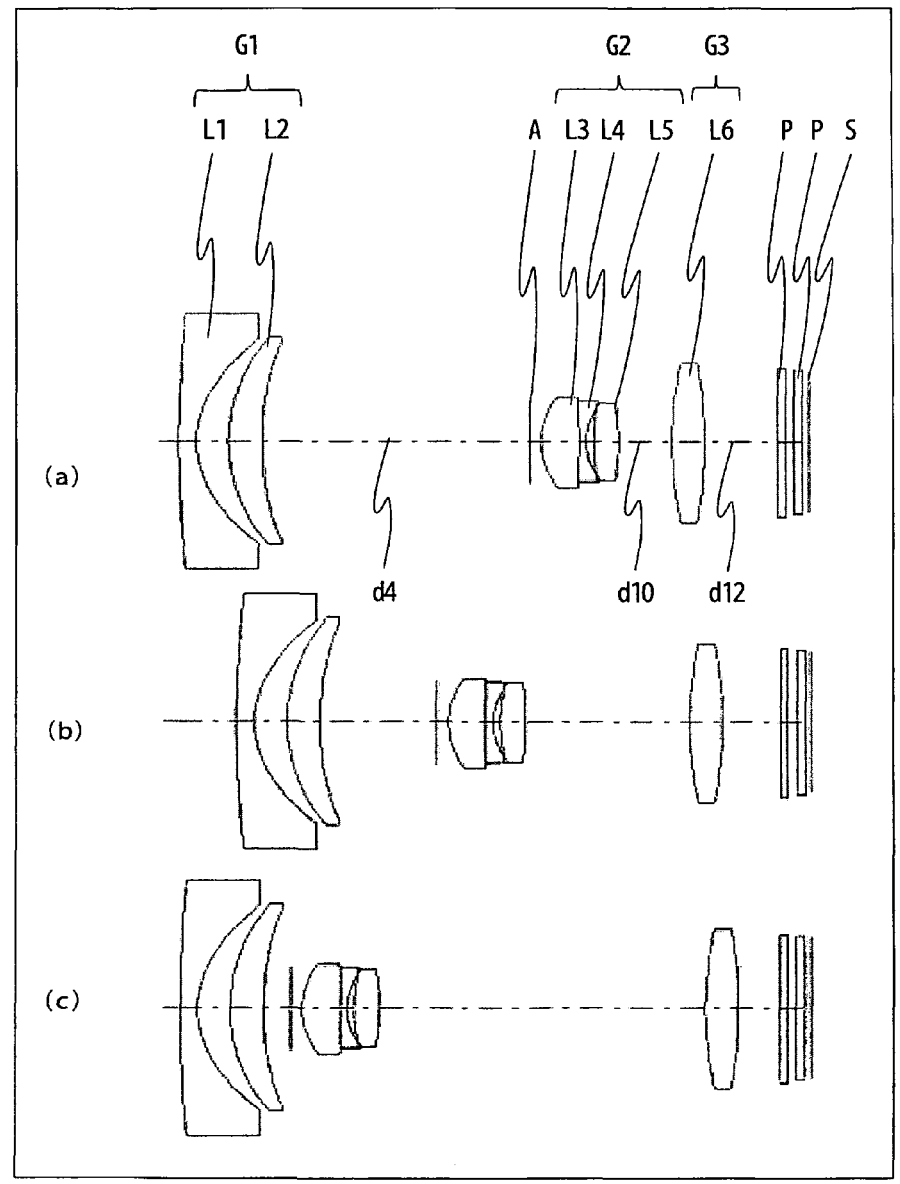
FIG. 5 is a configuration diagram of a zoom lens system according to Embodiment I-3 (Example I-3)
Figure 7:
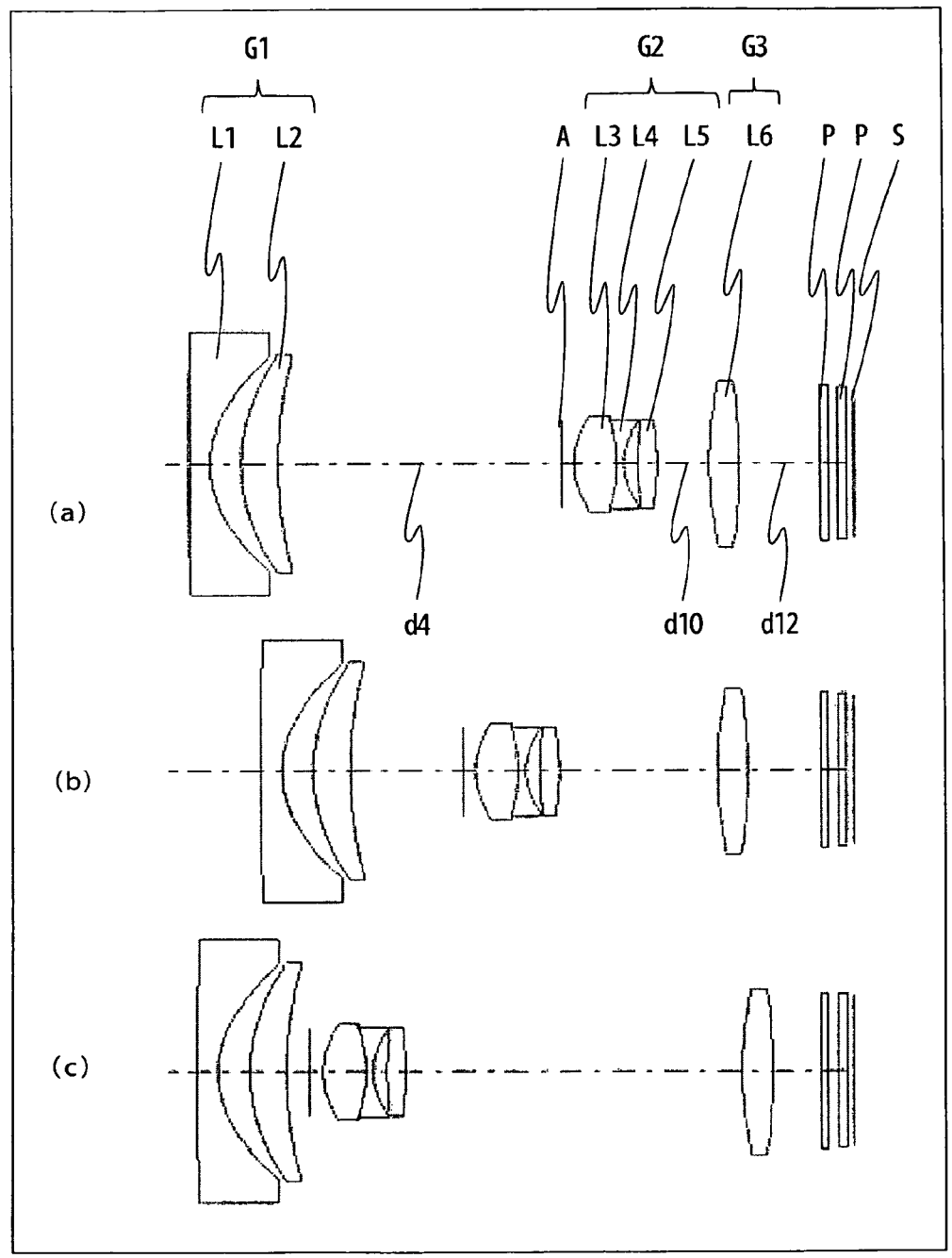
FIG. 7 is a configuration diagram of a zoom lens system according to Embodiment I-4 (Example I-4)

FIG. 1 is a lens configuration diagram of a zoom lens system according to Embodiment I-1. FIG. 3 is a lens configuration diagram of a zoom lens system according to Embodiment I-2. FIG. 5 is a lens configuration diagram of a zoom lens system according to Embodiment I-3. FIG. 7 is a lens configuration diagram of a zoom lens system according to Embodiment I-4. Each configuration diagram shows a zoom lens system in an infinity in-focus condition. In each diagram, part (a) shows a lens configuration at a wide-angle limit (in the minimum focal length condition: focal length $f_W$). Part (b) shows a lens configuration at an approximately middle position (in an intermediate focal length condition: focal length $f_M = \sqrt{(f_W * f_T)}$). Part (c) shows a lens configuration at a telephoto limit (in the maximum focal length condition: focal length $f_T$).

Each zoom lens system according to Embodiments I-1 to I-4, in order from the object side to the image side, comprises: a first lens unit G1 having negative optical power; a diaphragm A; a second lens unit G2 having positive optical power; and a third lens unit G3 having positive optical power. In the zoom lens system according to Embodiments I-1 to I-4, in zooming from a wide-angle limit to a telephoto limit, the first lens unit G1 moves with locus of a convex to the image side, while the second lens unit G2 and the diaphragm A monotonically move to the object side, and while the third lens unit G3 monotonically moves to the image side. As such, in the zoom lens system according to Embodiments I-1 to I-4, in zooming from a wide-angle limit to a telephoto limit, the lens units move respectively along the optical axis in such a manner that the intervals between the individual lens units should vary.

Further, in the zoom lens system according to Embodiments I-1 to I-4, magnification change is performed mainly by the first lens unit G1 and the second lens unit G2, while focusing is performed by the third lens unit G3. Further, the diaphragm A is arranged on the object side of the second lens unit G2 and located at the same position as the most object side surface of the second lens unit G2. This permits reduction in the interval between the first lens unit G1 and the second lens unit G2, and hence provides an advantage in thickness reduction of the entire zoom lens system and ensuring of magnification.

In FIGS. 1, 3, 5 and 7, the straight line located on the most right-hand side indicates the position of the image surface S of an image sensor such as a CCD. On the object side relative to this, two plates P are provided each of which is composed of a parallel plate or a cover glass plate equivalent to an optical low-pass filter or a face plate of an image sensor or the like.

The above-mentioned optical low-pass filter is constructed from a material such as quartz having birefringence. For example, in a solid-state image sensor such as a CCD, an object image formed by the zoom lens system is acquired as a two-dimensional sampling image of low numerical aperture. Thus, a high frequency signal at or higher than ½ of the sampling frequency forms a false signal. Accordingly, in order that such high frequency components of the image should be removed in advance, it is preferable that the optical low-pass filter is arranged between the most image side lens element of the third lens unit G3 and the image surface S. Further, a solid-state image sensor generally has a high sensitivity even for light in the infrared region. Thus, in order that natural color reproduction should also be achieved, it is more preferable that the optical low-pass filter is provided with an infrared cut-off function of cutting off the light in the infrared region by means of fabricating the filter with an infrared absorbing material, coating the filter with an infrared absorbing material, or the like.

The above-mentioned plate P is not indispensable, and hence may be provided appropriately when necessary.

As shown in FIG. 1, in the zoom lens system according to Embodiment I-1, the first lens unit G1, in order from the object side to the image side, comprises two lens elements consisting of: a negative meniscus first lens element L1 with the convex surface facing the object side; and a positive meniscus second lens element L2 with the convex surface facing the object side. In the first lens element L1, the image side surface (surface 2) is aspheric. In the second lens element L2, the object side surface (surface 3) is aspheric.

Further, in the zoom lens system according to Embodiment I-1, the second lens unit G2, in order from the object side to the image side, comprises three lens elements consisting of a bi-convex third lens element L3 (lens element A), a bi-concave fourth lens element L4 (lens element B) and a bi-convex fifth lens element L5 (most image side lens element, lens element C). Among these, the third lens element L3 and the fourth lens element L4 are cemented with each other so as to constitute a cemented lens element.

In the zoom lens system according to the present Embodiment I-1, the third lens element L3 and the fourth lens element L4 are composed of a glass material, while the fifth lens element L5 is composed of a resin material such as an acrylic resin. Further, in the third lens element L3, the object side surface (surface 6) is aspheric. In the fifth lens element L5, the object side surface (surface 9) is aspheric.

Further, in the zoom lens system according to Embodiment I-1, the third lens unit G3 comprises solely a bi-convex sixth lens element L6. The sixth lens element L6 is composed of a glass material. Its two surfaces (surfaces 11 and 12) are aspheric.

As shown in FIG. 3, in the zoom lens system according to Embodiment I-2, the first lens unit G1, in order from the object side to the image side, comprises two lens elements consisting of: a negative meniscus first lens element L1 with the convex surface facing the object side; and a positive meniscus second lens element L2 with the convex surface facing the object side. In the first lens element L1, the image side surface (surface 2) is aspheric. In the second lens element L2, the object side surface (surface 3) is aspheric.

Further, in the zoom lens system according to Embodiment I-2, the second lens unit G2, in order from the object side to the image side, comprises three lens elements consisting of a bi-convex third lens element L3 (lens element A), a bi-concave fourth lens element L4 (lens element B) and a bi-convex fifth lens element L5 (most image side lens element, lens element C). Among these, the third lens element L3 and the fourth lens element L4 are cemented with each other so as to constitute a cemented lens element.

In the zoom lens system according to the present Embodiment I-2, the third lens element L3 and the fourth lens element L4 are composed of a glass material, while the fifth lens element L5 is composed of a resin material such as an acrylic resin. Further, in the third lens element L3, the object side surface (surface 6) is aspheric. In the fifth lens element L5, the object side surface (surface 9) is aspheric.

Further, in the zoom lens system according to Embodiment I-2, the third lens unit G3 comprises solely a bi-convex sixth lens element L6. The sixth lens element L6 is composed of a glass material. Its two surfaces (surfaces 11 and 12) are aspheric.

As shown in FIG. 5, in the zoom lens system according to Embodiment I-3, the first lens unit G1, in order from the object side to the image side, comprises two lens elements consisting of: a negative meniscus first lens element L1 with the convex surface facing the object side; and a positive meniscus second lens element L2 with the convex surface facing the object side. In the first lens element L1, the image side surface (surface 2) is aspheric. In the second lens element L2, the image side surface (surface 4) is aspheric.

Further, in the zoom lens system according to Embodiment I-3, the second lens unit G2, in order from the object side to the image side, comprises three lens elements consisting of a bi-convex third lens element L3 (lens element A), a bi-concave fourth lens element L4 (lens element B) and a bi-convex fifth lens element L5 (most image side lens element, lens element C). Among these, the third lens element L3 and the fourth lens element L4 are cemented with each other so as to constitute a cemented lens element.

In the zoom lens system according to the present Embodiment I-3, the third lens element L3 and the fourth lens element L4 are composed of a glass material, while the fifth lens element L5 is composed of a resin material such as an acrylic resin. Further, in the third lens element L3, the object side surface (surface 6) is aspheric. In the fifth lens element L5, the object side surface (surface 9) is aspheric.

Further, in the zoom lens system according to Embodiment I-3, the third lens unit G3 comprises solely a bi-convex sixth lens element L6. The sixth lens element L6 is composed of a glass material. Its image side surface (surface 12) is aspheric.

As shown in FIG. 7, in the zoom lens system according to Embodiment I-4, the first lens unit G1, in order from the object side to the image side, comprises two lens elements consisting of: a negative meniscus first lens element L1 with the convex surface facing the object side; and a positive meniscus second lens element L2 with the convex surface facing the object side. In the first lens element L1, the image side surface (surface 2) is aspheric. In the second lens element L2, the object side surface (surface 3) is aspheric.

Further, in the zoom lens system according to Embodiment I-4, the second lens unit G2, in order from the object side to the image side, comprises three lens elements consisting of a bi-convex third lens element L3 (lens element A), a bi-concave fourth lens element L4 (lens element B) and a bi-convex fifth lens element L5 (most image side lens element, lens element C). Among these, the third lens element L3 and the fourth lens element L4 are cemented with each other so as to constitute a cemented lens element.

In the zoom lens system according to the present Embodiment I-4, the third lens element L3 and the fourth lens element L4 are composed of a glass material, while the fifth lens element L5 is composed of a resin material such as an acrylic resin. Further, in the third lens element L3, the object side surface (surface 6) is aspheric. In the fifth lens element L5, the object side surface (surface 9) is aspheric.

Further, in the zoom lens system according to Embodiment I-4, the third lens unit G3 comprises solely a bi-convex sixth lens element L6. The sixth lens element L6 is composed of a glass material. Its two surfaces (surfaces 11 and 12) are aspheric.

As such, in the zoom lens system according to Embodiments I-1 to I-4, the lens units G1 to G3 are arranged in a desired optical power construction so that size reduction is achieved in the entire lens system in a state that excellent optical performance is satisfied.

Here, in the zoom lens system according to Embodiments I-1 to I-4, the first lens unit G1 is composed of two lens elements, the second lens unit G2 is composed of three lens elements, and the third lens unit G3 is composed of one lens element. As such, the zoom lens system according to Embodiments I-1 to I-4 has a small number of lens elements constituting each lens unit and a small thickness of each lens unit that directly affects the thickness of the entire lens system. This permits reduction in the thickness especially at the time of retraction.

Further, in a zoom lens system like that of Embodiments I-1 to I-4 that, in order from the object side to the image side, comprises: a first lens unit having negative optical power; a second lens unit that has positive optical power and that contains a bi-convex lens element composed of a resin material and serving as the most image side lens element; and a third lens unit having positive optical power, when during magnification change, the first to the third lens units are moved along the optical axis in such a manner that the intervals between the individual lens units should vary, a zoom lens system having a variable magnification ratio of approximately 3 to 4 can be constructed compactly. Further, when the most image side lens element of the second lens unit is constructed from a bi-convex lens element composed of a resin material, weight reduction of the zoom lens system and compensation of curvature of field especially near a telephoto limit are achieved satisfactorily.

Conditions are described below that are preferable to be satisfied by a zoom lens system like the zoom lens system according to Embodiments I-1 to I-4, in order from the object side to the image side, comprising: a first lens unit having negative optical power; a second lens unit that has positive optical power and that contains a bi-convex lens element composed of a resin material and serving as the most image side lens element; and a third lens unit having positive optical power, wherein the individual lens units move along the optical axis in such a manner that the intervals between the individual lens units should vary so that variable magnification is achieved. Here, a plurality of conditions to be satisfied are set forth for the zoom lens system according to each embodiment. A construction that satisfies all the conditions is most desirable for the zoom lens system. However, when an individual condition is satisfied, a zoom lens system providing the corresponding effect can be obtained.

For example, a zoom lens system like the zoom lens system according to Embodiments I-1 to I-4 is characterized in that the following condition (I-1) is satisfied.

$$|(R_{2mi1}+R_{2mi2})/(R_{2mi1}-R_{2mi2})|<1.0 \quad (I-1)$$

where, $R_{2mi1}$ is a radius of curvature on the object side of the most image side lens element of the second lens unit, and $R_{2mi2}$ is a radius of curvature on the image side of the most image side lens element of the second lens unit.

The condition (I-1) relates to the shape factor of the most image side lens element of the second lens unit. When the condition (I-1) is not satisfied, a difference in the optical power increases between both sides of the most image side lens element. This causes a large curvature of field on a surface having high optical power, and hence satisfactory overall performance cannot be ensured.

Here, when the following condition (I-1)' is further satisfied, aberration caused by an error in assembling of the lens element is reduced. Thus, sensitivity of the performance degradation to the error is reduced, and so is variation in the optical performance of the zoom lens system after assembling.

$$|(R_{2mi1}+R_{2mi2})/(R_{2mi1}-R_{2mi2})|<0.5 \quad (I-1)'$$

Further, in a zoom lens system like the zoom lens system according to Embodiments I-1 to I-4, it is preferable that the following condition (I-2) is satisfied.

$$(T_{G1}+T_{G2}+T_{G3})/f_W<2.7 \quad (I-2)$$

(here, $\omega_W>30$ and $3.0<f_T/f_W<4.0$)
where, $T_{G1}$ is an optical axial thickness of the first lens unit,
$T_{G2}$ is an optical axial thickness of the second lens unit,
$T_{G2}$ is an optical axial thickness of the third lens unit,
$\omega_W$ is a half view angle at a wide-angle limit,
$f_W$ is a focal length of the entire system at a wide-angle limit, and
$f_T$ is a focal length of the entire system at a telephoto limit.

The condition (I-2) relates to the optical axial thicknesses of the first to the third lens units at the time of retraction. For the purpose of reducing the length of a lens barrel at the time of retraction, it is most effective to reduce the optical axial length (thickness) of each lens unit. When the thickness of each lens unit is set up such as to satisfy the condition (I-2), the lens barrel total length at the time of retraction is reduced further. This provides a zoom lens system more suitable for a compact stylish camera.

When the following condition (I-2)' is further satisfied, the above-mentioned effect is achieved more successfully.

$$(T_{G1}+T_{G2}+T_{G3})/f_W<2.3 \quad (I-2)'$$

(here, $\omega_W>30$ and $3.0<f_T/f_W<4.0$)

In a zoom lens system like the zoom lens system according to Embodiments I-1 to I-4 in which the first lens unit, in order from the object side to the image side, comprises a first lens element having negative optical power and a second lens element having positive optical power, it is preferable that the following condition (I-3) is satisfied.

$$0.3<T_1/f_W<1.3 \quad (I-3)$$

(here, $\omega_W>30$ and $3.0<f_T/f_W<4.0$)
where, $T_1$ is an air space between the first lens element and the second lens element,
$\omega_W$ is a half view angle at a wide-angle limit,
$f_W$ is a focal length of the entire system at a wide-angle limit, and
$f_T$ is a focal length of the entire system at a telephoto limit.

When the first lens unit comprises, in order from the object side to the image side, a first lens element having negative optical power and a second lens element having positive optical power, chromatic aberration and astigmatism especially at a wide-angle limit can be removed satisfactorily. When the condition (I-3) is further satisfied, a zoom lens system is realized that is provided with improved compactness and more satisfactorily compensated performance.

When the value goes below the lower limit of the condition (I-3), the air space between the first lens element and the second lens element becomes excessively small. This easily causes geometrical interference between the first lens element rear face whose optical power has been increased for the purpose of ensuring the view angle and the front face of the second lens element. This causes difficulty in ensuring the required image surface illuminance. In contrast, when the value exceeds the upper limit of the condition (I-3), the interval of the first lens unit increases, and hence a possibility arises that the compactness at the time of retraction degrades.

When the following condition (I-3)' is further satisfied, the above-mentioned effect is achieved more successfully.

$$T_1/f_W<0.7 \quad (I-3)'$$

(here, $\omega_W>30$ and $3.0<f_T/f_W<4.0$)

In a zoom lens system like the zoom lens system according to Embodiments I-1 to I-4 in which the first lens unit, in order from the object side to the image side, comprises a first lens element having negative optical power and a second lens element having positive optical power, it is preferable that the following condition (I-4) is satisfied.

$$-4.2<(R_{12}+R_{21})/(R_{12}-R_{21})<-3.2 \quad (I-4)$$

where, $R_{12}$ is a radius of curvature on the image side of the first lens element, and
$R_{21}$ is a radius of curvature on the object side of the second lens element.

When the first lens unit comprises, in order from the object side to the image side, a first lens element having negative optical power and a second lens element having positive optical power, chromatic aberration and astigmatism especially at a wide-angle limit can be removed satisfactorily as described above. When the condition (I-4) is further satisfied, a zoom lens system is realized that has more satisfactorily overall performance.

When the value goes below the lower limit of the condition (I-4), the radius of curvature on the image side of the first lens element becomes shorter. This causes difficulty in maintaining the negative optical power required in the first lens unit, and hence causes a possibility that the compactness of the zoom lens system degrades. In contrast, when the value exceeds the upper limit of the condition (I-4), the radius of curvature on the image side of the first lens element becomes longer. This causes difficulty in reducing negative distortion.

Here, when at least one of the following conditions (I-4)' and (I-4)" is further satisfied, the above-mentioned effect is achieved more successfully.

$$-4.0 < (R_{12}+R_{21})/(R_{12}-R_{21}) \quad (I-4)'$$

$$(R_{12}+R_{21})/(R_{12}-R_{21}) < -3.5 \quad (I-4)''$$

In a zoom lens system like the zoom lens system according to Embodiments I-1 to I-4 in which the first lens unit, in order from the object side to the image side, comprises a first lens element having negative optical power and a second lens element having positive optical power, it is preferable that the following condition (I-5) is satisfied.

$$nd_2 > 1.88 \quad (I-5)$$

where, $nd_2$ is a refractive index of the second lens element to the d-line.

When the first lens unit comprises, in order from the object side to the image side, a first lens element having negative optical power and a second lens element having positive optical power, chromatic aberration and astigmatism especially at a wide-angle limit can be removed satisfactorily as described above. When the condition (I-5) is further satisfied, the curvature of each surface can be weaker. This permits easier compensation of curvature of field especially at a wide-angle limit. At the same time, the lens center thickness can be reduced, and hence further size reduction is achieved.

When the following condition (I-5)' is further satisfied, the above-mentioned effect is achieved more successfully.

$$nd_2 > 1.90 \quad (I-5)'$$

Further, when the following condition (I-5)" is satisfied, the optical power of the first lens unit can be increased. This permits constructing of a compact zoom lens system having a higher variable magnification ratio and higher optical performance.

$$2.50 > nd_2 \quad (I-5)''$$

In a zoom lens system like the zoom lens system according to Embodiments I-1 to I-4 in which the second lens unit, in order from the object side to the image side, comprises a lens element A composed of a glass material, a lens element B composed of a glass material and a lens element C composed of a resin material, it is preferable that the following condition (I-6) is satisfied.

$$2.0 < \phi_A/\phi_C < 3.5 \quad (I-6)$$

where, $\phi_A$ is a paraxial optical power of the lens element A, and
$\phi_C$ is a paraxial optical power of the lens element C.

When the second lens unit, in order from the object side to the image side, comprises a lens element A composed of a glass material, a lens element B composed of a glass material and a lens element C composed of a resin material, a zoom lens system is realized that is provided with improved compactness and satisfactorily compensated performance. Further, when the number of lens elements constituting the second lens unit is reduced as much as possible, an effect is obtained that the thickness especially at the time of retraction is reduced. Moreover, when one of these lens elements is composed of a resin material, further weight reduction and cost reduction can be achieved simultaneously.

When the value goes below the lower limit of the condition (I-6), the optical power of the lens element C becomes excessively high within the second lens unit. Thus, the aberration to be compensated in the lens element C increases. This causes difficulty in forming of the lens element C. Further, the sensitivity of performance degradation to an assembling error becomes high. This causes difficulty in assembling. In contrast, when the value exceeds the upper limit of the condition (I-6), the optical power of the lens element A increases. Thus, in order that the optical performance should be maintained satisfactorily, the thickness of the lens element A need be increased. This degrades the compactness. Further, when the thickness of the lens element A is to be maintained small, the aberration generated in the lens element A cannot sufficiently be compensated, and hence high optical performance cannot be maintained.

Here, when at least one of the following conditions (I-6)' and (I-6)" is further satisfied, the above-mentioned effect is achieved more successfully.

$$2.3 < \phi_A/\phi_C \quad (I-6)'$$

$$\phi_A/\phi_C < 3.2 \quad (I-6)''$$

In a zoom lens system like the zoom lens system according to Embodiments I-1 to I-4 in which the second lens unit, in order from the object side to the image side, comprises a lens element A composed of a glass material, a lens element B composed of a glass material and a lens element C composed of a resin material and in which each of the lens element A and the lens element C has an aspheric surface, it is preferable that the following condition (I-7) is satisfied.

$$0.15 < \phi_{Aa}/\phi_{Ca} < 0.30 \quad (I-7)$$

where, $\phi_{Aa}$ is a paraxial optical power of the aspheric surface of the lens element A, and $\phi_{Ca}$ is a paraxial optical power of the aspheric surface of the lens element C.

When the second lens unit, in order from the object side to the image side, comprises a lens element A composed of a glass material, a lens element B composed of a glass material and a lens element C composed of a resin material, a zoom lens system is realized that is provided with improved compactness and satisfactorily compensated performance as described above. Further, when the number of lens elements constituting the second lens unit is reduced as much as possible, an effect is obtained that the thickness especially at the time of retraction is reduced. Moreover, when one of these lens elements is composed of a resin material, further weight reduction and cost reduction can be achieved simultaneously. Further, each of the lens element A located on the object side among the two lens elements composed of a glass material and the lens element C composed of a resin material has an aspheric surface. By virtue of this, the image surface position can be aligned for every view angle. Thus, more satisfactory optical performance is obtained.

When the value goes below the lower limit of the condition (I-7), the optical power of the lens element C becomes excessively high within the second lens unit. Thus, the aberration to be compensated by the aspheric surface of the lens element C increases. This causes difficulty in forming of the lens element C. Further, the sensitivity of performance degradation to an assembling error becomes high. This causes difficulty in assembling. In contrast, when the value exceeds the upper limit of the condition (I-7), the optical power of the lens element A increases. Thus, in order that the optical performance should be maintained satisfactorily, the thickness of the lens element A need be increased. This degrades the compactness. Further, when the thickness of the lens element A is to be maintained small, the aberration generated in the lens element A cannot sufficiently be compensated, and hence high optical performance cannot be maintained.

Here, when at least one of the following conditions (I-7)' and (I-7)" is further satisfied, the above-mentioned effect is achieved more successfully.

$$0.19 < \phi_{Ad}/\phi_{Ca} \quad (I\text{-}7)'$$

$$\phi_{Ad}/\phi_{Ca} < 0.25 \quad (I\text{-}7)''$$

The conditions (I-6) and (I-7) may be satisfied individually or simultaneously. When any one of the conditions is satisfied, a zoom lens system is realized that is provided with improved compactness and satisfactorily compensated performance. Here, when the two conditions are satisfied simultaneously, the effect is achieved more successfully.

The lens units constituting the zoom lens system of Embodiments I-1 to I-4 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Further, in the zoom lens system according to Embodiments I-1 to I-4, the third lens unit has been composed of one lens element. However, as long as the third lens unit has positive optical power, the number of constituting lens elements is not limited to a particular value. However, from the perspective of thickness reduction of the entire lens system, it is more preferable that the third lens unit is composed of one lens element and that the entire zoom lens system is composed of six lens elements at minimum. In particular, when the third lens unit is constructed from one lens element composed of a glass material, a zoom lens system can be realized that has more satisfactory focusing performance.

Further, in the zoom lens system according to Embodiments I-1 to I-4, a reflecting surface may be arranged in the optical path so that the optical path may be bent before or after the zoom lens system or alternatively in the middle. The bending position may be set up arbitrarily depending on the necessity. When the optical path is bent appropriately, thickness reduction in appearance can be achieved in a camera.

As described above, according to the present Embodiments I-1 to I-4, a zoom lens system can be obtained that has high optical performance compatible to an image sensor of high pixel number and that has a reduced overall length and a reduced thickness.

Embodiments II-1 to II-4

Figure 9:
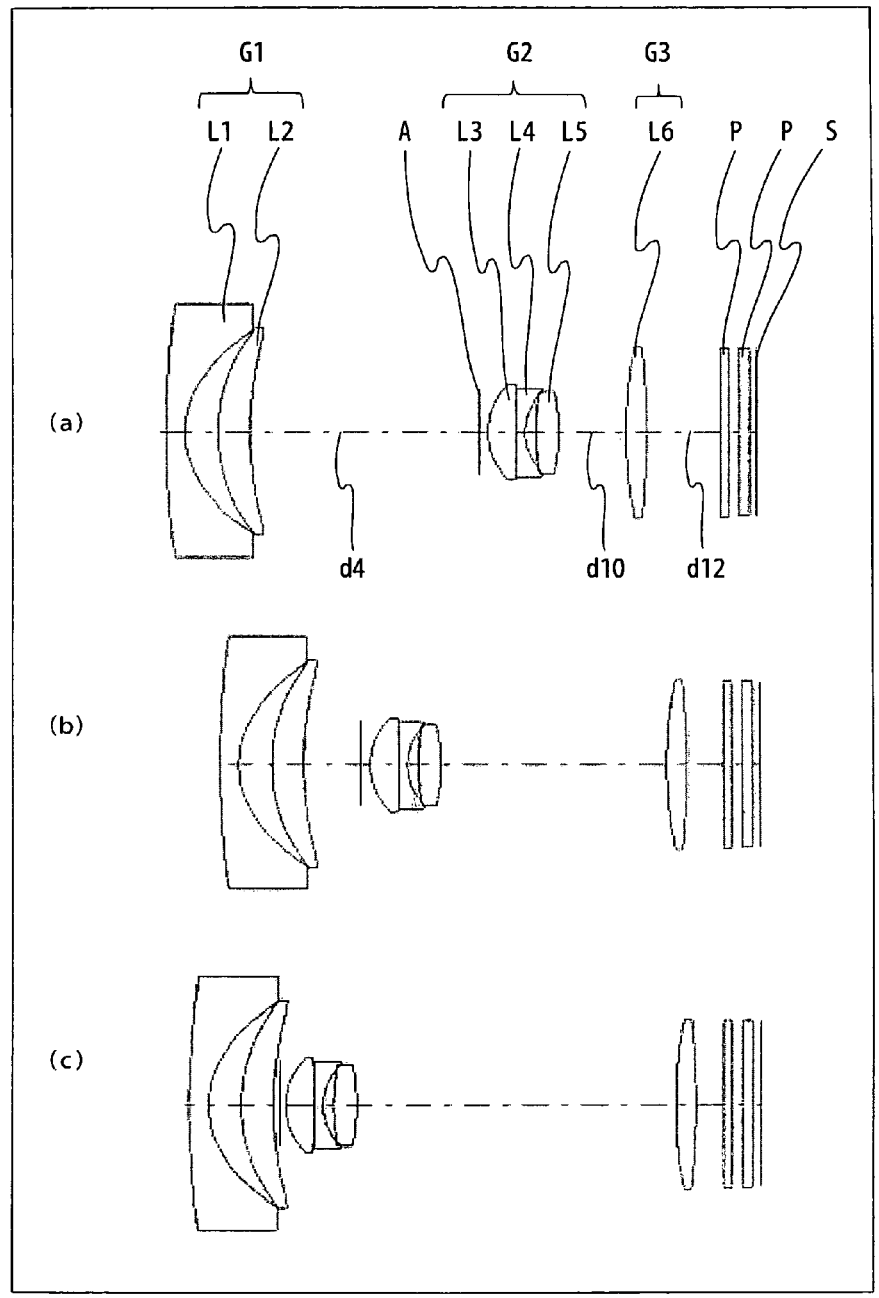
FIG. 9 is a configuration diagram of a zoom lens system according to Embodiment II-1 (Example II-1)
Figure 11:
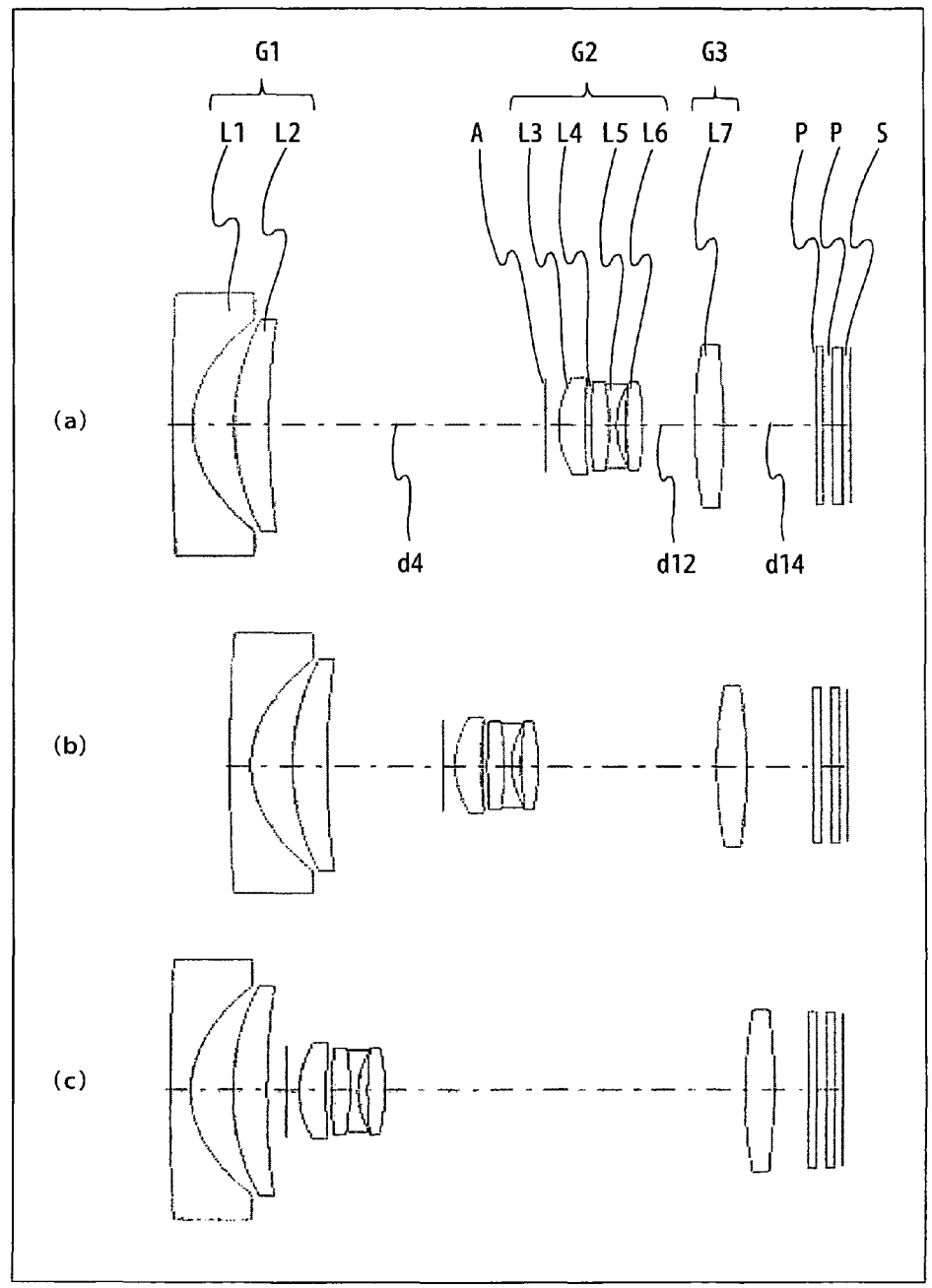
FIG. 11 is a configuration diagram of a zoom lens system according to Embodiment II-2 (Example II-2)
Figure 13:
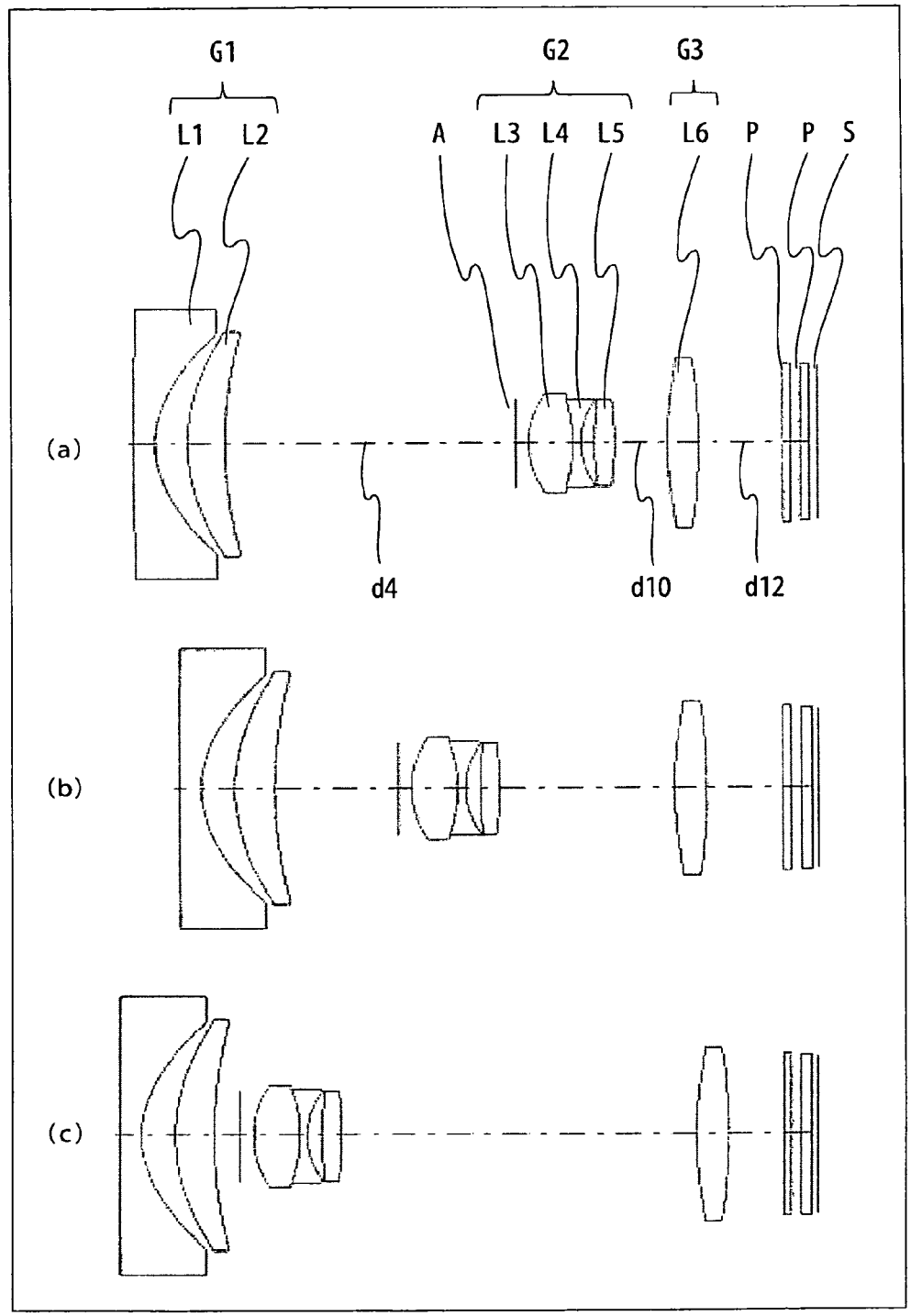
FIG. 13 is a configuration diagram of a zoom lens system according to Embodiment II-3 (Example II-3)
Figure 15:
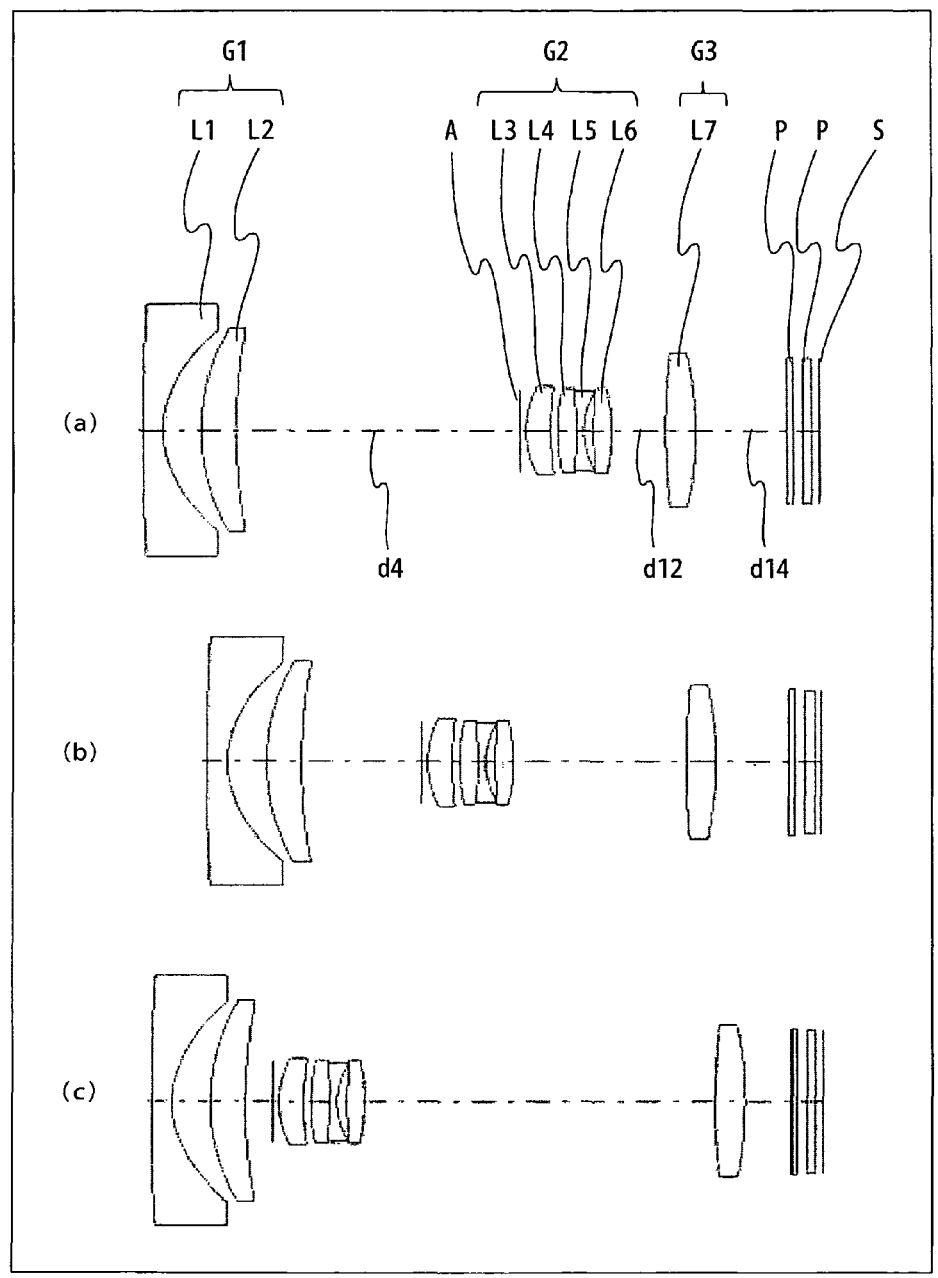
FIG. 15 is a configuration diagram of a zoom lens system according to Embodiment II-4 (Example II-4)

FIG. 9 is a lens configuration diagram of a zoom lens system according to Embodiment. II-1. FIG. 11 is a lens configuration diagram of a zoom lens system according to Embodiment II-2. FIG. 13 is a lens configuration diagram of a zoom lens system according to Embodiment II-3. FIG. 15 is a lens configuration diagram of a zoom lens system according to Embodiment II-4. Each configuration diagram shows a zoom lens system in an infinity in-focus condition. In each diagram, part (a) shows a lens configuration at a wide-angle limit (in the minimum focal length condition: focal length $f_W$). Part (b) shows a lens configuration at an approximately middle position (in an intermediate focal length condition: focal length $f_M = \sqrt{(f_W * f_T)}$). Part (c) shows a lens configuration at a telephoto limit (in the maximum focal length condition: focal length $f_T$).

Each zoom lens system according to Embodiments II-1 to II-4, in order from the object side to the image side, comprises: a first lens unit G1 having negative optical power; a diaphragm A; a second lens unit G2 having positive optical power; and a third lens unit G3 having positive optical power. In the zoom lens system according to Embodiments II-1 to II-4, in zooming from a wide-angle limit to a telephoto limit, the first lens unit G1 moves with locus of a convex to the image side, while the second lens unit G2 and the diaphragm A monotonically move to the object side, and while the third lens unit G3 moves with changing the interval with the second lens unit G2. That is, in the zoom lens system according to Embodiments II-1 to II-4, in zooming from a wide-angle limit to a telephoto limit, the lens units move respectively along the optical axis in such a manner that the interval between the first lens unit G1 and the second lens unit G2 should decrease while the interval between the second lens unit G2 and the third lens unit G3 should vary.

In FIGS. 9, 11, 13 and 15, the straight line located on the most right-hand side indicates the position of the image surface S of an image sensor such as a CCD. On the object side relative to this, a plate P is provided that is composed of a parallel plate or a cover glass plate equivalent to an optical low-pass filter or a face plate of an image sensor or the like.

As shown in FIG. 9, in the zoom lens system according to Embodiment II-1, the first lens unit G1, in order from the object side to the image side, comprises two lens elements consisting of: a negative meniscus object side lens element L1 having negative optical power and with the convex surface facing the object side; and a positive meniscus image side lens element L2 having positive optical power and with the convex surface facing the object side. In each of the object side lens element L1 and the image side lens element L2, the image side surface is aspheric.

In the zoom lens system according to Embodiment II-1, the second lens unit G2, in order from the object side to the image side, comprises: a bi-convex third lens element L3; a bi-concave fourth lens element L4; and a bi-convex fifth lens element L5. Among these, the third lens element L3 and the fourth lens element L4 are cemented with each other so as to constitute a cemented lens element. Further, the third lens element L3 serving as the most object side lens element of the second lens unit G2 has an aspheric object side surface. Further, the fifth lens element L5 serving as the most image side lens element of the second lens unit G2 is a lens element that has an aspheric object side surface and that is composed of the resin (ZEONEX (registered trademark) manufactured by ZEON CORPORATION).

In the zoom lens system according to Embodiment II-1, the third lens unit G3 comprises solely a bi-convex sixth lens element L6. In the sixth lens element L6, the image side surface is aspheric.

In the zoom lens system according to Embodiment II-1, the fifth lens element L5 serving as the most image side lens element of the second lens unit G2 is a lens element composed of a resin and having an aspheric surface. Further, as shown later in Table II-13, the most image side lens element L5 of the second lens unit G2 is set to have a long focal length and hence a low optical power such that the lens element is made thin. By virtue of this, the second lens unit G2 serving as a moving unit is made into light weight. Further, since the optical power is made low so that the influence of assembling error to image quality degradation is suppressed, cemented construction between the third lens element L3 and the fourth lens element L4 is permitted so that the thickness of the second lens unit G2 is reduced. As a result, the zoom lens system according to Embodiment II-1 has a reduced weight and a reduced overall optical length at the time of non-use.

As shown in FIG. 11, in the zoom lens system according to Embodiment II-2, the first lens unit G1, in order from the object side to the image side, comprises two lens elements consisting of: a negative meniscus object side lens element L1 having negative optical power and with the convex surface facing the object side; and a positive meniscus image side lens element L2 having positive optical power and with the convex surface facing the object side. In the object side lens element L1, the image side surface is aspheric. In the image side lens element L2, the object side surface is aspheric.

In the zoom lens system according to Embodiment II-2, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other so as to constitute a cemented lens element. Further, the third lens element L3 serving as the most object side lens element of the second lens unit G2 has an aspheric object side surface. Further, the sixth lens element L6 serving as the most image side lens element of the second lens unit G2 is a lens element that has an aspheric object side surface and that is composed of the resin (ZEONEX (registered trademark) manufactured by ZEON CORPORATION).

In the zoom lens system according to Embodiment II-2, the third lens unit G3 comprises solely a bi-convex seventh lens element L7. In the seventh lens element L7, the image side surface is aspheric.

In the zoom lens system according to Embodiment II-2, the sixth lens element L6 serving as the most image side lens element of the second lens unit G2 is a lens element composed of a resin and having an aspheric surface. Further, as shown later in Table II-13, the most image side lens element L6 of the second lens unit G2 is set to have a long focal length and hence a low optical power such that the lens element is made thin. By virtue of this, the second lens unit G2 serving as a moving unit is made into light weight. Further, since the optical power is made low so that the influence of assembling error to image quality degradation is suppressed, cemented construction between the fourth lens element L4 and the fifth lens element L5 is permitted so that the thickness of the second lens unit G2 is reduced. As a result, the zoom lens system according to Embodiment II-2 has a reduced weight and a reduced overall optical length at the time of non-use.

As shown in FIG. 13, in the zoom lens system according to Embodiment II-3, the first lens unit G1, in order from the object side to the image side, comprises two lens elements consisting of: a negative meniscus object side lens element L1 having negative optical power and with the convex surface facing the object side; and a positive meniscus image side lens element L2 having positive optical power and with the convex surface facing the object side. In the object side lens element L1, the image side surface is aspheric. In the image side lens element L2, the object side surface is aspheric.

In the zoom lens system according to Embodiment II-3, the second lens unit G2, in order from the object side to the image side, comprises: a bi-convex third lens element L3; a bi-concave fourth lens element L4; and a bi-convex fifth lens element L5. Among these, the third lens element L3 and the fourth lens element L4 are cemented with each other so as to constitute a cemented lens element. Further, the third lens element L3 serving as the most object side lens element of the second lens unit G2 has an aspheric object side surface. Further, the fifth lens element L5 serving as the most image side lens element of the second lens unit G2 is a lens element that has an aspheric object side surface and that is composed of the resin (ZEONEX (registered trademark) manufactured by ZEON CORPORATION).

In the zoom lens system according to Embodiment II-3, the third lens unit G3 comprises solely a bi-convex sixth lens element L6. In the sixth lens element L6, two surfaces are aspheric.

In the zoom lens system according to Embodiment II-3, the fifth lens element L5 serving as the most image side lens element of the second lens unit G2 is a lens element composed of a resin and having an aspheric surface. Further, as shown later in Table II-13, the most image side lens element L5 of the second lens unit G2 is set to have a long focal length and hence a low optical power such that the lens element is made thin. By virtue of this, the second lens unit G2 serving as a moving unit is made into light weight. Further, since the optical power is made low so that the influence of assembling error to image quality degradation is suppressed, cemented construction between the third lens element L3 and the fourth lens element L4 is permitted so that the thickness of the second lens unit G2 is reduced. As a result, the zoom lens system according to Embodiment II-3 has a reduced weight and a reduced overall optical length at the time of non-use.

As shown in FIG. 15, in the zoom lens system according to Embodiment II-4, the first lens unit G1, in order from the object side to the image side, comprises two lens elements consisting of: a negative meniscus object side lens element L1 having negative optical power and with the convex surface facing the object side; and a positive meniscus image side lens element L2 having positive optical power and with the convex surface facing the object side. In the object side lens element L1, the image side surface is aspheric. In the image side lens element L2, the object side surface is aspheric.

In the zoom lens system according to Embodiment II-4, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other so as to constitute a cemented lens element. Further, the third lens element L3 serving as the most object side lens element of the second lens unit G2 has an aspheric object side surface. Further, the sixth lens element L6 serving as the most image side lens element of the second lens unit G2 is a lens element that has an aspheric object side surface and that is composed of the resin (ZEONEX (registered trademark) manufactured by ZEON CORPORATION).

In the zoom lens system according to Embodiment II-4, the third lens unit G3 comprises solely a bi-convex seventh lens element L7. In the seventh lens element L7, two surfaces are aspheric.

In the zoom lens system according to Embodiment II-4, the sixth lens element L6 serving as the most image side lens element of the second lens unit G2 is a lens element composed of a resin and having an aspheric surface. Further, as shown later in Table II-13, the most image side lens element L6 of the second lens unit G2 is set to have a long focal length and hence a low optical power such that the lens element is made thin. By virtue of this, the second lens unit G2 serving as a moving unit is made into light weight. Further, since the optical power is made low so that the influence of assembling error to image quality degradation is suppressed, cemented construction between the fourth lens element L4 and the fifth lens element L5 is permitted so that the thickness of the second lens unit G2 is reduced. As a result, the zoom lens system according to Embodiment II-4 has a reduced weight and a reduced overall optical length at the time of non-use.

As such, in the zoom lens system according to Embodiments II-1 to II-4, the lens units G1 to G3 are arranged in a desired optical power construction so that size reduction is achieved in the entire lens system in a state that excellent optical performance is satisfied.

In particular, in the zoom lens system according to Embodiments II-1 to II-4, the first lens unit G1 is composed of one object side lens element having negative optical power and one image side lens element having positive optical power. Further, the second lens unit G2 contains a cemented lens element composed of a positive lens element and a negative lens element, while the third lens unit G3 is composed of one lens element. As such, the zoom lens system according to Embodiments II-1 to II-4 realizes a lens system that has a small number of lens elements constituting each lens unit and a reduced overall optical length at the time of non-use.

Further, in particular, in the zoom lens system according to Embodiments II-1 to II-4, a lens element composed of a resin and having at least one aspheric surface is employed as the most image side lens element of the second lens unit G2. This permits weight reduction of the entire lens system in a state that the excellent optical performance is maintained. Further, in such a lens element composed of a resin, a manufacturing error is reduced, and hence mass-production can be performed relatively easily. Here, the lens element composed of a resin employed in the most image side lens element is not limited to particular one, as long as being in accordance with the object of the present invention. For example, a lens element may be employed that is formed with a synthetic resin such as polymethylmethacrylate, polycarbonate, polystyrene and styrene-acrylonitrile copolymer generally employed as the material of an optical lens into a shape where at least one surface is aspheric.

Further, in the zoom lens system according to Embodiments II-1 to II-4, one bi-convex lens element constituting the third lens unit G3 has at least one aspheric surface. By virtue of this, in the zoom lens system according to Embodiments II-1 to II-4, in particular, the amount of deviation in the image formation position at every image height can be reduced remarkably.

Conditions are described below that are to be satisfied by a zoom lens system like the zoom lens system according to Embodiments II-1 to II-4 that forms an optical image of an object with variable magnification and that, in order from the object side to the image side, comprises a first lens unit having negative optical power, a second lens unit having positive optical power, and a third lens unit having positive optical power, wherein the first lens unit is composed of one object side lens element and one image side lens element having positive optical power, and wherein the most image side lens element constituting the second lens unit is a lens element composed of a resin and having at least one aspheric surface. Here, a plurality of conditions to be satisfied are set forth for the zoom lens system according to each embodiment. A construction that satisfies all the conditions is most desirable for the zoom lens system. However, when an individual condition is satisfied, a zoom lens system providing the corresponding effect can be obtained.

For example, a zoom lens system like the zoom lens system according to Embodiments II-1 to II-4 is characterized in that the following condition (II-1) is satisfied.

$$0.7 < f_2/f_{2r} < 1.5 \quad \text{(II-1)}$$

where, $f_2$ is a composite focal length of the second lens unit, and
$f_{2r}$ is a focal length of the most image side lens element of the second lens unit.

The condition (II-1) sets forth the ratio between the focal length of the entire second lens unit and the focal length of the most image side lens element of the second lens unit so as to avoid a situation that the aberration sensitivity of the most image side lens element in the second lens unit increases excessively. When the value goes below the lower limit of the condition (II-1), the optical power of the second lens unit decreases. Thus, in order that a zoom ratio of 3 or greater should be achieved, the moving distance of the second lens unit need be increased. This causes difficulty in size reduction. In contrast, when the value exceeds the upper limit of the condition (II-1), the optical power of the second lens unit increases. This causes difficulty in satisfactory compensation of the aberration generated in the second lens unit, which is to be performed by the first lens unit and the third lens unit.

Here, when at least one of the following conditions (II-1)' and (II-1)'' is further satisfied, the above-mentioned effect is achieved more successfully.

$$0.8 < f_2/f_{2r} \quad \text{(II-1)'}$$

$$f_2/f_{2r} < 1.1 \quad \text{(II-1)''}$$

Further, in a zoom lens system like the zoom lens system according to Embodiments II-1 to II-4, it is preferable that the following condition (II-2) is satisfied.

$$0.2 < f_W/f_{2r} < 0.6 \quad \text{(II-2)}$$

(here, $\omega_W > 37$)

where, $f_W$ is a focal length of the entire system at a wide-angle limit,
$f_{2r}$ is a focal length of the most image side lens element of the second lens unit, and
$\omega_W$ is a half view angle at a wide-angle limit.

The condition (II-2) sets forth an appropriate focal length of the most image side lens element of the second lens unit. When the condition (II-2) is satisfied, a situation is avoided that the aberration sensitivity of the most image side lens element in all the lens units increases excessively.

Here, when at least one of the following conditions (II-2)' and (II-2)'' is further satisfied, the above-mentioned effect is achieved more successfully.

$$0.35 < f_W/f_{2r} \quad \text{(II-2)'}$$

$$f_W/f_{2r} < 0.45 \quad \text{(II-2)''}$$

(here, $\omega_W > 37$)

Further, in a zoom lens system like the zoom lens system according to Embodiments II-1 to II-4, it is preferable that the following condition (II-3) is satisfied.

$$T2/Y > 0.8 \quad \text{(II-3)}$$

where,

T2 is a center thickness of the second lens unit, and
Y is a maximum image height.

The condition (II-3) sets forth the center thickness of the second lens unit. When the condition (II-3) is satisfied, a situation is avoided that the thickness becomes excessively small and hence that satisfactory aberration compensation cannot be achieved.

Here, when the following condition (II-3)' is further satisfied, the above-mentioned effect is achieved more successfully. Further, when the following condition (II-3)" is satisfied, a possibility is avoided that the thickness of the second lens unit increases excessively and so does the overall optical length at the time of non-use.

$$T2/Y>0.83 \tag{II-3)'}$$

$$1.10>T2/Y \tag{II-3)''}$$

Further, in a zoom lens system like the zoom lens system according to Embodiments II-1 to II-4 in which the second lens unit has at least a cemented lens element composed of a positive lens element and a negative lens element, it is preferable that the following conditions (II-4) and (II-5) are satisfied.

$$-20<Rc/Y<-1 \tag{II-4}$$

$$2.0<(T1+T2+T3)/Y<3.5 \tag{II-5}$$

where,

Rc is a radius of curvature of a cemented surface of the cemented lens element in the second lens unit, Y is a maximum image height, T1 is a center thickness of the first lens unit, T2 is a center thickness of the second lens unit, and T3 is a center thickness of the third lens unit.

The condition (II-4) sets forth the radius of curvature of the cemented surface in the cemented lens element constituting the second lens unit. The condition (II-5) sets forth the total center thickness of the lens units. When these conditions (II-4) and (II-5) are satisfied, a situation is avoided that the optical power of the lens element located on the most object side of the second lens unit increases excessively. Further, a possibility is avoided that the total thickness of the lens units increases excessively and so does the overall optical length at the time of non-use.

Here, when at least one of the following conditions (II-4)', (II-4)", (II-5)' and (II-5)" is further satisfied, the above-mentioned effect is achieved more successfully.

$$-12<Rc/Y \tag{II-4)'}$$

$$Rc/Y<-2 \tag{II-4)''}$$

$$2.3<(T1+T2+T3)/Y \tag{II-5)'}$$

$$(T1+T2+T3)/Y<3.1 \tag{II-5)''}$$

Further, in a zoom lens system like the zoom lens system according to Embodiments II-1 to II-4 in which the third lens unit is composed of one bi-convex lens element having at least one aspheric surface, it is preferable that the following conditions (II-6) and (II-7) are satisfied.

$$f_{3r}/f_T<1.5 \tag{II-6}$$

$$T3/Y<0.8 \tag{II-7}$$

(here, $\omega_T<15$)
where, $f_{3r}$ is a focal length of the bi-convex lens element of the third lens unit, $f_T$ is a focal length of the entire system at a telephoto limit, T3 is a center thickness of the third lens unit, Y is a maximum image height, and $\omega_T$ is a half view angle at a telephoto limit.

The condition (II-6) sets forth an appropriate focal length of the bi-convex lens element constituting the third lens unit. Further, the condition (II-7) sets forth the center thickness of the third lens unit. When these conditions (II-6) and (II-7) are satisfied, the aberration sensitivity of the third lens unit is reduced relative to all the lens units. This avoids easy occurrence of performance degradation caused by the movement of the third lens unit at each zooming position. Further, a possibility is avoided that the thickness of the third lens unit increases excessively and so does the overall optical length at the time of non-use.

Here, when at least one of the following conditions (II-6)' and (II-7)' is further satisfied, the above-mentioned effect is achieved more successfully. Moreover, when at least one of the following conditions (II-6)" and (II-7)" is satisfied, a situation is avoided that the moving distance of the third lens unit increases excessively during focusing.

$$f_{3r}/f_T<1.3 \tag{II-6)'}$$

$$1.0<f_{3r}/f_T \tag{II-6)''}$$

$$T3/Y<0.5 \tag{II-7)'}$$

$$0.2<T3/Y \tag{II-7)''}$$

(here, $\omega_T<15$)

Here, the lens units constituting the zoom lens system of Embodiments II-1 to II-4 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Further, in the zoom lens system according to Embodiments II-1 to II-4, a reflecting surface may be arranged in the optical path so that the optical path may be bent before or after the zoom lens system or alternatively in the middle. The bending position may be set up arbitrarily depending on the necessity. When the optical path is bent appropriately, thickness reduction in appearance can be achieved in a camera.

Further, the zoom lens system according to Embodiments II-1 to II-4 has been described for the construction that a plate P equivalent to an optical low-pass filter is arranged between the most image side surface of the third lens element G3 and the image surface S. This low-pass filter may be a birefringent type low-pass filter made of, for example, a crystal whose predetermined crystal orientation is adjusted; or a phase type low-pass filter that achieves required characteristics of optical cut-off frequency by diffraction. Further, this plate P may be arranged depending on the necessity.

As described above, according to the present Embodiments II-1 to II-4, a zoom lens system can be obtained in which curvature of field is compensated satisfactorily and which has a reduced weight and a reduced overall optical length at the time of non-use.

Embodiments III-1 to III-4

Figure 17:
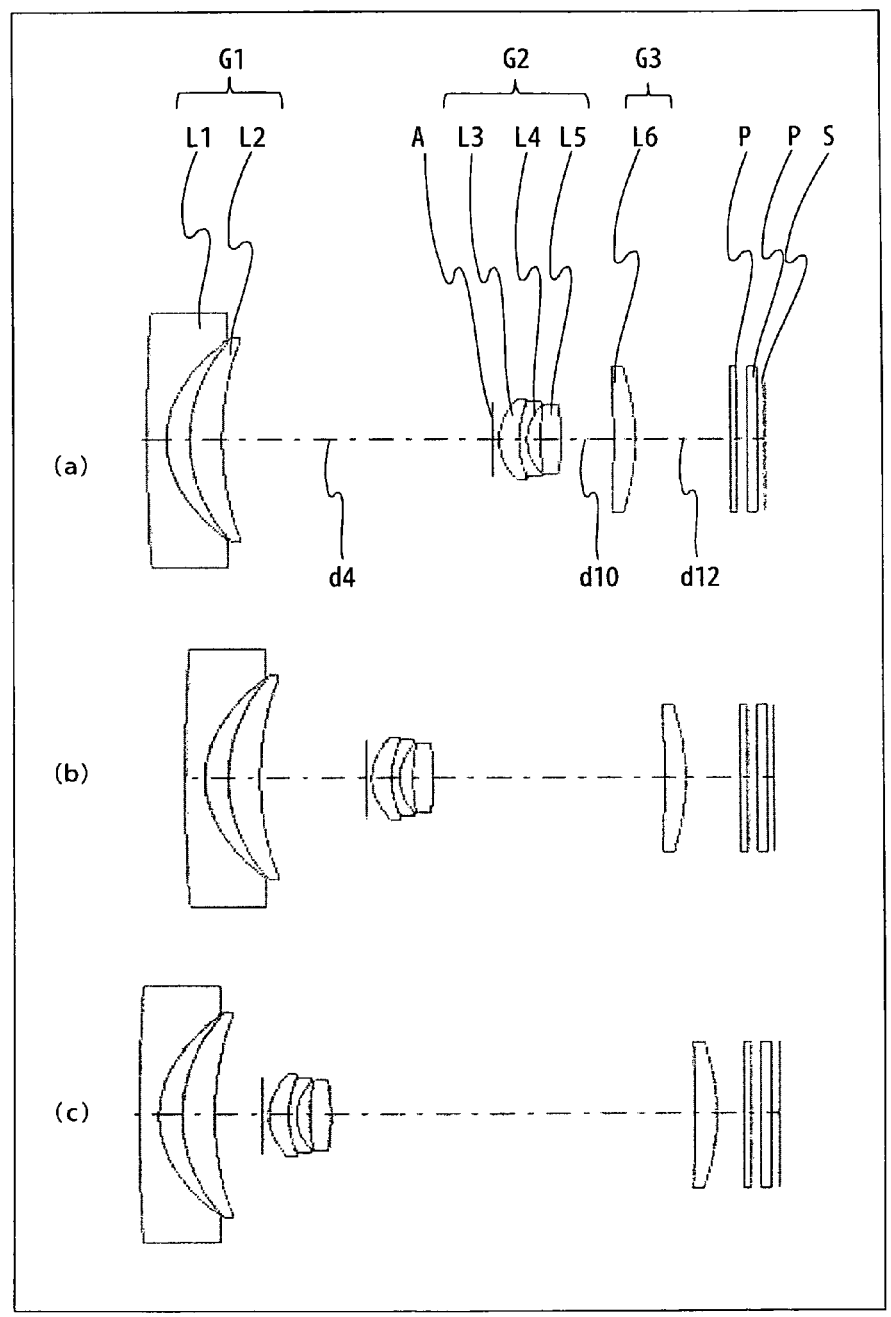
FIG. 17 is a configuration diagram of a zoom lens system according to Embodiment III-1 (Example III-1)
Figure 19:
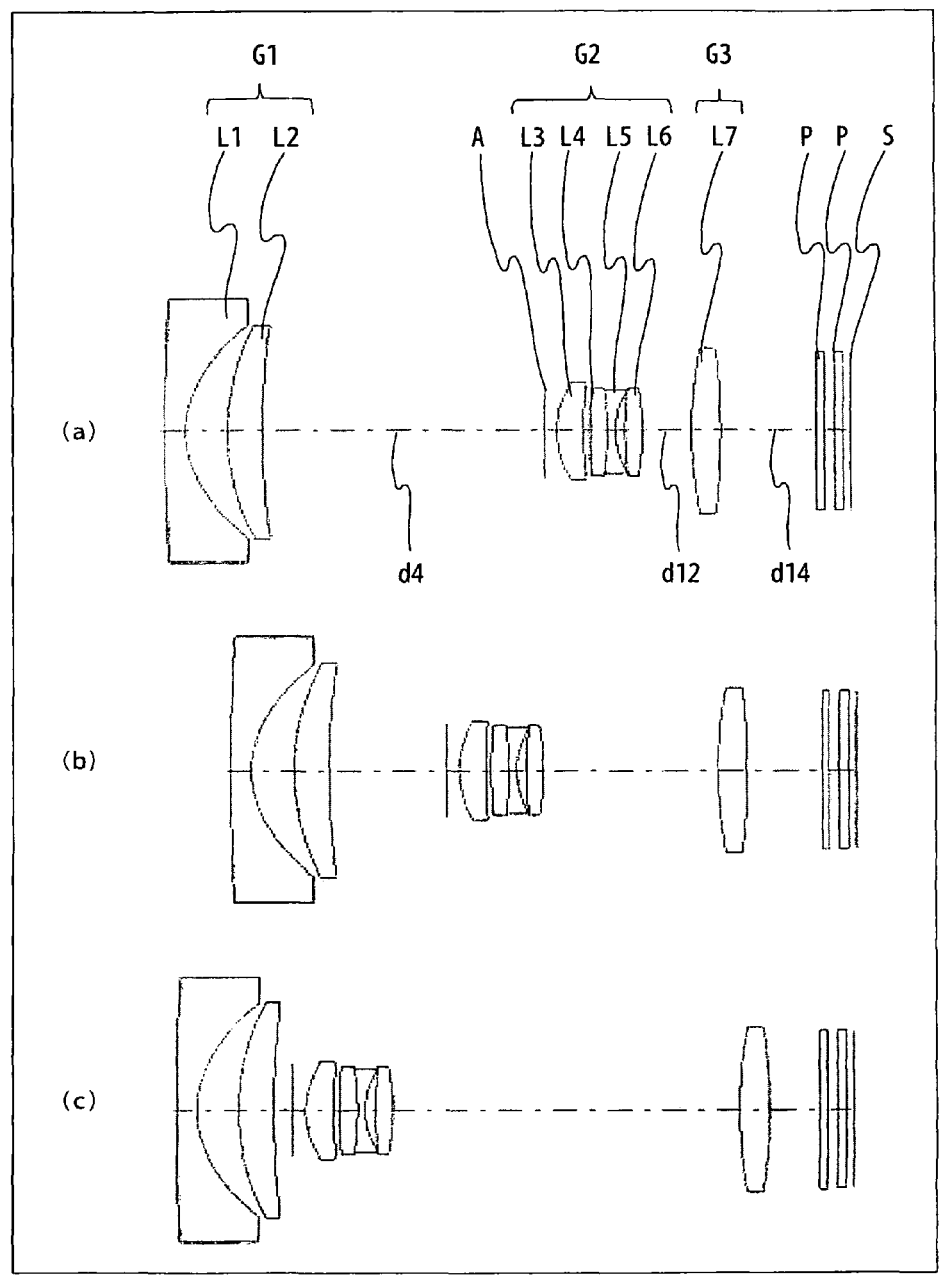
FIG. 19 is a configuration diagram of a zoom lens system according to Embodiment III-2 (Example III-2)
Figure 21:
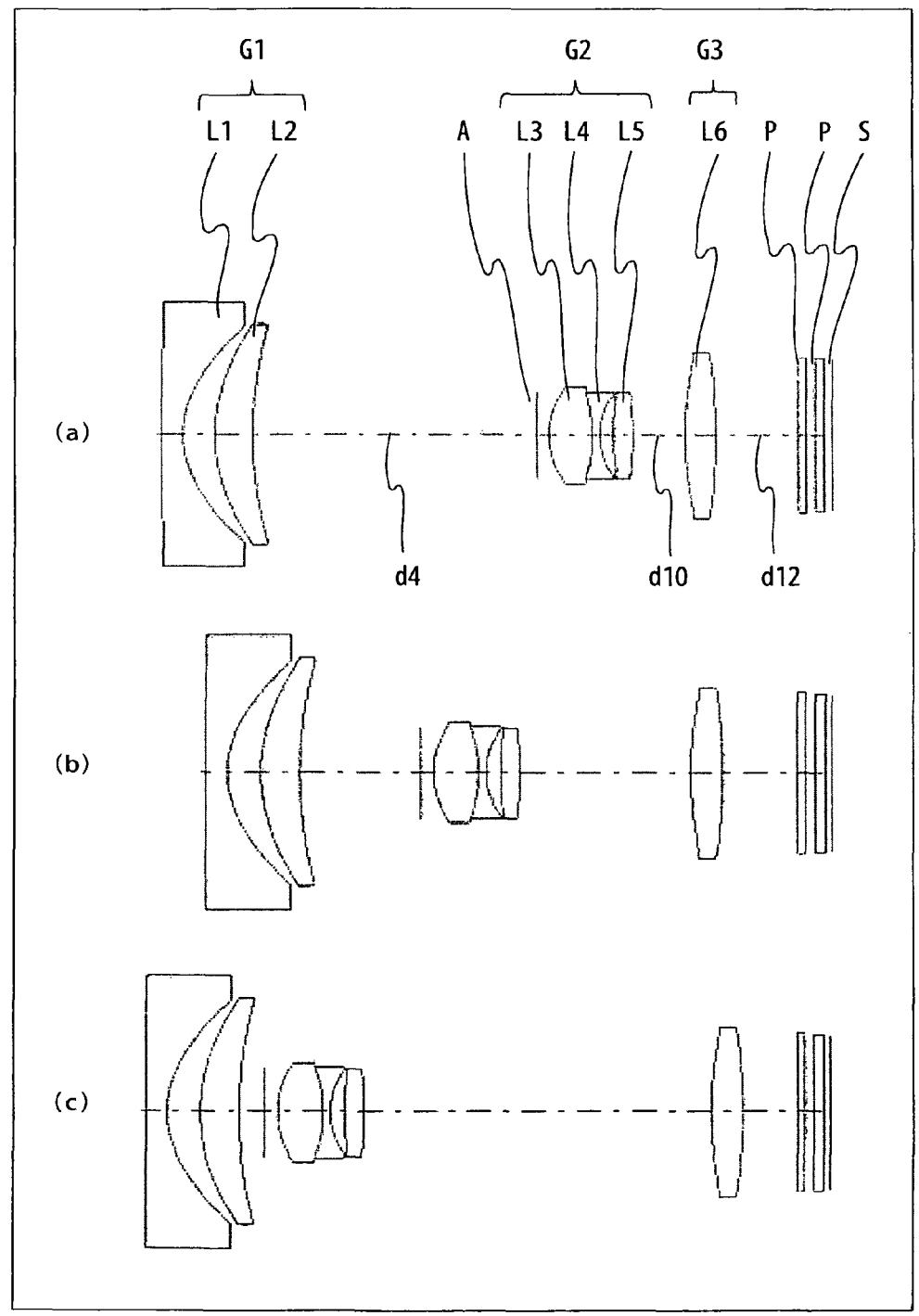
FIG. 21 is a configuration diagram of a zoom lens system according to Embodiment III-3 (Example III-3)
Figure 23:
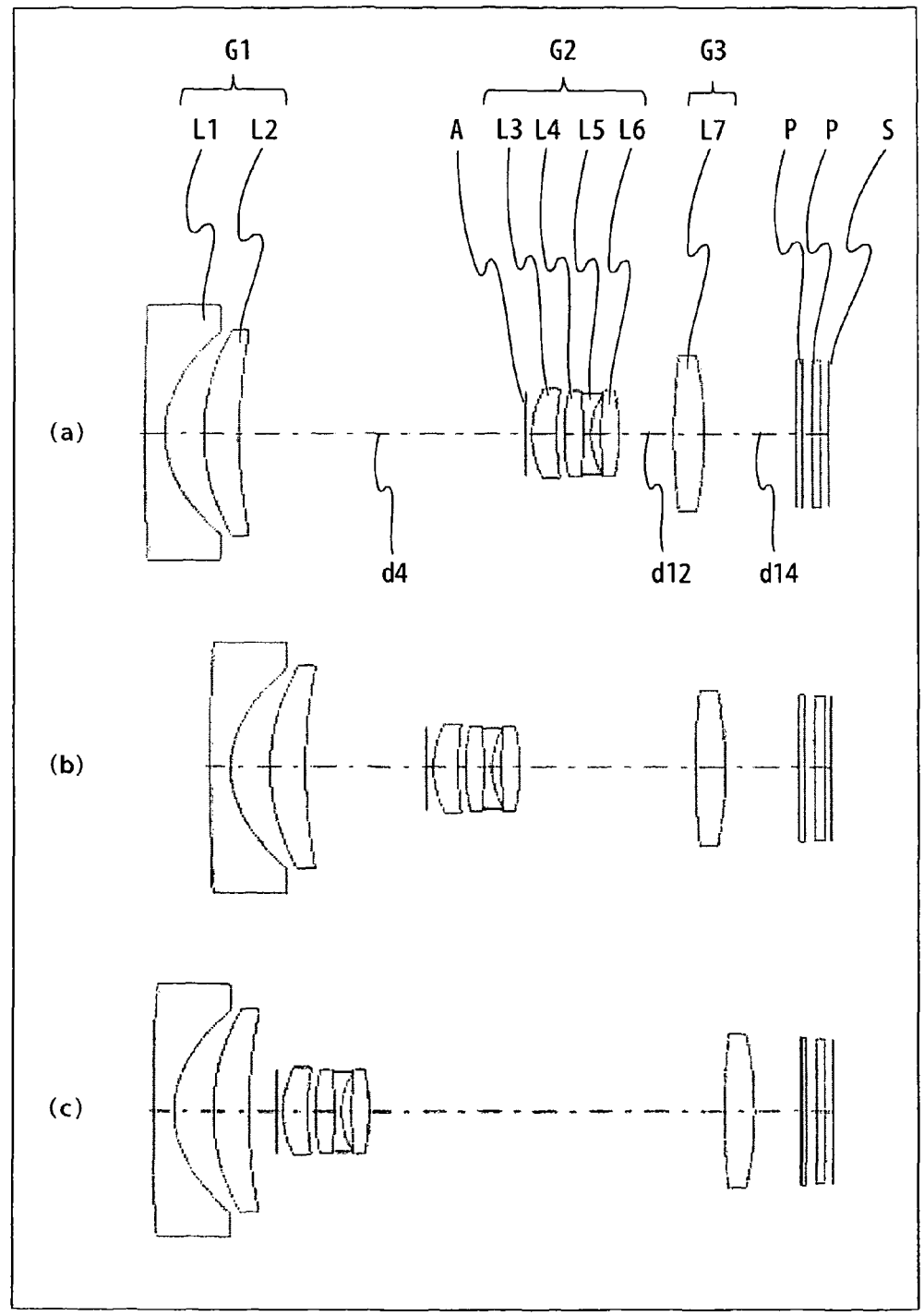
FIG. 23 is a configuration diagram of a zoom lens system according to Embodiment III-4 (Example III-4)

FIG. 17 is a lens configuration diagram of a zoom lens system according to Embodiment III-1. FIG. 19 is a lens configuration diagram of a zoom lens system according to Embodiment III-2. FIG. 21 is a lens configuration diagram of a zoom lens system according to Embodiment III-3. FIG. 23 is a lens configuration diagram of a zoom lens system according to Embodiment III-4. Each configuration diagram shows a zoom lens system in an infinity in-focus condition. In each diagram, part (a) shows a lens configuration at a wide-angle limit (in the minimum focal length condition: focal length $f_W$). Part (b) shows a lens configuration at an approximately middle position (in an intermediate focal length condition: focal length $f_M = \sqrt{(f_W \cdot f_T)}$). Part (c) shows a lens configuration at a telephoto limit (in the maximum focal length condition: focal length $f_T$).

Each zoom lens system according to Embodiments III-1 to III-4, in order from the object side to the image side, comprises: a first lens unit G1 having negative optical power; a diaphragm A; a second lens unit G2 having positive optical power; and a third lens unit G3 having positive optical power. In the zoom lens system according to Embodiments III-1 to III-4, in zooming from a wide-angle limit to a telephoto limit, the first lens unit G1 moves with locus of a convex to the image side, while the second lens unit G2 and the diaphragm A monotonically move to the object side, and while the third lens unit G3 moves with changing the interval with the second lens unit G2. That is, in the zoom lens system according to Embodiments III-1 to III-4, in zooming from a wide-angle limit to a telephoto limit, the lens units move respectively along the optical axis in such a manner that the interval between the first lens unit G1 and the second lens unit G2 should decrease while the interval between the second lens unit G2 and the third lens unit G3 should vary.

In FIGS. 17, 19, 21 and 23, the straight line located on the most right-hand side indicates the position of the image surface S of an image sensor such as a CCD. On the object side relative to this, a plate P is provided that is composed of a parallel plate or a cover glass plate equivalent to an optical low-pass filter or a face plate of an image sensor or the like.

As shown in FIG. 17, in the zoom lens system according to Embodiment III-1, the first lens unit G1, in order from the object side to the image side, comprises two lens elements consisting of: a negative meniscus object side lens element L1 having negative optical power and with the convex surface facing the object side; and a positive meniscus image side lens element L2 having positive optical power and with the convex surface facing the object side. In each of the object side lens element L1 and the image side lens element L2, the image side surface is aspheric.

In the zoom lens system according to Embodiment III-1, the second lens unit G2, in order from the object side to the image side, comprises: a positive meniscus third lens element L3 with the convex surface facing the object side; a negative meniscus fourth lens element L4 with the convex surface facing the object side; and a bi-convex fifth lens element L5. Among these, the third lens element L3 and the fourth lens element L4 are cemented with each other so as to constitute a positive cemented lens element. Further, the third lens element L3 serving as the most object side lens element of the second lens unit G2 has an aspheric object side surface.

Further, in the zoom lens system according to Embodiment III-1, the third lens unit G3 comprises solely a positive meniscus sixth lens element L6 with the convex surface facing the image side. In the sixth lens element L6, the image side surface is aspheric.

In the zoom lens system according to Embodiment III-1, as shown later in Table III-13, the image side lens element L2 constituting the first lens unit G1 has a notably high refractive index. Thus, in the object side lens element L1, the lens center thickness can be reduced in a state that the thickness at large light ray height is easily ensured. Thus, the zoom lens system according to Embodiment III-1 has a reduced overall optical length at the time of non-use.

As shown in FIG. 19, in the zoom lens system according to Embodiment III-2, the first lens unit G1, in order from the object side to the image side, comprises two lens elements consisting of: a negative meniscus object side lens element L1 having negative optical power and with the convex surface facing the object side; and a positive meniscus image side lens element L2 having positive optical power and with the convex surface facing the object side. In the object side lens element L1, the image side surface is aspheric. In the image side lens element L2, the object side surface is aspheric.

In the zoom lens system according to Embodiment III-2, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other so as to constitute a cemented lens element. Further, each of the third lens element L3 serving as the most object side lens element and the sixth lens element L6 serving as the most image side lens element in the second lens unit G2 has an aspheric object side surface.

In the zoom lens system according to Embodiment III-2, the third lens unit G3 comprises solely a bi-convex seventh lens element L7. In the seventh lens element L7, the object side surface is aspheric.

In the zoom lens system according to Embodiment III-2, as shown later in Table III-13, the image side lens element L2 constituting the first lens unit G1 has a notably high refractive index. Thus, in the object side lens element L1, the lens center thickness can be reduced in a state that the thickness at large light ray height is easily ensured. Thus, the zoom lens system according to Embodiment III-2 has a reduced overall optical length at the time of non-use.

As shown in FIG. 21, in the zoom lens system according to Embodiment III-3, the first lens unit G1, in order from the object side to the image side, comprises two lens elements consisting of: a negative meniscus object side lens element L1 having negative optical power and with the convex surface facing the object side; and a positive meniscus image side lens element L2 having positive optical power and with the convex surface facing the object side. In the object side lens element L1, the image side surface is aspheric. In the image side lens element L2, the object side surface is aspheric.

Further, in the zoom lens system according to Embodiment III-3, the second lens unit G2, in order from the object side to the image side, comprises: a bi-convex third lens element L3; a bi-concave fourth lens element L4; and a bi-convex fifth lens element L5. Among these, the third lens element L3 and the fourth lens element L4 are cemented with each other so as to constitute a positive cemented lens element. Further, each of the third lens element L3 serving as the most object side lens element and the fifth lens element L5 serving as the most image side lens element of the second lens unit G2 has an aspheric object side surface.

In the zoom lens system according to Embodiment III-3, the third lens unit G3 comprises solely a bi-convex sixth lens element L6. In the sixth lens element L6, two surfaces are aspheric.

In the zoom lens system according to Embodiment III-3, as shown later in Table III-13, the image side lens element L2 constituting the first lens unit G1 has a notably high refractive index. Thus, in the object side lens element L1, the lens center thickness can be reduced in a state that the thickness at large light ray height is easily ensured. Thus, the zoom lens system according to Embodiment III-3 has a reduced overall optical length at the time of non-use.

As shown in FIG. 23, in the zoom lens system according to Embodiment III-4, the first lens unit G1, in order from the object side to the image side, comprises two lens elements consisting of: a negative meniscus object side lens element L1 having negative optical power and with the convex surface facing the object side; and a positive meniscus image side lens element L2 having positive optical power and with the convex surface facing the object side. In the object side lens element L1, the image side surface is aspheric. In the image side lens element L2, the object side surface is aspheric.

In the zoom lens system according to Embodiment III-4, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other so as to constitute a cemented lens element. Further, each of the third lens element L3 serving as the most object side lens element and the sixth lens element L6 serving as the most image side lens element in the second lens unit G2 has an aspheric object side surface.

In the zoom lens system according to Embodiment III-4, the third lens unit G3 comprises solely a bi-convex seventh lens element L7. In the seventh lens element L7, two surfaces are aspheric.

In the zoom lens system according to Embodiment III-4, as shown later in Table III-13, the image side lens element L2 constituting the first lens unit G1 has a notably high refractive index. Thus, in the object side lens element L1, the lens center thickness can be reduced in a state that the thickness at large light ray height is easily ensured. Thus, the zoom lens system according to Embodiment III-4 has a reduced overall optical length at the time of non-use.

As such, in the zoom lens system according to Embodiments III-1 to III-4, the lens units G1 to G3 are arranged in a desired optical power construction so that size reduction is achieved in the entire lens system in a state that excellent optical performance is satisfied.

In particular, in the zoom lens system according to Embodiments III-1 to III-4, the first lens unit G1 is composed of one object side lens element having negative optical power and one image side lens element having positive optical power. Further, the second lens unit G2, in order from the object side to the image side, comprises one set of positive cemented lens element and one positive lens element, or alternatively has such a construction that one set of cemented lens element is placed between positive lens elements each arranged on the object side or the image side. Moreover, the third lens unit G3 is composed of one lens element. As such, the zoom lens system according to Embodiments III-1 to III-4 realizes a lens system that has a small number of lens elements constituting each lens unit and a reduced overall optical length at the time of non-use.

Here, as described above, in the zoom lens system according to Embodiments III-1 to III-4, the second lens unit G2 is composed of one set of positive cemented lens element and one positive lens element or alternatively has such a construction that one set of cemented lens element is placed between positive lens elements each arranged on the object side or the image side. Instead, the second lens unit G2 may comprise two sets of positive cemented lens elements each composed of two lens elements, so that a lens system can be realized that has a reduced overall optical length at the time of non-use.

Further, in the zoom lens system according to Embodiments III-1 to III-4, each of the object side lens element and the image side lens element constituting the first lens unit G1 has an aspheric surface. Thus, the zoom lens system according to Embodiments III-1 to III-4 has excellent optical performance, for example, in compensation of curvature of field.

Conditions are described below that are to be satisfied by a zoom lens system like the zoom lens system according to Embodiments III-1 to III-4 that forms an optical image of an object with variable magnification of a factor of 3 or greater and that, in order from the object side to the image side, comprises a first lens unit having negative optical power, a second lens unit having positive optical power, and a third lens unit having positive optical power, wherein the first lens unit is composed of one object side lens element and one image side lens element, and wherein the object side lens element has negative optical power while the image side lens element has positive optical power. Here, a plurality of conditions to be satisfied are set forth for the zoom lens system according to each embodiment. A construction that satisfies all the conditions is most desirable for the zoom lens system. However, when an individual condition is satisfied, a zoom lens system providing the corresponding effect can be obtained.

For example, a zoom lens system like the zoom lens system according to Embodiments III-1 to III-4 is characterized in that the following condition (III-1) is satisfied.

$$1.5 < f_2/f_W < 2.8 \tag{III-1}$$

(here, $\omega_W > 36$)

where, $f_2$ is a composite focal length of the second lens unit, $f_W$ is a focal length of the entire system at a wide-angle limit, and $\omega_W$ is a half view angle at a wide-angle limit.

The condition (III-1) sets forth an appropriate focal length of the second lens unit. When the value goes below the lower limit of the condition (III-1), the optical power of the second lens unit decreases. Thus, in order that a zoom ratio of 3 or greater should be achieved, the moving distance of the second lens unit need be increased. This causes difficulty in size reduction. In contrast, when the value exceeds the upper limit of the condition (III-1), the optical power of the second lens unit increases. This causes difficulty in satisfactory compensation of the aberration generated in the second lens unit, which is to be performed by the first lens unit and the third lens unit.

Here, when at least one of the following conditions (III-1)' and (III-1)'' is further satisfied, the above-mentioned effect is achieved more successfully.

$$2.0 < f_2/f_W \tag{III-1}'$$

$$f_2/f_W < 2.7 \tag{III-1}''$$

(here, $\omega_W > 36$)

Further, in a zoom lens system like the zoom lens system according to Embodiments III-1 to III-4, it is preferable that the following conditions (III-2), (III-3), (III-4), (III-5) and (III-6) are satisfied.

$$n12 > 1.91 \tag{III-2}$$

$$v12 < 29 \tag{III-3}$$

$$n11 > 1.50 \tag{III-4}$$

$$v11 > 35 \tag{III-5}$$

$$n12 - n11 > 0.10 \tag{III-6}$$

where, n12 is a refractive index of the image side lens element of the first lens unit, v12 is an Abbe number of the image side lens element of the first lens unit, n11 is a refractive index of the object side lens element of the first lens unit, and v11 is an Abbe number of the object side lens element of the first lens unit.

The conditions (III-2) and (III-3) set forth the refractive index and the Abbe number of the image side lens element constituting the first lens unit. When these conditions (III-2) and (III-3) are satisfied, the center thickness of the image side lens element becomes small, while curvature of field on a wide-angle limit side is suppressed without the necessity of a large curvature, in particular, a large curvature of the image side surface, so that the edge thickness is easily ensured. Thus, the thickness of the first lens unit can be reduced. This reduces the thickness of the entire zoom lens system and hence the overall optical length at the time of non-use.

The conditions (III-4) and (III-5) set forth the refractive index and the Abbe number of the object side lens element constituting the first lens unit. The condition (III-6) is necessary for satisfactorily compensating chromatic aberration of a zoom lens system in which the first lens unit is a negative lead type and has negative optical power, and in which the first lens unit is composed of an object side lens element having negative optical power and an image side lens element having positive optical power. When these conditions (III-4), (III-5) and (III-6) are satisfied, a possibility is avoided that the optical axial thickness of the lens element increases with increasing light ray height and that when the center thickness is increased for the purpose of improvement in manufacturability, the thickness of the entire first lens unit increases further. At the same time, chromatic aberration can be compensated satisfactorily.

Here, when at least one of the following conditions (III-2)', (III-3)', (III-4)', (III-5)' and (III-6)' is further satisfied, the above-mentioned effect is achieved more successfully. In particular, when the condition (III-2)' described below is satisfied, the image side lens element of the first lens unit can have a high Z-value (difference between curvature of the object side surface and curvature of the image side surface) so that the centering of the lens becomes easier. Further, in particular, when the condition (III-3)' described below is satisfied, chromatic aberration generated in the first lens unit can be compensated more satisfactorily. Further, when the following condition (III-5)" is satisfied, chromatic aberration generated in the first lens unit can be compensated yet more satisfactorily.

$$n12 > 1.95 \quad \text{(III-2)'}$$

$$v12 < 23 \quad \text{(III-3)'}$$

$$n11 > 1.70 \quad \text{(III-4)'}$$

$$v11 > 38 \quad \text{(III-5)'}$$

$$42 > v11 \quad \text{(III-5)''}$$

$$n12 - n11 > 0.18 \quad \text{(III-6)'}$$

Further, in a zoom lens system like the zoom lens system according to Embodiments III-1 to III-4, it is preferable that the following condition (III-7) is satisfied.

$$T1/d12 > 2.0 \quad \text{(III-7)}$$

where,

T1 is a center thickness of the first lens unit, and d12 is a center interval between the object side lens element and the image side lens element of the first lens unit.

The condition (III-7) sets forth the center thickness of the first lens unit. When the condition (III-7) is satisfied, curvature of field is compensated satisfactorily, and a situation is avoided that the Z-value of the object side lens element of the first lens unit increases excessively. Thus, in a state that a high Z-value of the image side lens element is ensured, a possibility is avoided that the thickness of the first lens unit increases excessively and so does the overall optical length at the time of non-use.

Here, when the following condition (III-7)' is further satisfied, the above-mentioned effect is achieved more successfully. Further, when the following condition (III-7)" is satisfied, a possibility is avoided that the thickness of the first lens unit increases excessively. Thus, the size at the time of non-use can be reduced.

$$T1/d12 > 2.3 \quad \text{(III-7)'}$$

$$3.3 > T1/d12 \quad \text{(III-7)''}$$

Further, in a zoom lens system like the zoom lens system according to Embodiments III-1 to III-4, it is preferable that the following condition (III-8) is satisfied.

$$T2/Y > 0.8 \quad \text{(III-8)}$$

where,

T2 is a center thickness of the second lens unit, and

Y is a maximum image height.

The condition (III-8) sets forth the center thickness of the second lens unit. When the condition (III-8) is satisfied, a situation is avoided that the thickness of the second lens unit becomes excessively small and that satisfactory aberration compensation cannot be achieved.

Here, when the following condition (III-8)' is further satisfied, the above-mentioned effect is achieved more successfully. Further, when the following condition (III-8)" is satisfied, a possibility is avoided that the thickness of the second lens unit increases excessively and so does the overall optical length at the time of non-use.

$$T2/Y > 0.82 \quad \text{(III-8)'}$$

$$1.25 > T2/Y \quad \text{(III-8)''}$$

Here, the lens units constituting the zoom lens system of Embodiments III-1 to III-4 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Further, in the zoom lens system according to Embodiments III-1 to III-4, a reflecting surface may be arranged in the optical path so that the optical path may be bent before or after the zoom lens system or alternatively in the middle. The bending position may be set up arbitrarily depending on the necessity. When the optical path is bent appropriately, thickness reduction in appearance can be achieved in a camera.

Further, the zoom lens system according to Embodiments III-1 to III-4 has been described for the construction that a plate P equivalent to an optical low-pass filter is arranged between the most image side surface of the third lens element G3 and the image surface S. This low-pass filter may be a birefringent type low-pass filter made of, for example, a crystal whose predetermined crystal orientation is adjusted; or a phase type low-pass filter that achieves required characteristics of optical cut-off frequency by diffraction. Further, this plate P may be arranged depending on the necessity.

As described above, according to the present Embodiments III-1 to III-4, a zoom lens system can be obtained that has a zoom ratio of 3 or greater, satisfactory curvature of field compensation, a small first lens unit thickness and a reduced overall optical length at the time of non-use.

Embodiment 5

Figure 25:
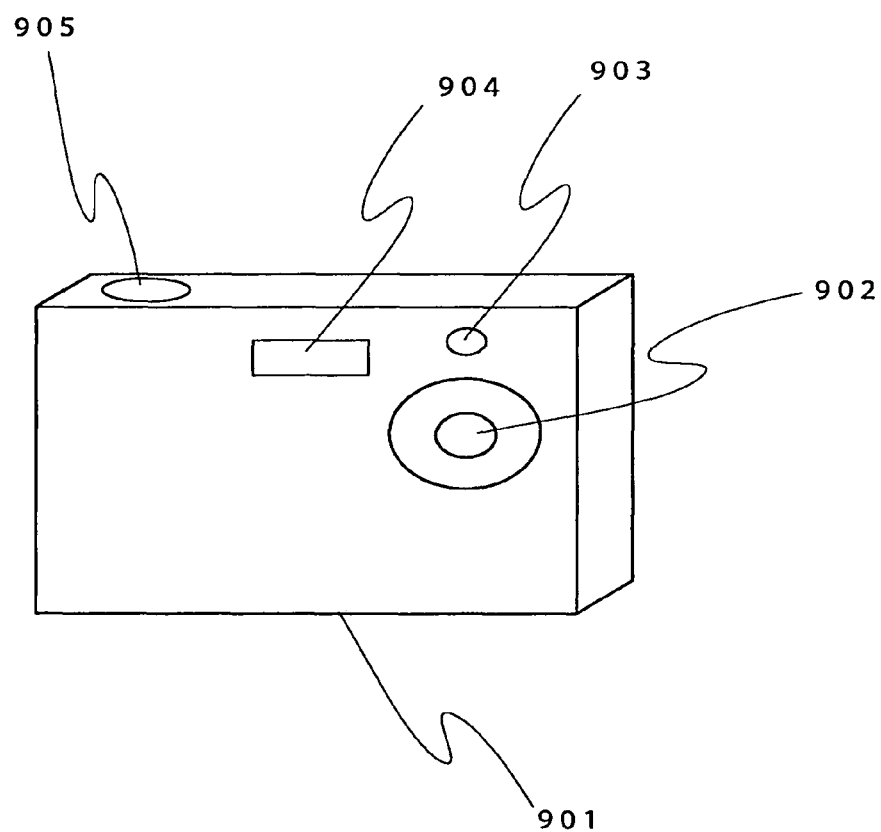
FIG. 25 is a schematic perspective view of a digital still camera according to Embodiment 5.

FIG. 25 is a schematic perspective view of a digital still camera serving as an example of a camera according to Embodiment 5. In FIG. 25, the digital still camera comprises: a main body 901; an imaging device 902 provided with a zoom lens system and an image sensor such as a CCD and a CMOS; a separate optical finder 903; a stroboscope 904; and a release button 905. The zoom lens system in the imaging device 902 is a zoom lens system according to Embodiment I-1.

As such, when the zoom lens system according to Embodiment I-1 is employed in a digital still camera, a digital still camera can be provided that has a reduced thickness and excellent portability as well as high performance. Here, the digital still camera shown in FIG. 25 may employ any one of the zoom lens systems according to Embodiments I-2 to I-4, II-1 to II-4 and III-1 to III-4 in place of the zoom lens system according to Embodiment I-1. Further, the optical system of the digital still camera shown in FIG. 25 is applicable also to a digital video camera for moving images. In this case, moving images with a high resolution can be acquired in addition to still images.

Further, an imaging device comprising a zoom lens system according to Embodiments I-1 to I-4, II-1 to II-4 and III-1 to III-4 described above and an image sensor such as a CCD and a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments I-1 to I-4, II-1 to II-4 and III-1 to III-4 are implemented. In the numerical examples, the units of the length in the tables are all mm. Moreover, r is the radius of curvature, d is the axial distance, nd is the refractive index to the d-line, and vd is the Abbe number to the d-line. Further, in each numerical example, the surface marked with * indicates an aspheric surface. The sag z of the aspheric surface is expressed by the following Formula A in Examples I-1 to I-4, and by the following Formula B in Examples II-1 to II-4 and III-1 to III-4.

$$Z = \frac{(1/CR) \cdot H^2}{1 + \sqrt{1 - (1+K) \cdot (1/CR)^2 \cdot H^2}} + \sum_{n=4}^{16} An \cdot H^n \quad \text{Formula A}$$

Here, a cylindrical coordinate system is adopted in which the axis in the direction going to the image surface side on the optical axis is defined as the z-axis and in which the axis in a direction departing perpendicularly from the optical axis is defined as the H-axis. Further, CR is the paraxial radius of curvature (mm), K is the conic coefficient, and An is the n-th aspheric coefficient.

$$z = \frac{ch^2}{1 + \sqrt{\{1-(1+k)c^2h^2\}}} + Ah^4 + Bh^6 + Ch^8 + Dh^{10} + Eh^{12} + Fh^{14} \quad \text{Formula B}$$

Here, h is the height from the optical axis, c is the curvature, k is the conic constant, and A, B, C, D, E and F are the fourth-order, sixth-order, eighth-order, tenth-order, twelfth-order and fourteenth-order aspherical coefficients, respectively.

Example I-1

The zoom lens system of Example I-1 corresponds to Embodiment I-1 shown in FIG. 1. Table I-1 shows the lens data of the zoom lens system of Example I-1. Table I-2 shows the focal length f, the F-number FNo, the overall optical length L, the half view angle ω, and the variable axial distance data d4, d10 and d12 in a case that the shooting distance is infinity. Table I-3 shows the aspherical data.

TABLE I-1

| Lens unit | Lens element | Surface number | r | d | nd | vd |
|---|---|---|---|---|---|---|
| G1 | L1 | 1 | 314.449 | 1.100 | 1.80470 | 41.0 |
|  |  | 2* | 5.283 | 1.671 |  |  |
|  | L2 | 3* | 9.276 | 1.972 | 1.99720 | 20.6 |
|  |  | 4 | 22.774 | d4 (Variable) |  |  |
| Diaphragm |  | 5 | ∞ | 0.000 |  |  |
| G2 | L3 | 6* | 4.440 | 2.272 | 1.80470 | 41.0 |
|  | L4 | 7 | −7.938 | 0.400 | 1.75520 | 27.5 |
|  |  | 8 | 3.865 | 0.721 |  |  |
|  | L5 | 9* | 13.259 | 1.012 | 1.52996 | 55.8 |
|  |  | 10 | −20.207 | d10 (Variable) |  |  |
| G3 | L6 | 11* | 18.741 | 1.693 | 1.66547 | 55.2 |
|  |  | 12* | −29.692 | d12 (Variable) |  |  |

TABLE I-2

|  | Wide-angle limit | Middle position | Telephoto limit |
|---|---|---|---|
| f(mm) | 4.76 | 8.71 | 16.76 |
| FNo | 3.33 | 4.22 | 5.86 |
| d4 | 15.78 | 6.63 | 0.60 |
| d10 | 2.78 | 8.38 | 17.88 |
| d12 | 4.34 | 3.92 | 2.60 |
| L | 25.22 | 23.15 | 25.30 |
| ω | 33.04 | 20.75 | 12.45 |

TABLE I-3

| Surface number | K | A4 | A6 | A8 | A10 | A12 |
|---|---|---|---|---|---|---|
| 2 | −7.20987E−01 | −3.88747E−04 | 7.58009E−06 | −8.06162E−07 | 3.16173E−08 | −3.99973E−10 |
| 3 | −5.66975E−01 | −5.56062E−05 | 2.02631E−06 | −4.35377E−07 | 2.01018E−08 | −2.67211E−10 |
| 6 | −5.63503E−01 | 1.75494E−04 | 4.60266E−05 | −3.29099E−06 | −5.57532E−07 | 1.26177E−07 |
| 9 | 0.00000E+00 | −5.28657E−04 | 3.31108E−05 | −1.13103E−04 | 4.23084E−05 | −5.54498E−06 |
| 11 | 0.00000E+00 | 3.18445E−04 | −1.71912E−05 | −1.86734E−06 | 1.15958E−07 | −2.13155E−09 |
| 12 | 0.00000E+00 | 8.63194E−04 | −6.45017E−05 | 1.03865E−06 | | |

Example I-2

The zoom lens system of Example I-2 corresponds to Embodiment I-2 shown in FIG. 3. Table I-4 shows the lens data of the zoom lens system of Example I-2. Table I-5 shows the focal length f, the F-number FNo, the overall optical length L, the half view angle ω, and the variable axial distance data d4, d10 and d12 in a case that the shooting distance is infinity. Table I-6 shows the aspherical data.

TABLE I-4

| Lens unit | Lens element | Surface number | r | d | nd | vd |
|---|---|---|---|---|---|---|
| G1 | L1 | 1 | 290.544 | 1.100 | 1.80470 | 41.0 |
| | | 2* | 5.436 | 1.696 | | |
| | L2 | 3* | 9.716 | 1.972 | 1.99720 | 20.6 |
| | | 4 | 23.479 | d4 (Variable) | | |
| Diaphragm | | 5 | ∞ | 0.000 | | |
| G2 | L3 | 6* | 4.453 | 2.251 | 1.80470 | 41.0 |
| | L4 | 7 | −9.203 | 0.400 | 1.75520 | 27.5 |
| | | 8 | 3.869 | 0.710 | | |
| | L5 | 9* | 14.428 | 1.029 | 1.52996 | 55.8 |
| | | 10 | −16.526 | d10 (Variable) | | |
| G3 | L6 | 11* | 19.838 | 1.608 | 1.66547 | 55.2 |
| | | 12* | −29.155 | d12 (Variable) | | |

TABLE I-5

| | Wide-angle limit | Middle position | Telephoto limit |
|---|---|---|---|
| f(mm) | 4.75 | 8.71 | 15.92 |
| FNo | 3.33 | 4.22 | 5.86 |
| d4 | 15.79 | 6.73 | 1.94 |
| d10 | 2.70 | 8.55 | 17.88 |
| d12 | 4.48 | 3.89 | 2.57 |
| L | 25.04 | 21.96 | 25.36 |
| ω | 33.98 | 20.84 | 12.90 |

TABLE I-6

| Surface number | K | A4 | A6 | A8 | A10 | A12 |
|---|---|---|---|---|---|---|
| 2 | −6.81743E−01 | −3.15467E−04 | 6.63469E−06 | −7.73202E−07 | 2.98635E−08 | −3.65093E−10 |
| 3 | −4.44787E−01 | −3.41487E−05 | 3.22253E−06 | −4.91718E−07 | 2.06445E−08 | −2.57922E−10 |
| 6 | −5.62730E−01 | 1.84798E−04 | 2.79632E−05 | −2.43430E−06 | −3.79770E−07 | 1.26097E−07 |
| 9 | 0.00000E+00 | −5.22256E−04 | 1.60055E−04 | −1.21439E−04 | 3.54027E−05 | −4.08827E−06 |
| 11 | 0.00000E+00 | 3.49196E−04 | −1.59870E−05 | −1.77726E−06 | 1.13158E−07 | −2.25382E−09 |
| 12 | 0.00000E+00 | 9.14216E−04 | −5.94809E−05 | 8.65461E−07 | | |

Example I-3

The zoom lens system of Example I-3 corresponds to Embodiment I-3 shown in FIG. 5. Table I-7 shows the lens data of the zoom lens system of Example I-3. Table I-8 shows the focal length f, the F-number FNo, the overall optical length L, the half view angle ω, and the variable axial distance data d4, d10 and d12 in a case that the shooting distance is infinity. Table I-9 shows the aspherical data.

TABLE I-7

| Lens unit | Lens element | Surface number | r | d | nd | vd |
|---|---|---|---|---|---|---|
| G1 | L1 | 1 | 70.965 | 1.000 | 1.80470 | 41.0 |
| | | 2* | 5.427 | 1.810 | | |
| | L2 | 3 | 9.148 | 1.860 | 1.99720 | 20.6 |
| | | 4* | 17.107 | d4 (Variable) | | |
| Diaphragm | | 5 | ∞ | 0.000 | | |
| G2 | L3 | 6* | 4.114 | 2.125 | 1.80470 | 41.0 |
| | L4 | 7 | −387.635 | 0.400 | 1.78472 | 25.7 |
| | | 8 | 3.500 | 0.430 | | |
| | L5 | 9* | 11.497 | 1.400 | 1.52996 | 55.8 |
| | | 10 | −13.861 | d10 (Variable) | | |
| G3 | L6 | 11 | 22.410 | 1.838 | 1.66547 | 55.2 |
| | | 12* | −23.299 | d12 (Variable) | | |

TABLE I-8

| | Wide-angle limit | Middle position | Telephoto limit |
|---|---|---|---|
| f(mm) | 4.89 | 8.94 | 16.82 |
| FNo | 3.33 | 4.22 | 5.86 |
| d4 | 14.99 | 6.53 | 1.79 |
| d10 | 2.99 | 8.79 | 17.97 |
| d12 | 4.14 | 3.56 | 2.48 |
| L | 24.66 | 21.89 | 25.35 |
| ω | 35.00 | 21.00 | 13.35 |

TABLE I-9

| Surface number | K | A4 | A6 | A8 | A10 | A12 |
|---|---|---|---|---|---|---|
| 2 | −5.06216E−01 | −7.77575E−05 | −3.72675E−06 | −9.35176E−07 | 4.83246E−08 | −7.27227E−10 |
| 4 | 1.97810E−01 | −9.96361E−05 | 1.24089E−05 | −1.05549E−07 | −1.50045E−08 | 3.50971E−10 |
| 6 | −3.34609E−01 | −5.57901E−05 | −9.92799E−05 | 6.44294E−05 | −1.50265E−05 | 1.22579E−06 |
| 9 | 0.00000E+00 | −8.27843E−05 | −8.14616E−06 | 0.00000E+00 | 0.00000E+00 | 0.00000E+00 |
| 12 | 0.00000E+00 | 1.95523E−04 | −5.80844E−06 | −1.06764E−06 | 1.15290E−07 | −3.18056E−09 |

Example I-4

The zoom lens system of Example I-4 corresponds to Embodiment I-4 shown in FIG. 7. Table I-10 shows the lens data of the zoom lens system of Example I-4. Table I-11 shows the focal length f, the F-number FNo, the overall optical length L, the half view angle ω, and the variable axial distance data d4, d10 and d12 in a case that the shooting distance is infinity. Table I-12 shows the aspherical data.

TABLE I-10

| Lens unit | Lens element | Surface number | r | d | nd | vd |
|---|---|---|---|---|---|---|
| G1 | L1 | 1 | 300.000 | 1.100 | 1.80470 | 41.0 |
| | | 2* | 5.281 | 1.674 | | |
| | L2 | 3* | 9.265 | 1.965 | 1.99720 | 20.6 |
| | | 4 | 22.687 | d4 (Variable) | | |
| Diaphragm | | 5 | ∞ | 0.000 | | |
| G2 | L3 | 6* | 4.438 | 2.276 | 1.80470 | 41.0 |
| | L4 | 7 | −7.816 | 0.400 | 1.75520 | 27.5 |
| | | 8 | 3.866 | 0.721 | | |
| | L5 | 9* | 13.611 | 1.007 | 1.52996 | 55.8 |
| | | 10 | −19.473 | d10 (Variable) | | |
| G3 | L6 | 11* | 18.777 | 1.637 | 1.66547 | 55.2 |
| | | 12* | −29.474 | d12 (Variable) | | |

TABLE I-11

| | Wide-angle limit | Middle position | Telephoto limit |
|---|---|---|---|
| f(mm) | 4.76 | 8.70 | 15.91 |
| FNo | 3.33 | 4.22 | 5.86 |
| d4 | 15.72 | 6.65 | 1.93 |
| d10 | 2.78 | 8.44 | 17.87 |
| d12 | 4.34 | 3.87 | 2.55 |
| L | 25.41 | 20.52 | 25.37 |
| ω | 32.35 | 21.04 | 12.25 |

TABLE I-12

| Surface number | K | A4 | A6 | A8 | A10 | A12 |
|---|---|---|---|---|---|---|
| 2 | −7.13953E−01 | −3.66962E−04 | 6.98415E−06 | −8.06128E−07 | 3.17119E−08 | −4.09395E−10 |
| 3 | −5.59363E−01 | −5.61116E−05 | 2.42043E−06 | −4.40355E−07 | 1.98271E−08 | −2.68197E−10 |
| 6 | −5.58819E−01 | 1.84074E−04 | 4.56058E−05 | −3.48862E−06 | −5.73009E−07 | 1.31573E−07 |
| 9 | 0.00000E+00 | −5.66137E−04 | 2.59802E−05 | −1.11568E−04 | 4.27182E−05 | −5.68923E−06 |
| 11 | 0.00000E+00 | 3.24793E−04 | −1.82952E−05 | −1.74384E−06 | 1.19184E−07 | −2.44258E−09 |
| 12 | 0.00000E+00 | 8.14331E−04 | −6.08137E−05 | 9.65844E−07 | | |

The following Table I-13 shows values corresponding to the conditions in Examples I-1 to I-4.

TABLE I-13

| | | Example | | | |
|---|---|---|---|---|---|
| Condition | | I-1 | I-2 | I-3 | I-4 |
| (I-1) | $|(R_{2mi1} + R_{2mi2})/(R_{2mi1} - R_{2mi2})|$ | 0.21 | 0.07 | 0.09 | 0.18 |
| (I-2) | $(T_{G1} + T_{G2} + T_{G3})/f_w$ | 2.28 | 2.27 | 2.23 | 2.27 |
| (I-3) | $T_1/f_w$ | 0.35 | 0.36 | 0.37 | 0.35 |
| (I-4) | $(R_{12} + R_{21})/(R_{12} - R_{21})$ | −3.65 | −3.54 | −3.92 | −3.65 |
| (I-5) | $nd_2$ | 1.99720 | 1.99720 | 1.99720 | 1.99720 |
| (I-6) | $\phi_A/\phi_C$ | 3.12 | 2.95 | 2.37 | 3.13 |
| (I-7) | $\phi_{Aa}/\phi_{Ca}$ | 0.22 | 0.20 | 0.24 | 0.21 |

Example II-1

The zoom lens system of Example II-1 corresponds to Embodiment II-1 shown in FIG. 9. Table II-1 shows the lens data of the zoom lens system of Example II-1. Table II-2 shows the focal length f, the F-number, the view angle 2ω, the overall optical length L, and the variable axial distance data d4, d10 and d12 in a case that the shooting distance is infinity. Table II-3 shows the aspherical data.

TABLE II-1

| Lens unit | Lens element | Surface | r | d | nd | vd |
|---|---|---|---|---|---|---|
| G1 | L1 | 1 | 45.432 | 0.900 | 1.80470 | 41.0 |
|  |  | 2* | 4.525 | 1.565 |  |  |
|  | L2 | 3 | 8.154 | 1.523 | 1.99720 | 20.6 |
|  |  | 4* | 16.653 | d4 |  |  |
| Diaphragm |  | 5 | ∞ | 0.670 |  |  |
| G2 | L3 | 6* | 3.240 | 1.374 | 1.80470 | 41.0 |
|  | L4 | 7 | −40.880 | 0.400 | 1.76182 | 26.6 |
|  |  | 8 | 2.789 | 0.530 |  |  |
|  | L5 | 9* | 12.905 | 1.080 | 1.52996 | 55.8 |
|  |  | 10 | −9.762 | d10 |  |  |

TABLE II-1-continued

| Lens unit | Lens element | Surface | r | d | nd | vd |
|---|---|---|---|---|---|---|
| G3 | L6 | 11 | 21.168 | 1.000 | 1.66547 | 55.2 |
|  |  | 12* | −30.731 | d12 |  |  |
|  | P | 13 | ∞ | 0.500 | 1.51680 | 64.2 |
|  |  | 14 |  | 0.500 |  |  |
|  | P | 15 | ∞ | 0.370 | 1.51680 | 64.2 |
|  |  | 16 |  |  |  |  |

TABLE II-2

|  | Wide-angle limit | Middle position | Telephoto limit |
|---|---|---|---|
| f | 4.68 | 10.24 | 14.85 |
| F-number | 2.81 | 4.30 | 5.41 |
| 2ω | 77.44 | 38.72 | 26.98 |
| L | 28.36 | 25.92 | 27.32 |
| d4 | 11.43 | 3.20 | 0.60 |
| d10 | 3.22 | 10.80 | 15.23 |
| d12 | 3.56 | 1.76 | 1.32 |

TABLE II-3

| Surface | K | A | B | C | D | E |
|---|---|---|---|---|---|---|
| 2 | −6.13686E−01 | 2.55205E−05 | 1.56227E−05 | −1.45690E−06 | 3.50784E−08 |  |
| 4 | 0.00000E+00 | −1.47520E−04 | 2.76760E−06 | 1.65438E−07 | −1.11449E−08 |  |
| 6 | −3.26065E−01 | −1.72587E−04 | −4.59345E−05 | 1.77750E−05 | −1.55466E−06 |  |
| 9 | 0.00000E+00 | −4.59216E−05 | 5.78142E−05 | −1.29258E−05 | 0.00000E+00 |  |
| 12 | 0.00000E+00 | 4.52432E−04 | −5.09522E−05 | 3.82711E−06 | −1.43312E−07 | 2.01092E−09 |

Example II-2

The zoom lens system of Example II-2 corresponds to Embodiment II-2 shown in FIG. 11. Table II-4 shows the lens data of the zoom lens system of Example II-2. Table II-5 shows the focal length f, the F-number, the view angle 2ω, the overall optical length L, and the variable axial distance data d4, d12 and d14 in a case that the shooting distance is infinity. Table II-6 shows the aspherical data.

TABLE II-4

| Lens unit | Lens element | Surface | r | d | nd | vd |
|---|---|---|---|---|---|---|
| G1 | L1 | 1 | 120.000 | 1.060 | 1.80470 | 41.0 |
|  |  | 2* | 5.422 | 2.158 |  |  |
|  | L2 | 3* | 13.035 | 1.764 | 1.99720 | 20.6 |
|  |  | 4 | 41.661 | d4 |  |  |
| Diaphragm |  | 5 | ∞ | 0.670 |  |  |
| G2 | L3 | 6* | 4.827 | 1.389 | 1.80470 | 41.0 |
|  |  | 7 | 26.757 | 0.305 |  |  |
|  | L4 | 8 | 27.097 | 0.916 | 1.72916 | 54.7 |
|  | L5 | 9 | −15.495 | 0.400 | 1.75520 | 27.5 |
|  |  | 10 | 4.220 | 0.497 |  |  |
|  | L6 | 11* | 15.897 | 0.892 | 1.52996 | 55.8 |
|  |  | 12 | −11.144 | d12 |  |  |
| G3 | L7 | 13 | 23.104 | 1.520 | 1.66547 | 55.2 |
|  |  | 14* | −30.387 | d14 |  |  |
|  | P |  | ∞ | 0.500 | 1.51680 | 64.2 |
|  |  |  |  | 0.500 |  |  |
|  | P |  | ∞ | 0.370 | 1.51680 | 64.2 |

TABLE II-5

|   | Wide-angle limit | Middle position | Telephoto limit |
|---|---|---|---|
| f | 4.77 | 8.72 | 16.22 |
| F-number | 2.93 | 3.98 | 5.87 |
| 2ω | 76.47 | 45.42 | 24.95 |
| L | 35.18 | 32.10 | 34.84 |

TABLE II-5-continued

|   | Wide-angle limit | Middle position | Telephoto limit |
|---|---|---|---|
| d4 | 14.45 | 5.98 | 0.96 |
| d12 | 2.64 | 9.26 | 18.74 |
| d14 | 4.75 | 3.50 | 1.76 |

TABLE II-6

| Surface | K | A | B | C | D | E |
|---|---|---|---|---|---|---|
| 2 | −3.95446E+00 | 2.79257E−03 | −1.30036E−04 | 5.53364E−06 | −1.39941E−07 | 1.45996E−09 |
| 3 | −1.93004E+01 | 1.31757E−03 | −6.73598E−05 | 3.02681E−06 | −7.74520E−08 | 8.09353E−10 |
| 6 | −7.20684E−01 | 2.30291E−04 | 1.02773E−04 | −3.91601E−05 | 8.41609E−06 | −6.70427E−07 |
| 11 | 0.00000E+00 | −2.64377E−04 | −4.45967E−05 | 4.81903E−08 | 9.20816E−08 |  |
| 14 | 0.00000E+00 | 3.24970E−04 | −6.33529E−05 | 7.12831E−06 | −3.80055E−07 | 7.60719E−09 |

Example II-3

The zoom lens system of Example II-3 corresponds to Embodiment II-3 shown in FIG. 13. Table II-7 shows the lens data of the zoom lens system of Example II-3. Table II-8 shows the focal length f, the F-number, the view angle 2ω, the overall optical length L, and the variable axial distance data d4, d10 and d12 in a case that the shooting distance is infinity. Table II-9 shows the aspherical data.

TABLE II-7

| Lens unit | Lens element | Surface | r | d | nd | νd |
|---|---|---|---|---|---|---|
| G1 | L1 | 1 | 307.661 | 1.100 | 1.80470 | 41.0 |
|  |  | 2* | 5.254 | 1.683 |  |  |
|  | L2 | 3* | 9.219 | 1.955 | 1.99720 | 20.6 |
|  |  | 4 | 22.591 | d4 |  |  |
| Diaphragm |  | 5 | ∞ | 0.670 |  |  |
| G2 | L3 | 6* | 4.480 | 2.301 | 1.80470 | 41.0 |
|  | L4 | 7 | −7.549 | 0.400 | 1.75520 | 27.5 |
|  |  | 8 | 3.920 | 0.710 |  |  |
|  | L5 | 9* | 14.147 | 0.995 | 1.52996 | 55.8 |
|  |  | 10 | −19.106 | d10 |  |  |
| G3 | L6 | 11* | 19.511 | 1.638 | 1.66547 | 55.2 |
|  |  | 12* | −28.417 | d12 |  |  |
|  | P | 13 | ∞ | 0.500 | 1.51680 | 64.2 |
|  |  | 14 |  | 0.500 |  |  |
|  | P | 15 | ∞ | 0.370 | 1.51680 | 64.2 |
|  |  | 16 |  |  |  |  |

TABLE II-8

|   | Wide-angle limit | Middle position | Telephoto limit |
|---|---|---|---|
| f | 4.76 | 8.71 | 15.84 |
| F-number | 2.93 | 3.91 | 5.66 |
| 2ω | 76.86 | 45.12 | 25.23 |
| L | 35.46 | 31.80 | 35.01 |
| d4 | 15.09 | 6.14 | 1.26 |
| d10 | 2.74 | 8.62 | 17.77 |
| d12 | 4.41 | 3.82 | 2.75 |

TABLE II-9

| Surface | K | A | B | C | D | E |
|---|---|---|---|---|---|---|
| 2 | −7.10368E−01 | −3.52400E−04 | 6.40741E−06 | −8.03851E−07 | 3.19052E−08 | −4.21229E−10 |
| 3 | −5.38947E−01 | −5.21717E−05 | 2.56968E−06 | −4.49011E−07 | 1.95470E−08 | −2.63024E−10 |
| 6 | −5.60195E−01 | 1.82543E−04 | 4.39672E−05 | −3.82639E−06 | −5.67027E−07 | 1.48819E−07 |
| 9 | 0.00000E+00 | −6.03956E−04 | 1.23408E−05 | −1.08136E−04 | 4.36520E−05 | −6.05759E−06 |
| 11 | 0.00000E+00 | 3.35621E−04 | −1.83460E−05 | −1.68321E−06 | 1.20126E−07 | −2.56431E−09 |
| 12 | 0.00000E+00 | 7.88164E−04 | −5.73977E−05 | 9.14905E−07 |  |  |

Example II-4

The zoom lens system of Example II-4 corresponds to Embodiment II-4 shown in FIG. 15. Table II-10 shows the lens data of the zoom lens system of Example II-4. Table II-11 shows the focal length f, the F-number, the view angle $2\omega$, the overall optical length L, and the variable axial distance data d4, d12 and d14 in a case that the shooting distance is infinity. Table II-12 shows the aspherical data.

TABLE II-10

| Lens unit | Lens element | Surface | r | d | nd | vd |
|---|---|---|---|---|---|---|
| G1 | L1 | 1 | 120.000 | 1.060 | 1.80470 | 41.0 |
|  |  | 2* | 5.311 | 1.990 |  |  |
|  | L2 | 3* | 11.028 | 1.784 | 1.99575 | 20.7 |
|  |  | 4 | 27.791 | d4 |  |  |
| Diaphragm |  | 5 | ∞ | 0.350 |  |  |
| G2 | L3 | 6* | 4.973 | 1.256 | 1.80434 | 40.8 |
|  |  | 7 | 15.437 | 0.384 |  |  |
|  | L4 | 8 | 10.474 | 0.947 | 1.72916 | 54.7 |
|  | L5 | 9 | −28.404 | 0.400 | 1.76182 | 26.6 |
|  |  | 10 | 4.094 | 0.496 |  |  |
|  | L6 | 11* | 21.633 | 0.917 | 1.53113 | 55.7 |
|  |  | 12 | −10.573 | d12 |  |  |
| G3 | L7 | 13* | 34.991 | 1.520 | 1.66547 | 55.2 |
|  |  | 14* | −20.585 | d14 |  |  |
| P |  | 15 | ∞ | 0.500 | 1.51680 | 64.2 |
|  |  | 16 |  | 0.500 |  |  |
| P |  | 17 | ∞ | 0.370 | 1.51680 | 64.2 |
|  |  | 18 |  |  |  |  |

TABLE II-11

|  | Wide-angle limit | Middle position | Telephoto limit |
|---|---|---|---|
| f | 4.77 | 8.71 | 15.92 |
| F-number | 2.92 | 3.94 | 5.74 |
| $2\omega$ | 76.36 | 45.45 | 25.44 |
| L | 34.89 | 31.63 | 34.48 |
| d4 | 14.60 | 6.17 | 1.36 |
| d12 | 2.79 | 8.90 | 17.96 |
| d14 | 4.74 | 3.81 | 2.42 |

TABLE II-12

| Surface | K | A | B | C | D | E | F |
|---|---|---|---|---|---|---|---|
| 2 | −1.50000E+00 | 9.45283E−04 | −4.13637E−05 | 1.60905E−06 | −1.04194E−08 | −8.41442E−10 | 1.47350E−11 |
| 3 | 0.00000E+00 | 2.34229E−04 | −2.45453E−05 | 1.07278E−06 | −1.18237E−08 | −3.61655E−10 | 7.45807E−12 |
| 6 | 0.00000E+00 | −6.50053E−04 | 6.34626E−05 | −3.72453E−05 | 1.05395E−05 | −1.61108E−06 | 1.01352E−07 |
| 11 | 0.00000E+00 | −6.34185E−05 | 1.88100E−04 | −6.38471E−05 | 8.37486E−06 |  |  |
| 13 | 0.00000E+00 | 1.28204E−04 | −3.01444E−05 | 1.04004E−06 |  |  |  |
| 14 | 0.00000E+00 | 4.95301E−04 | −9.37727E−05 | 7.62691E−06 | −3.31231E−07 | 6.39178E−09 |  |

The following Table II-13 shows values corresponding to the conditions in Examples II-1 to II-4.

TABLE II-13

|  |  | Example | | | |
|---|---|---|---|---|---|
| Condition | | II-1 | II-2 | II-3 | II-4 |
| (II-1) | $f_2/f_{2r}$ | 0.85 | 1.02 | 0.73 | 0.92 |
| (II-2) | $f_w/f_{2r}$ | 0.44 | 0.38 | 0.31 | 0.35 |
| (II-3) | T2/Y | 0.94 | 0.84 | 1.23 | 0.83 |
| (II-4) | Rc/Y | −11.36 | −4.30 | −2.10 | −7.89 |
| (II-5) | (T1 + T2 + T3)/Y | 2.33 | 2.47 | 3.00 | 2.43 |
| (II-6) | $f_3/f_T$ | 1.28 | 1.23 | 1.11 | 1.24 |
| (II-7) | T3/Y | 0.28 | 0.25 | 0.46 | 0.25 |

Example III-1

The zoom lens system of Example III-1 corresponds to Embodiment III-1 shown in FIG. 17. Table III-1 shows the lens data of the zoom lens system of Example III-1. Table III-2 shows the focal length f, the F-number, the view angle $2\omega$, the overall optical length L, and the variable axial distance data d4, d10 and d12 in a case that the shooting distance is infinity. Table III-3 shows the aspherical data.

TABLE III-1

| Lens unit | Lens element | Surface | r | d | nd | vd |
|---|---|---|---|---|---|---|
| G1 | L1 | 1 | 106.770 | 1.007 | 1.80470 | 41.0 |
|  |  | 2* | 5.186 | 1.177 |  |  |
|  | L2 | 3 | 7.951 | 1.600 | 1.99720 | 20.6 |
|  |  | 4* | 14.443 | d4 |  |  |
| Diaphragm |  | 5 | ∞ | 0.300 |  |  |
| G2 | L3 | 6* | 2.847 | 1.000 | 1.80470 | 41.0 |
|  | L4 | 7 | 5.065 | 0.400 | 1.84666 | 23.8 |
|  |  | 8 | 2.542 | 0.680 |  |  |
|  | L5 | 9 | 9.657 | 1.050 | 1.49700 | 81.6 |
|  |  | 10 | −11.474 | d10 |  |  |
| G3 | L6 | 11 | −58.781 | 1.100 | 1.66547 | 55.2 |
|  |  | 12* | −10.516 | d12 |  |  |
| P |  | 13 | ∞ | 0.500 | 1.51680 | 64.2 |
|  |  | 14 |  | 0.500 |  |  |
| P |  | 15 | ∞ | 0.370 | 1.51680 | 64.2 |
|  |  | 16 |  |  |  |  |

TABLE III-2

|  | Wide-angle limit | Middle position | Telephoto limit |
|---|---|---|---|
| f | 4.65 | 10.30 | 16.24 |
| F-number | 2.91 | 4.52 | 6.09 |
| $2\omega$ | 77.82 | 38.19 | 24.73 |
| L | 31.54 | 30.05 | 32.46 |
| d4 | 13.86 | 5.39 | 2.47 |
| d10 | 2.71 | 11.81 | 18.54 |
| d12 | 4.88 | 2.75 | 1.34 |

TABLE III-3

| Surface | K | A | B | C | D | E |
|---|---|---|---|---|---|---|
| 2 | −7.26222E−01 | 4.01737E−04 | −1.05320E−05 | 4.99778E−07 | −1.53649E−08 | |
| 4 | 0.00000E+00 | −2.82235E−04 | 1.51056E−05 | −6.74277E−07 | 1.67210E−08 | |
| 6 | −6.18744E−01 | 1.66953E−03 | 2.78768E−04 | −5.69567E−05 | 1.68321E−05 | −1.27163E−06 |
| 12 | 0.00000E+00 | 5.28697E−04 | −1.14171E−05 | 2.99725E−07 | 5.02100E−08 | −2.91521E−09 |

Example III-2)

The zoom lens system of Example III-2 corresponds to Embodiment III-2 shown in FIG. 19. Table III-4 shows the lens data of the zoom lens system of Example III-2. Table III-5 shows the focal length f, the F-number, the view angle 2ω, the overall optical length L, and the variable axial distance data d4, d12 and d14 in a case that the shooting distance is infinity. Table III-6 shows the aspherical data.

TABLE III-4

| Lens unit | Lens element | Surface | r | d | nd | vd |
|---|---|---|---|---|---|---|
| G1 | L1 | 1 | 120.000 | 1.060 | 1.80470 | 41.0 |
| | | 2* | 5.422 | 2.158 | | |
| | L2 | 3* | 13.035 | 1.764 | 1.99720 | 20.6 |
| | | 4 | 41.661 | d4 | | |
| Diaphragm | | 5 | ∞ | 0.670 | | |
| G2 | L3 | 6* | 4.827 | 1.389 | 1.80470 | 41.0 |
| | | 7 | 26.757 | 0.305 | | |
| | L4 | 8 | 27.097 | 0.916 | 1.72916 | 54.7 |
| | L5 | 9 | −15.495 | 0.400 | 1.76182 | 26.6 |
| | | 10 | 4.257 | 0.497 | | |
| | L6 | 11* | 18.178 | 0.892 | 1.60602 | 57.4 |
| | | 12 | −12.743 | d12 | | |
| G3 | L7 | 13* | 23.104 | 1.520 | 1.66547 | 55.2 |
| | | 14 | −30.387 | d14 | | |
| | P | 15 | ∞ | 0.500 | 1.51680 | 64.2 |
| | | 16 | | 0.500 | | |
| | P | 17 | ∞ | 0.370 | 1.51680 | 64.2 |
| | | 18 | | | | |

TABLE III-5

| | Wide-angle limit | Middle position | Telephoto limit |
|---|---|---|---|
| f | 4.76 | 8.65 | 15.71 |
| F-number | 2.92 | 3.95 | 5.69 |
| 2ω | 76.57 | 45.73 | 25.74 |
| L | 35.18 | 32.10 | 34.84 |
| d4 | 14.45 | 5.98 | 0.96 |
| d12 | 2.51 | 8.98 | 17.94 |
| d14 | 4.88 | 3.78 | 2.56 |

TABLE III-6

| Surface | K | A | B | C | D | E |
|---|---|---|---|---|---|---|
| 2 | −3.95446E+00 | 2.79257E−03 | −1.30036E−04 | 5.53364E−06 | −1.39941E−07 | 1.45996E−09 |
| 3 | −1.93004E+01 | 1.31757E−03 | −6.73598E−05 | 3.02681E−06 | −7.74520E−08 | 8.09353E−10 |
| 6 | −7.20684E−01 | 2.30291E−04 | 1.02773E−04 | −3.91601E−05 | 8.41609E−06 | −6.70427E−07 |
| 11 | 0.00000E+00 | −2.64377E−04 | −4.45967E−05 | 4.81903E−08 | 9.20816E−08 | |
| 13 | 0.00000E+00 | 3.24970E−04 | −6.33529E−05 | 7.12831E−06 | −3.80055E−07 | 7.60719E−09 |

Example III-3

The zoom lens system of Example III-3 corresponds to Embodiment III-3 shown in FIG. 21. Table III-7 shows the lens data of the zoom lens system of Example III-3. Table III-8 shows the focal length f, the F-number, the view angle 2ω, the overall optical length L, and the variable axial distance data d4, d10 and d12 in a case that the shooting distance is infinity. Table III-9 shows the aspherical data.

TABLE III-7

| Lens unit | Lens element | Surface | r | d | nd | vd |
|---|---|---|---|---|---|---|
| G1 | L1 | 1 | 307.661 | 1.100 | 1.80470 | 41.0 |
| | | 2* | 5.254 | 1.683 | | |
| | L2 | 3* | 9.219 | 1.955 | 1.99720 | 20.6 |
| | | 4 | 22.591 | d4 | | |
| Diaphragm | | 5 | ∞ | 0.670 | | |
| G2 | L3 | 6* | 4.480 | 2.301 | 1.80470 | 41.0 |
| | L4 | 7 | −7.549 | 0.400 | 1.75520 | 27.5 |
| | | 8 | 3.920 | 0.710 | | |
| | L5 | 9* | 14.147 | 0.995 | 1.52996 | 55.8 |
| | | 10 | −19.106 | d10 | | |
| G3 | L6 | 11* | 19.511 | 1.638 | 1.66547 | 55.2 |
| | | 12* | −28.417 | d12 | | |
| | P | 13 | ∞ | 0.500 | 1.51680 | 64.2 |
| | | 14 | | 0.500 | | |
| | P | 15 | ∞ | 0.370 | 1.51680 | 64.2 |
| | | 16 | | | | |

TABLE III-8

| | Wide-angle limit | Middle position | Telephoto limit |
|---|---|---|---|
| f | 4.76 | 8.71 | 15.84 |
| F-number | 2.93 | 3.91 | 5.66 |
| 2ω | 76.86 | 45.12 | 25.23 |
| L | 35.46 | 31.80 | 35.01 |
| d4 | 15.09 | 6.14 | 1.26 |
| d10 | 2.74 | 8.62 | 17.77 |
| d12 | 4.41 | 3.82 | 2.75 |

TABLE III-9

| Surface | K | A | B | C | D | E |
|---|---|---|---|---|---|---|
| 2 | −7.10368E−01 | −3.52400E−04 | 6.40741E−06 | −8.03851E−07 | 3.19052E−08 | −4.21229E−10 |
| 3 | −5.38947E−01 | −5.21717E−05 | 2.56968E−06 | −4.49011E−07 | 1.95470E−08 | −2.63024E−10 |
| 6 | −5.60195E−01 | 1.82543E−04 | 4.39672E−05 | −3.82639E−06 | −5.67027E−07 | 1.48819E−07 |
| 9 | 0.00000E+00 | −6.03956E−04 | 1.23408E−05 | −1.08136E−04 | 4.36520E−05 | −6.05759E−06 |
| 11 | 0.00000E+00 | 3.35621E−04 | −1.83460E−05 | −1.68321E−06 | 1.20126E−07 | −2.56431E−09 |
| 12 | 0.00000E+00 | 7.88164E−04 | −5.73977E−05 | 9.14905E−07 | | |

Example III-4

The zoom lens system of Example III-4 corresponds to Embodiment III-4 shown in FIG. 23. Table III-10 shows the lens data of the zoom lens system of Example III-4. Table III-11 shows the focal length f, the F-number, the view angle 2ω, the overall optical length L, and the variable axial distance data d4, d12 and d14 in a case that the shooting distance is infinity. Table III-12 shows the aspherical data.

TABLE III-10

| Lens unit | Lens element | Surface | r | d | nd | vd |
|---|---|---|---|---|---|---|
| G1 | L1 | 1 | 120.000 | 1.060 | 1.80470 | 41.0 |
| | | 2* | 5.311 | 1.990 | | |
| | L2 | 3* | 11.028 | 1.784 | 1.99575 | 20.7 |
| | | 4 | 27.791 | d4 | | |
| Diaphragm | | 5 | ∞ | 0.350 | | |
| G2 | L3 | 6* | 4.973 | 1.256 | 1.80434 | 40.8 |
| | | 7 | 15.437 | 0.384 | | |
| | L4 | 8 | 10.474 | 0.947 | 1.72916 | 54.7 |
| | L5 | 9 | −28.404 | 0.400 | 1.76182 | 26.6 |
| | | 10 | 4.094 | 0.496 | | |
| | L6 | 11* | 21.633 | 0.917 | 1.53113 | 55.7 |
| | | 12 | −10.573 | d12 | | |
| G3 | L7 | 13* | 34.991 | 1.520 | 1.66547 | 55.2 |
| | | 14* | −20.585 | d14 | | |
| P | | 15 | ∞ | 0.500 | 1.51680 | 64.2 |
| | | 16 | | 0.500 | | |
| P | | 17 | ∞ | 0.370 | 1.51680 | 64.2 |
| | | 18 | | | | |

TABLE III-11

| | Wide-angle limit | Middle position | Telephoto limit |
|---|---|---|---|
| f | 4.77 | 8.71 | 15.92 |
| F-number | 2.92 | 3.94 | 5.74 |
| 2ω | 76.36 | 45.45 | 25.44 |
| L | 34.89 | 31.63 | 34.48 |
| d4 | 14.60 | 6.17 | 1.36 |
| d12 | 2.79 | 8.90 | 17.96 |
| d14 | 4.74 | 3.81 | 2.42 |

The following Table III-13 shows values corresponding to the conditions in Examples III-1 to III-4.

TABLE III-13

| | | Example | | | |
|---|---|---|---|---|---|
| Condition | | III-1 | III-2 | III-3 | III-4 |
| (III-1) | $f_2/f_w$ | 2.15 | 2.69 | 2.37 | 2.60 |
| (III-2) | n12 | 1.99720 | 1.99720 | 1.99720 | 1.99575 |
| (III-3) | ν12 | 20.60 | 20.60 | 20.60 | 20.70 |
| (III-4) | n11 | 1.80470 | 1.80470 | 1.80470 | 1.80470 |
| (III-5) | ν11 | 41.00 | 41.00 | 41.00 | 41.00 |
| (III-6) | n12 − n11 | 0.19 | 0.19 | 0.19 | 0.19 |
| (III-7) | T1/d12 | 3.21 | 2.31 | 2.82 | 2.43 |
| (III-8) | T2/Y | 0.87 | 0.84 | 1.23 | 0.83 |

Figure 2:
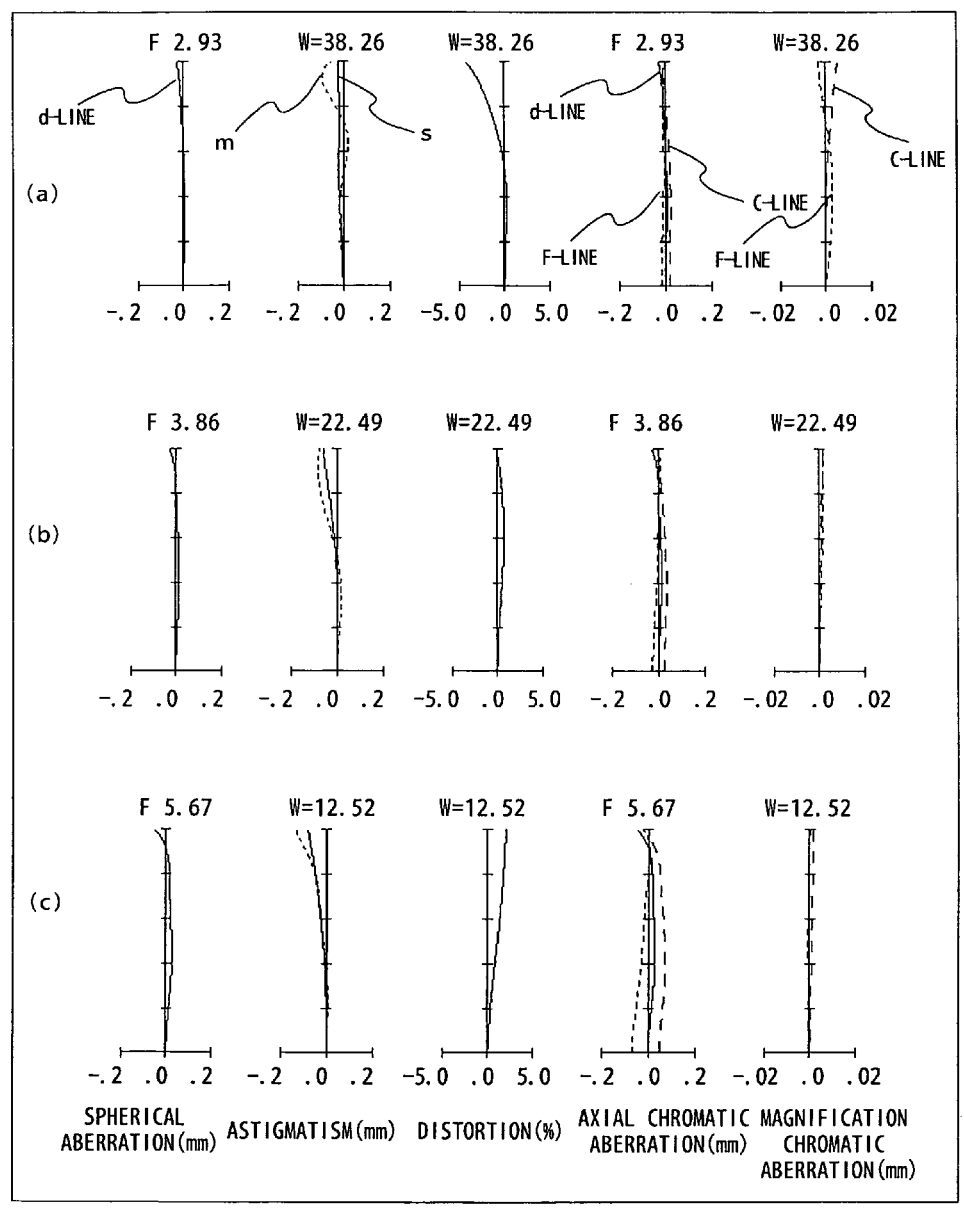
FIG. 2 is a longitudinal aberration diagram of a zoom lens system according to Example I-1.
Figure 4:
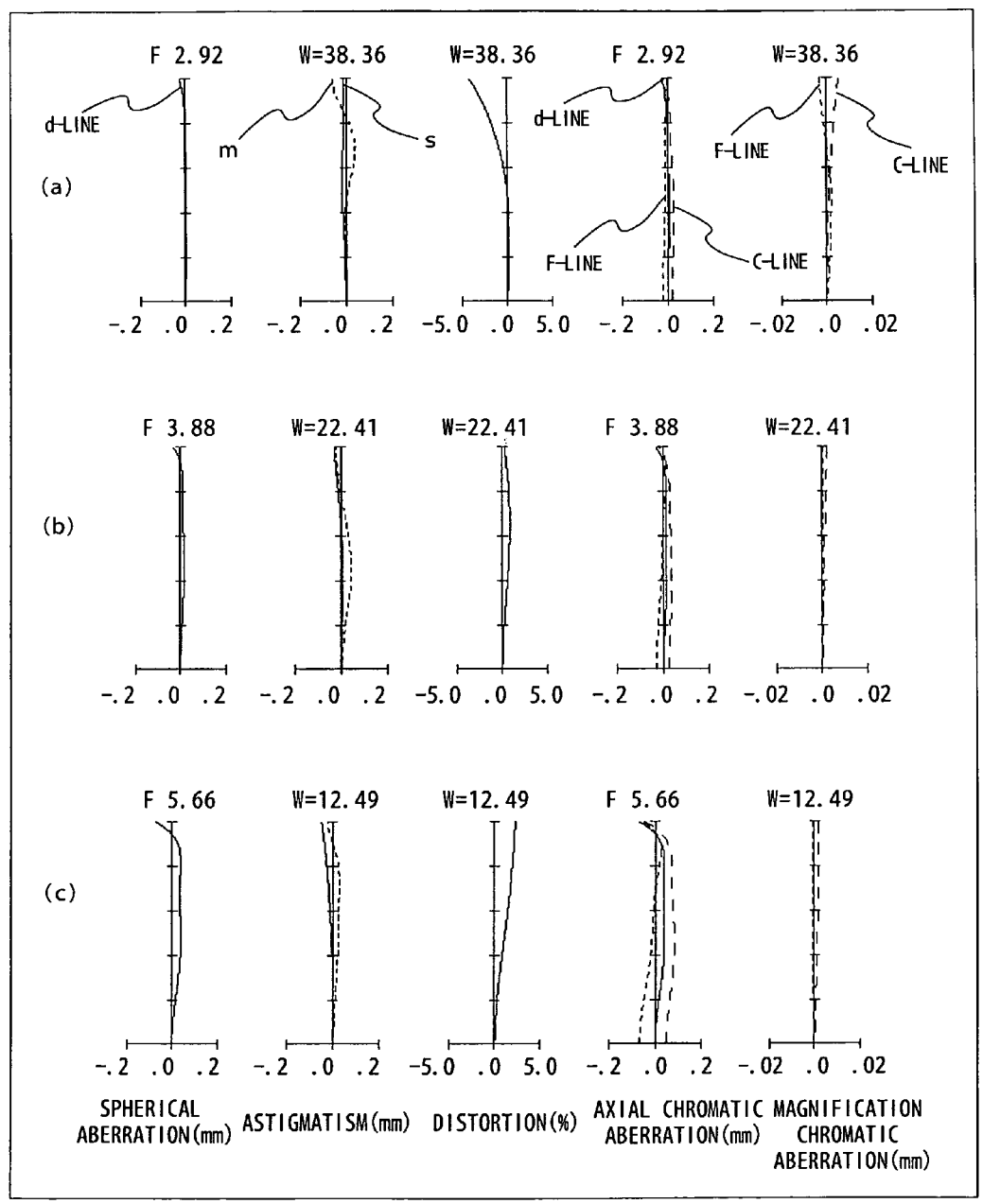
FIG. 4 is a longitudinal aberration diagram of a zoom lens system according to Example I-2.
Figure 6:
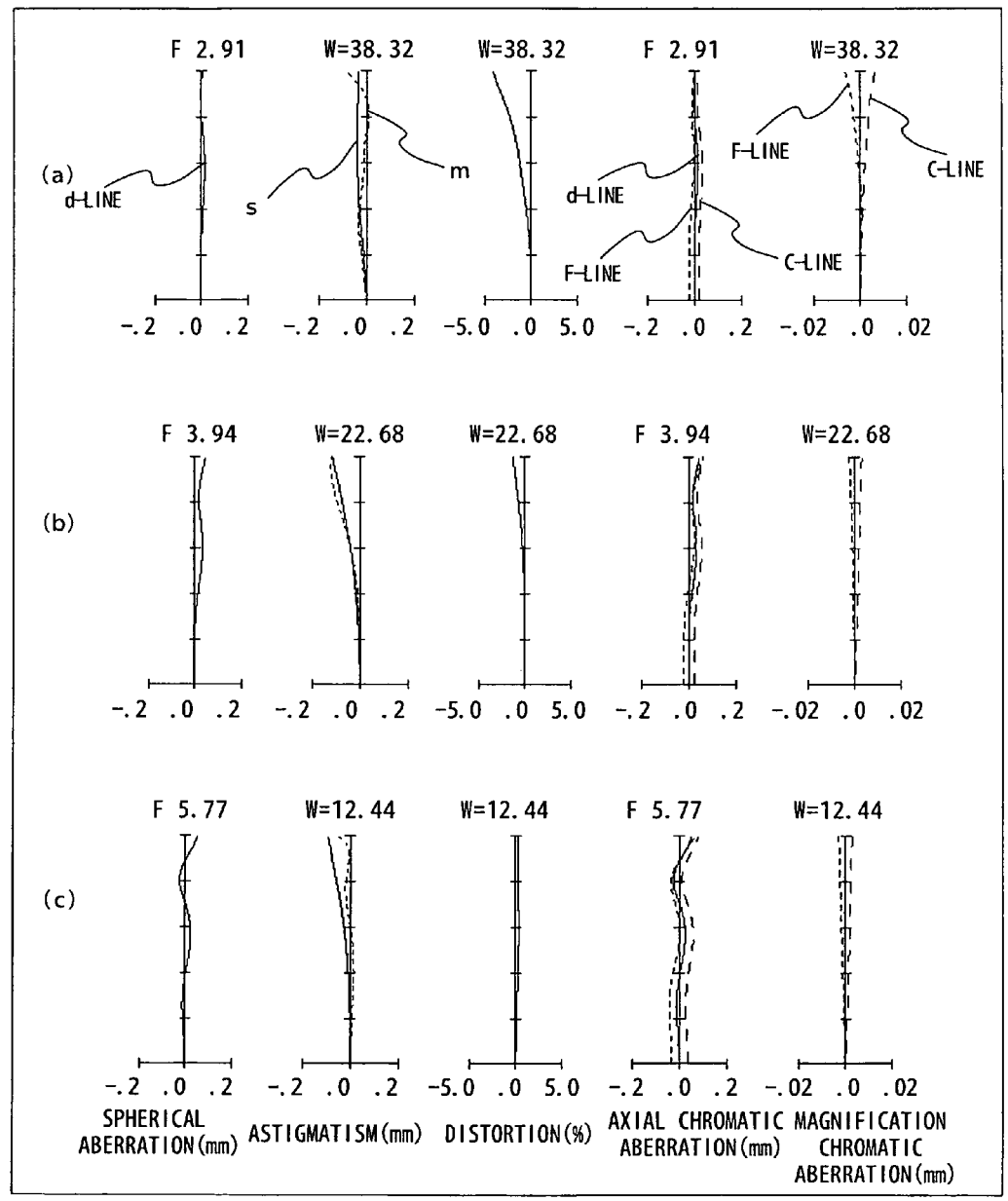
FIG. 6 is a longitudinal aberration diagram of a zoom lens system according to Example I-3.
Figure 8:
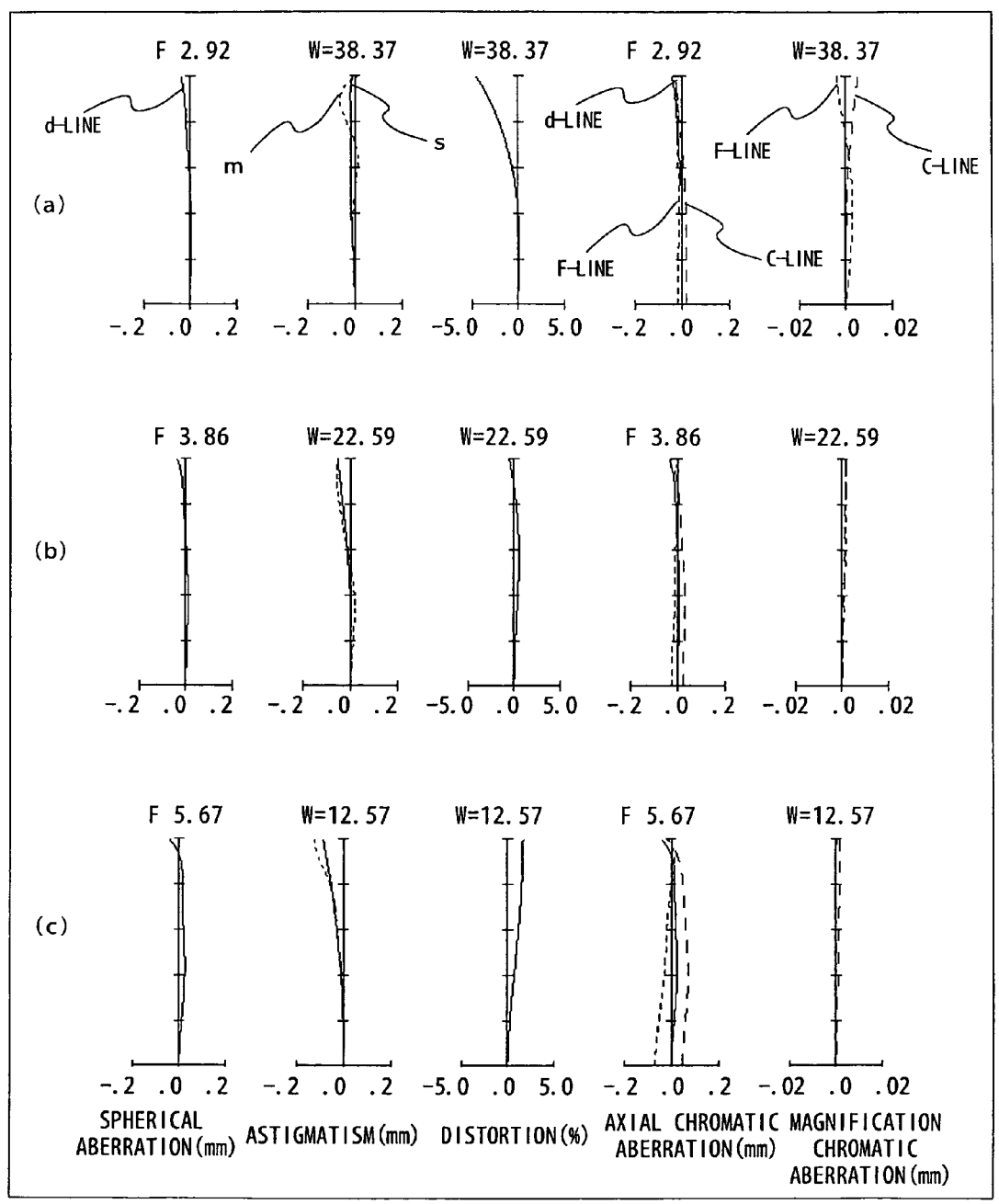
FIG. 8 is a longitudinal aberration diagram of a zoom lens system according to Example I-4.

FIG. 2 is a longitudinal aberration diagram of the zoom lens system according to Example I-1. FIG. 4 is a longitudinal aberration diagram of the zoom lens system according to Example I-2. FIG. 6 is a longitudinal aberration diagram of the zoom lens system according to Example I-3. FIG. 8 is a longitudinal aberration diagram of the zoom lens system according to Example I-4.

Figure 10:
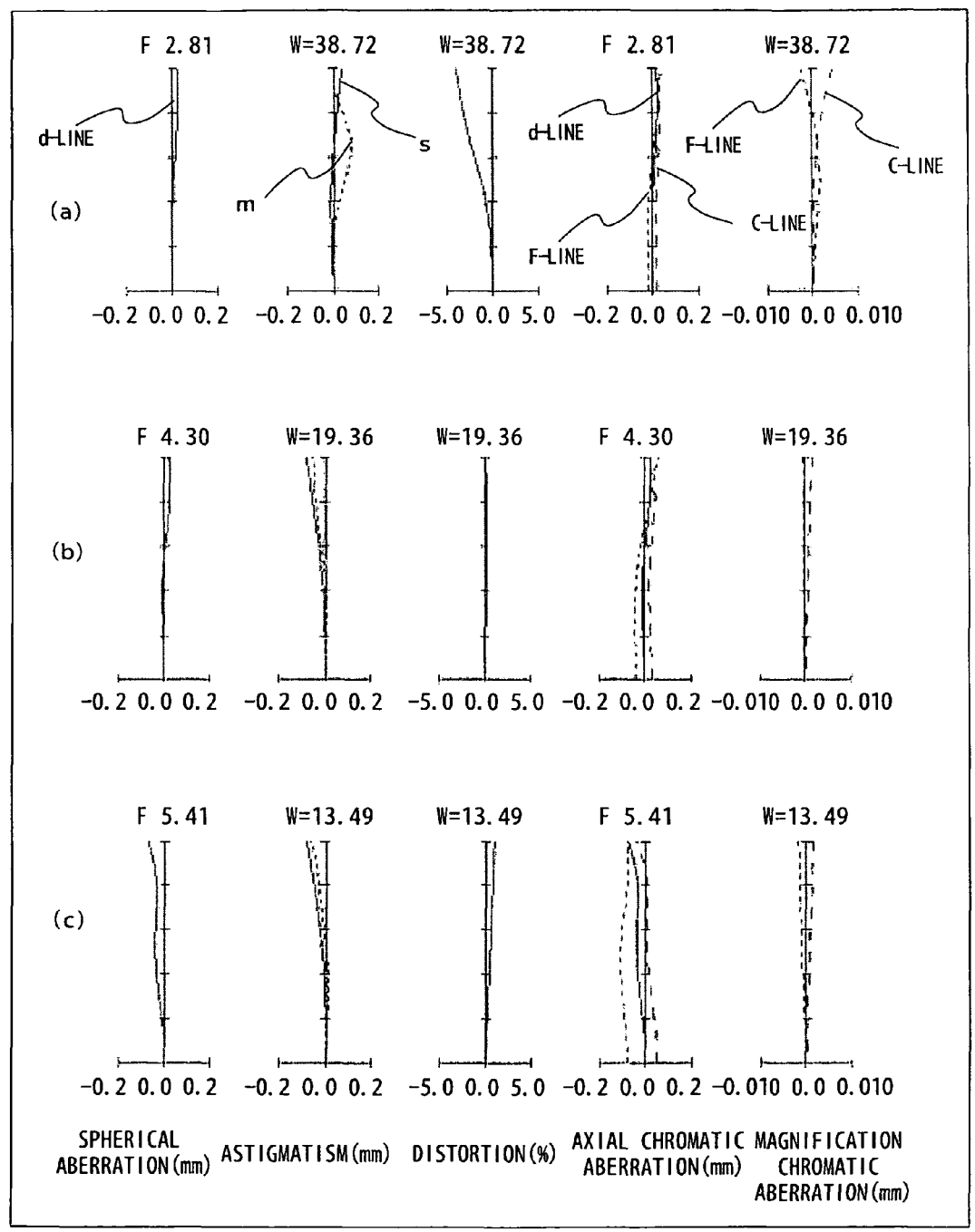
FIG. 10 is a longitudinal aberration diagram of a zoom lens system according to Example II-1.
Figure 12:
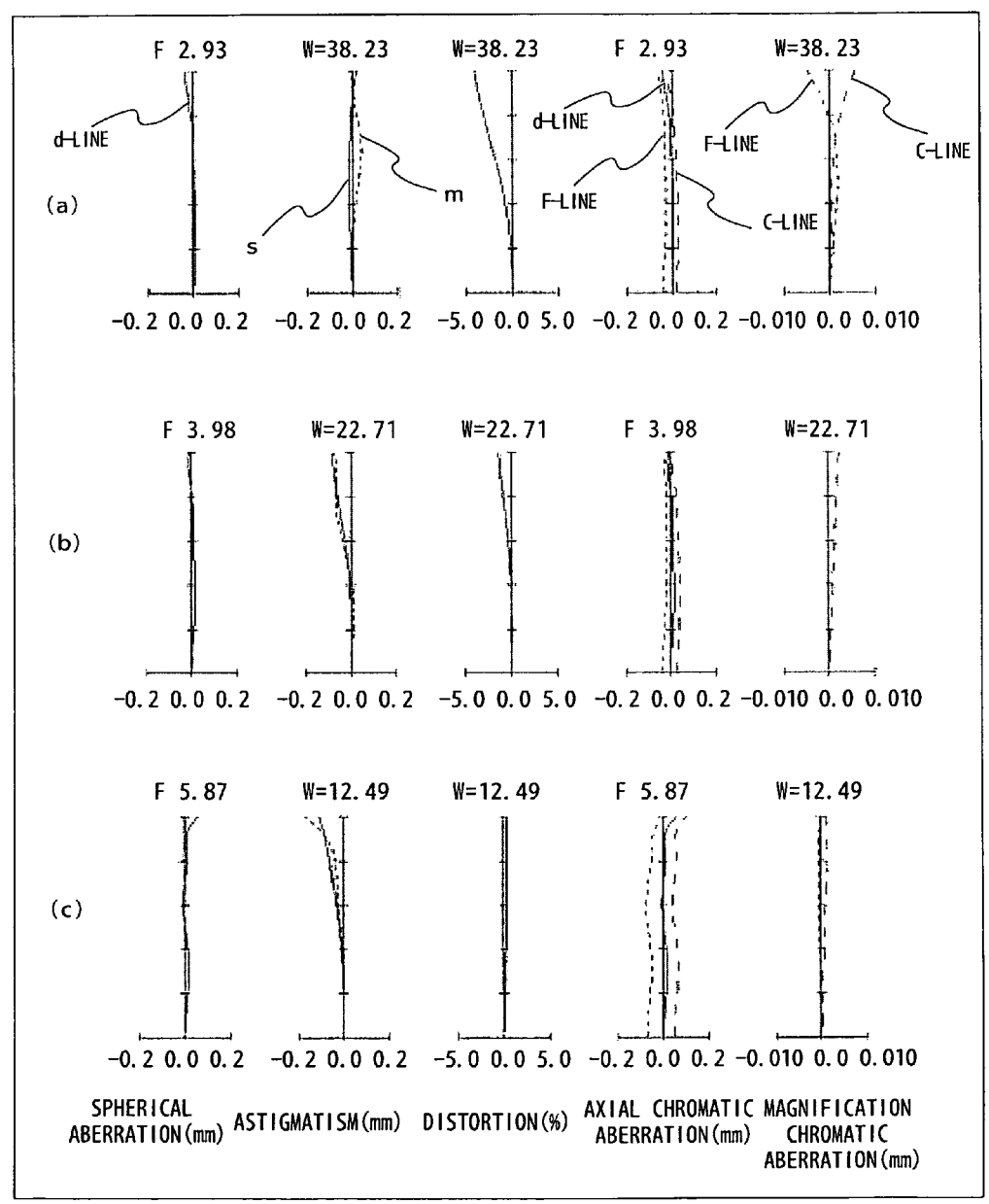
FIG. 12 is a longitudinal aberration diagram of a zoom lens system according to Example II-2.
Figure 14:
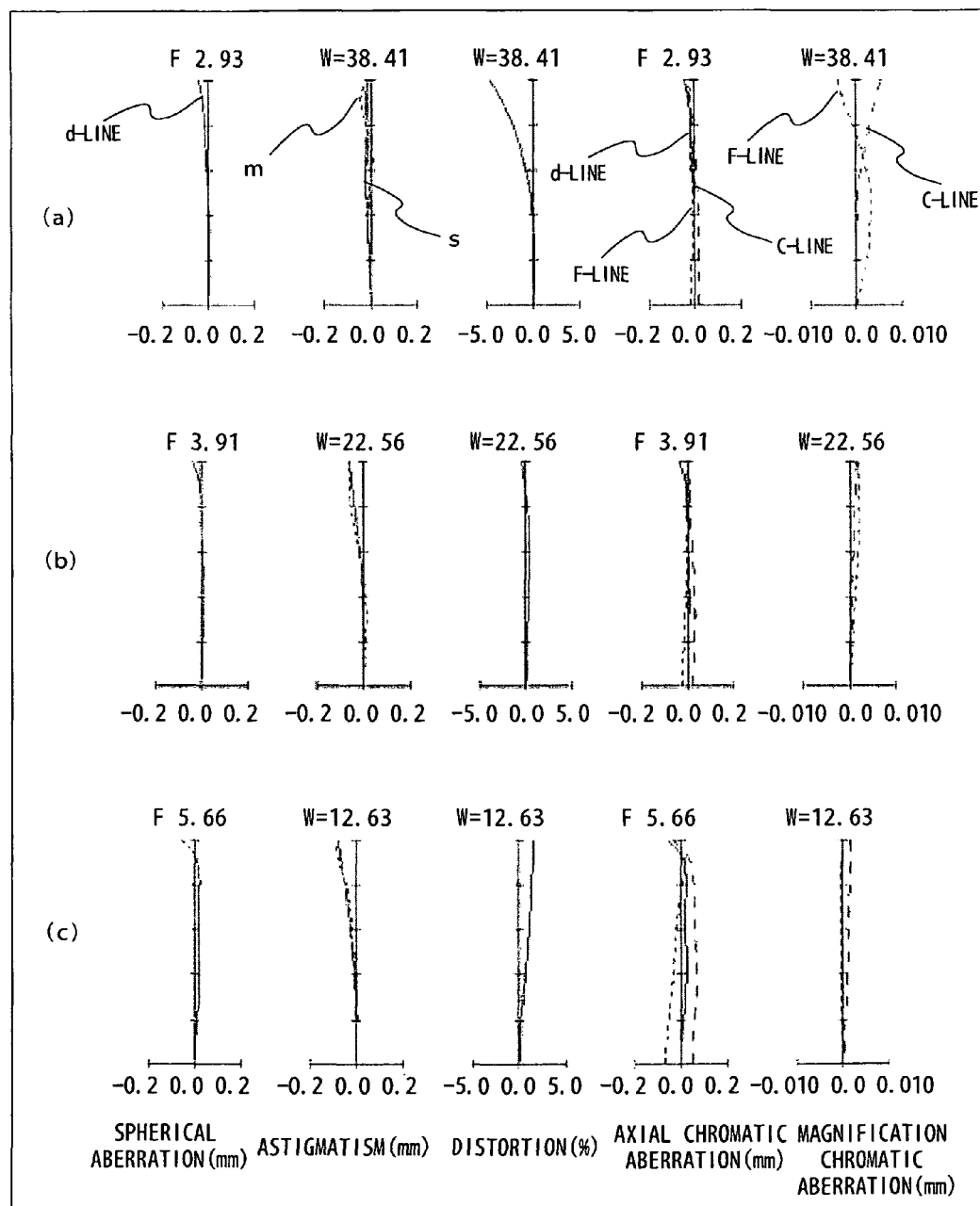
FIG. 14 is a longitudinal aberration diagram of a zoom lens system according to Example II-3.
Figure 16:
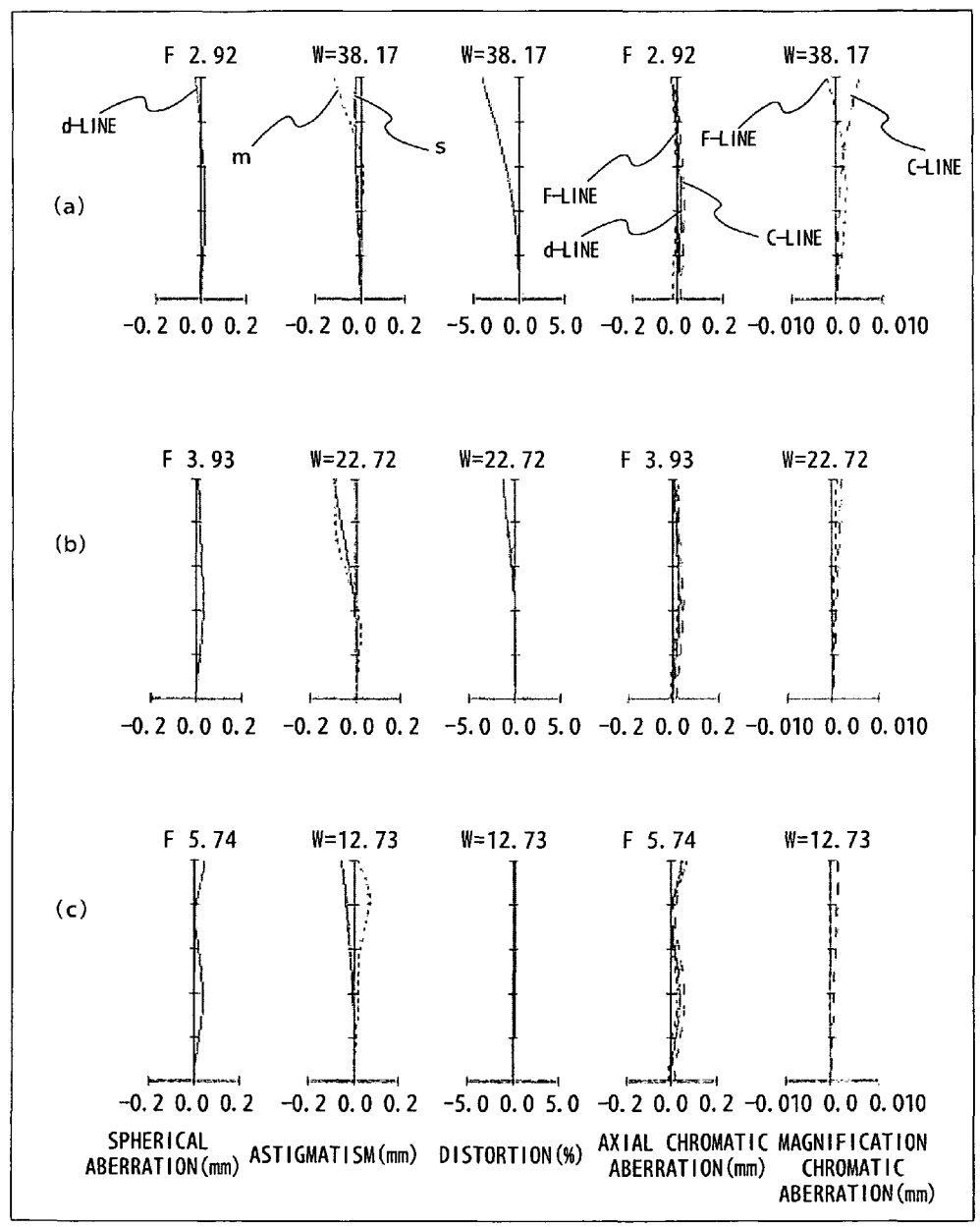
FIG. 16 is a longitudinal aberration diagram of a zoom lens system according to Example II-4.

FIG. 10 is a longitudinal aberration diagram of the zoom lens system according to Example II-1. FIG. 12 is a longitudinal aberration diagram of the zoom lens system according to Example II-2. FIG. 14 is a longitudinal aberration diagram of the zoom lens system according to Example II-3. FIG. 16 is a longitudinal aberration diagram of the zoom lens system according to Example II-4.

Figure 18:
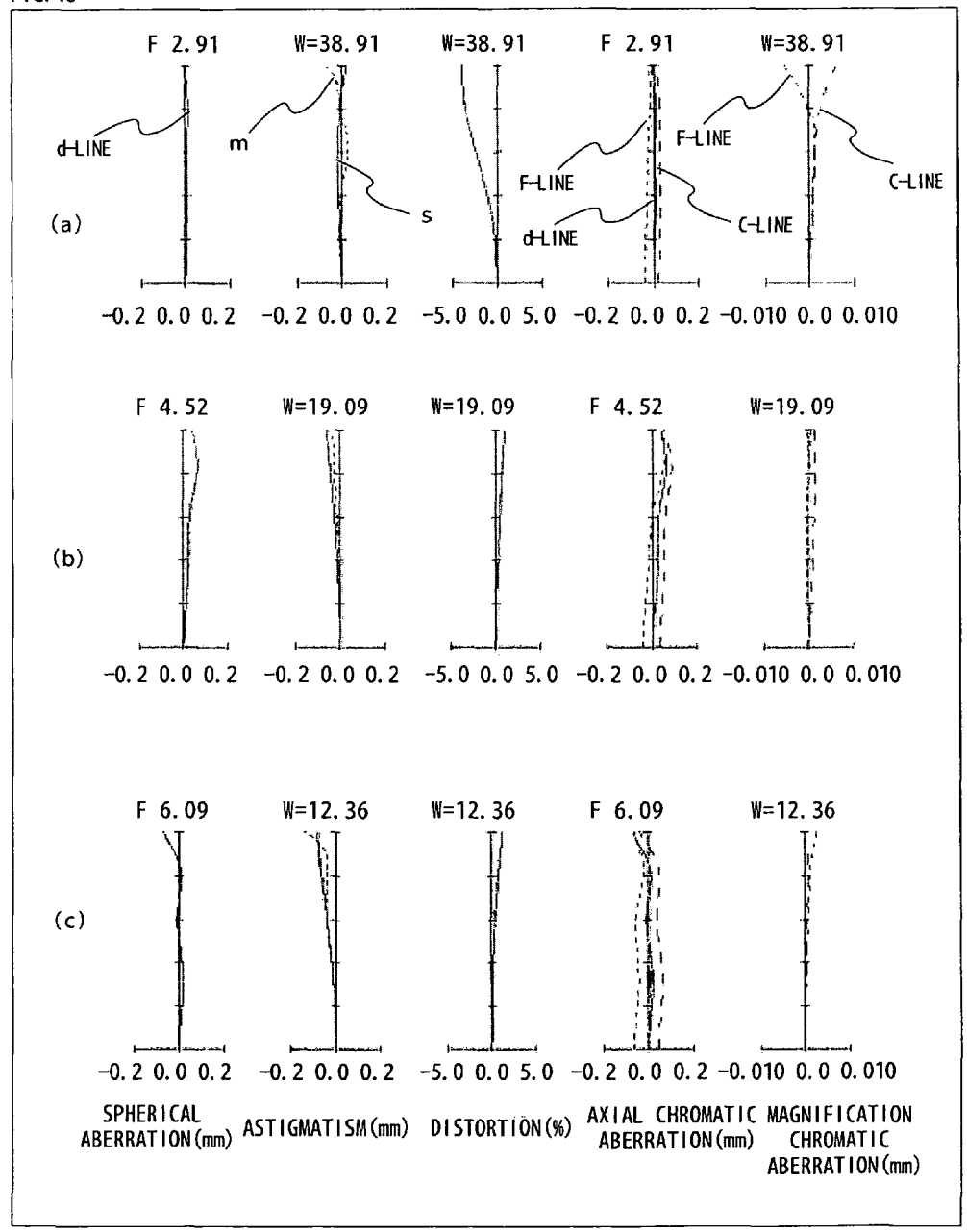
FIG. 18 is a longitudinal aberration diagram of a zoom lens system according to Example III-1.
Figure 20:
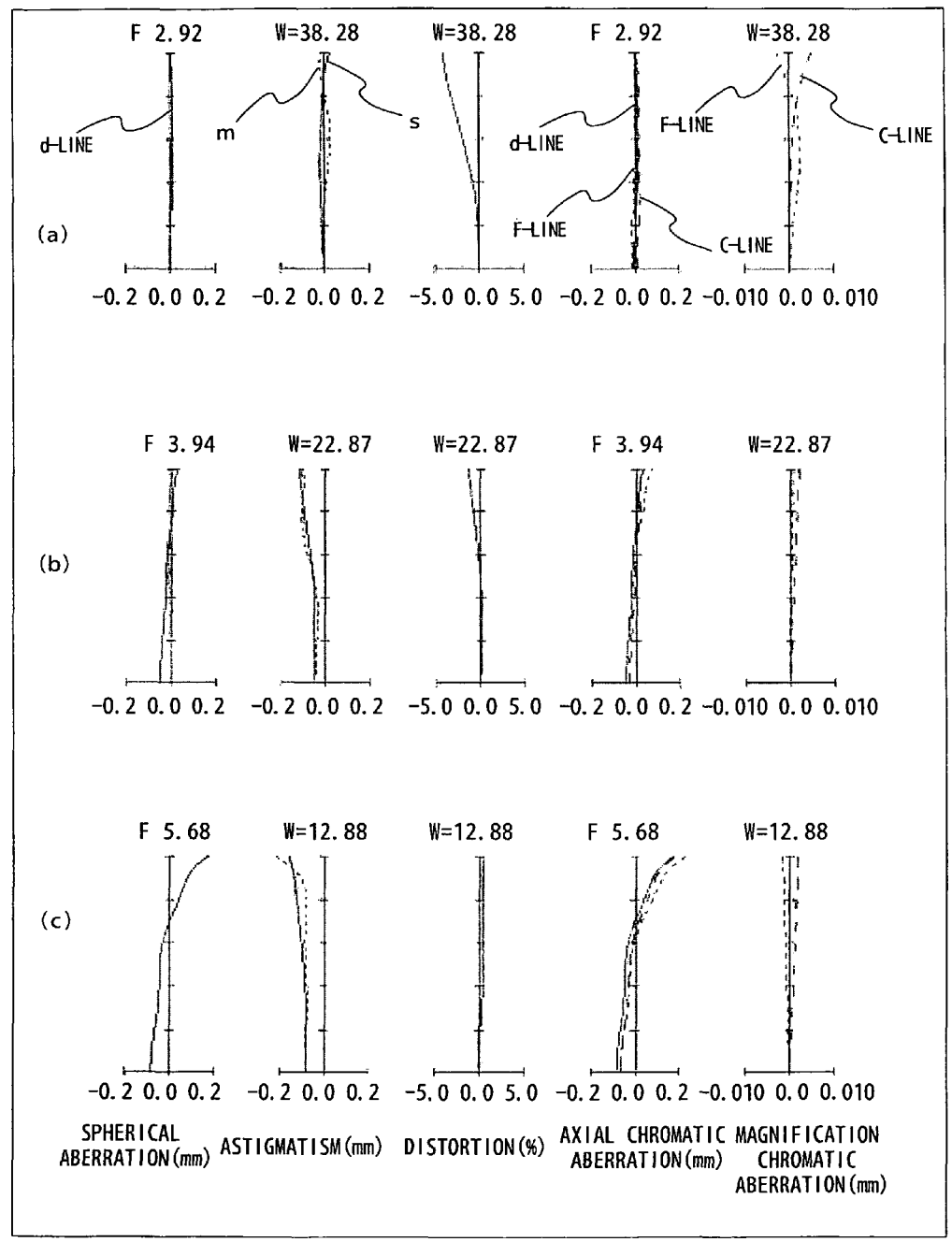
FIG. 20 is a longitudinal aberration diagram of a zoom lens system according to Example III-2.
Figure 22:
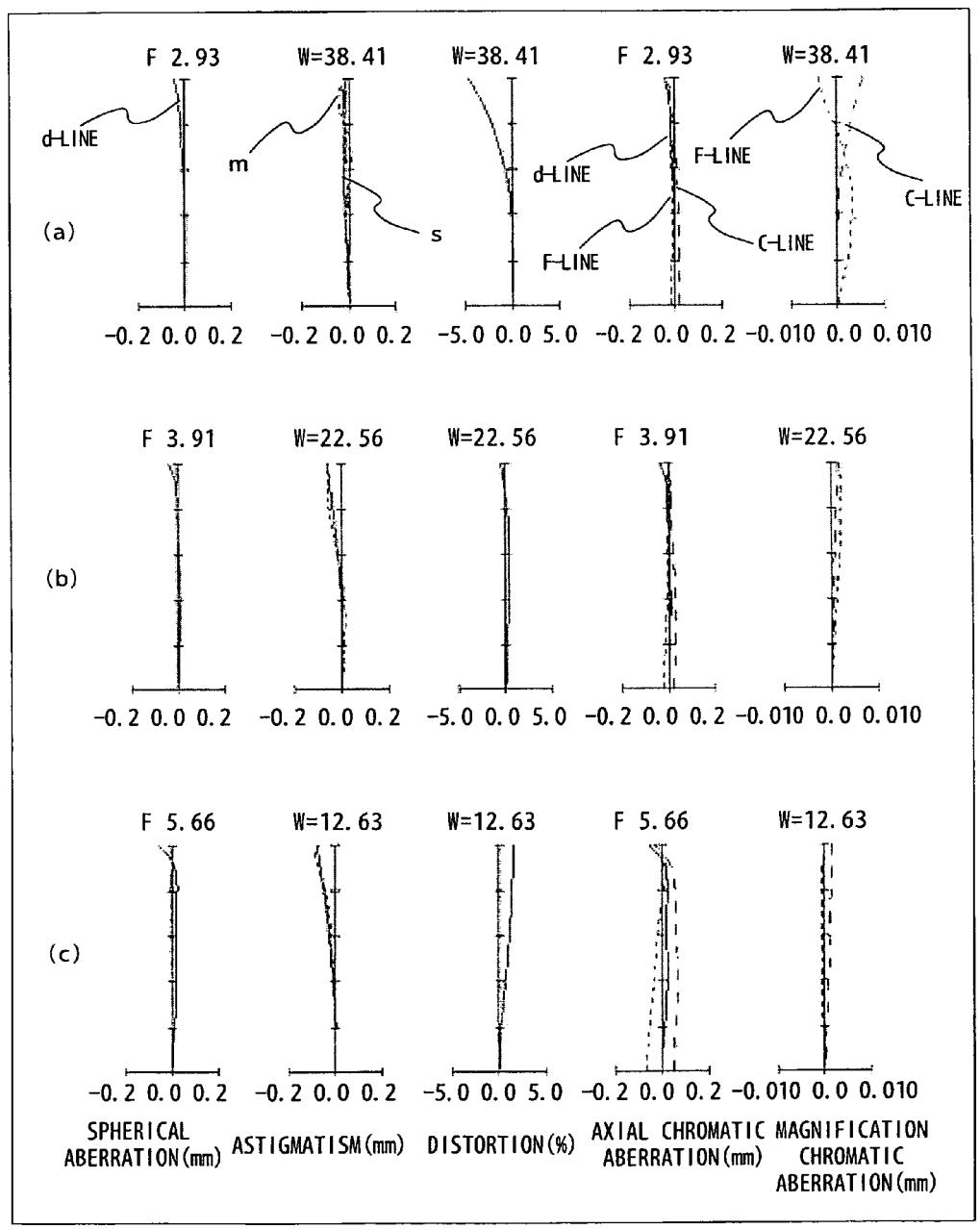
FIG. 22 is a longitudinal aberration diagram of a zoom lens system according to Example III-3.
Figure 24:
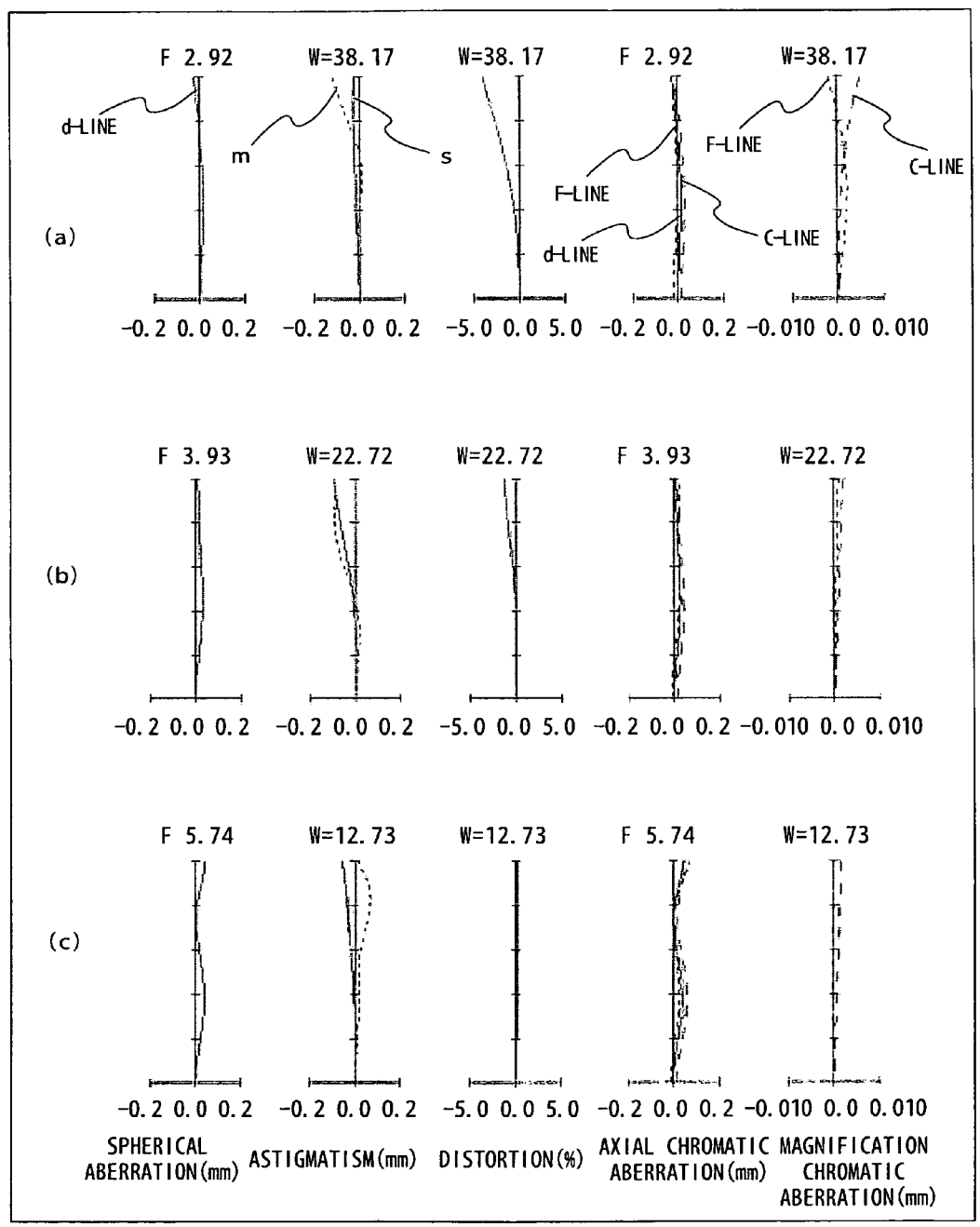
FIG. 24 is a longitudinal aberration diagram of a zoom lens system according to Example III-4.

FIG. 18 is a longitudinal aberration diagram of the zoom lens system according to Example III-1. FIG. 20 is a longitudinal aberration diagram of the zoom lens system according to Example III-2. FIG. 22 is a longitudinal aberration diagram of the zoom lens system according to Example III-3. FIG. 24 is a longitudinal aberration diagram of the zoom lens system according to Example III-4.

In each longitudinal aberration diagram, part (a) shows the aberration at a wide-angle limit, part (b) shows the aberration at an approximately middle position, and part (c) shows the aberration at a telephoto limit. In each longitudinal aberration diagram, in order starting from the left-hand side, the spherical aberration, the astigmatism, the distortion, the axial chromatic aberration and the magnification chromatic aberration are shown. In each spherical aberration diagram, the vertical

TABLE III-12

| Surface | K | A | B | C | D | E | F |
|---|---|---|---|---|---|---|---|
| 2 | −1.50000E+00 | 9.45283E−04 | −4.13637E−05 | 1.60905E−06 | −1.04194E−08 | −8.41442E−10 | 1.47350E−11 |
| 3 | 0.00000E+00 | 2.34229E−04 | −2.45453E−05 | 1.07278E−06 | −1.18237E−08 | −3.61655E−10 | 7.45807E−12 |
| 6 | 0.00000E+00 | −6.50053E−04 | 6.34626E−05 | −3.72453E−05 | 1.05395E−05 | −1.61108E−06 | 1.01352E−07 |
| 11 | 0.00000E+00 | −6.34185E−05 | 1.88100E−04 | −6.38471E−05 | 8.37486E−06 | | |
| 13 | 0.00000E+00 | 1.28204E−04 | −3.01444E−05 | 1.04004E−06 | | | |
| 14 | 0.00000E+00 | 4.95301E−04 | −9.37727E−05 | 7.62691E−06 | −3.31231E−07 | 6.39178E−09 | | axis indicates the F-number, and the solid line indicates the characteristics to the d-line. In each astigmatism diagram, the vertical axis indicates the half view angle w, and the solid line and the dash line indicate the characteristics to the sagittal image plane (in each Fig., indicated as "s") and the meridional image plane (in each Fig., indicated as "m"), respectively. In each distortion diagram, the vertical axis indicates the half view angle ω. In each axial chromatic aberration diagram, the vertical axis indicates the F-number, and the solid line, the short dash line and the long dash line indicate the characteristics to the d-line, the F-line and the C-line, respectively. In each magnification chromatic aberration diagram, the vertical axis indicates the half view angle w, and the short dash line and the long dash line indicate the characteristics to the F-line and the C-line, respectively.

As seen from the longitudinal aberration diagrams of FIGS. 2, 4, 6 and 8, the zoom lens systems of Examples I-1 to I-4 have sufficient aberration compensation capability for achieving a high resolution.

As seen from the longitudinal aberration diagrams of FIGS. 10, 12, 14 and 16, the zoom lens systems of Examples II-1 to II-4 have sufficient aberration compensation capability for achieving a high resolution.

As seen from the longitudinal aberration diagrams of FIGS. 18, 20, 22 and 24, the zoom lens systems of Examples III-1 to III-4 have sufficient aberration compensation capability for achieving a high resolution.

The zoom lens system according to the present invention is applicable to a camera such as a digital still camera, a digital video camera, a mobile telephone, a PDA (Personal Digital Assistance), a surveillance camera in a surveillance system, a Web camera and a vehicle-mounted camera. In particular, the present zoom lens system is suitable for a thin camera such as a digital still camera and a digital video camera requiring high image quality.

Details of the present invention have been described above. However, the above-mentioned description is completely illustrative from every point of view, and does not limit the scope of the present invention. Obviously, various improvements and modifications can be performed without departing from the scope of the present invention.

What is claimed is:

1. A zoom lens system that forms an optical image of an object with variable magnification of a factor of 3 or greater, the zoom lens system,
in order from an object side to an image side, comprising:
a first lens unit having negative optical power;
a second lens unit having positive optical power; and
a third lens unit having positive optical power, wherein
in zooming from a wide-angle limit to a telephoto limit, the lens units move respectively along an optical axis in such a manner that an interval between the first lens unit and the second lens unit should decrease while an interval between the second lens unit and the third lens unit should vary so that the variable magnification is achieved,
the first lens unit is composed of one object side lens element and one image side lens element,
in the first lens unit, the object side lens element has negative optical power while the image side lens element has positive optical power, and
the following conditions are satisfied:

$$1.5 < f_2/f_w < 2.8 \quad \text{(III-1)},$$

$$\omega_w > 36,$$

where,
$f_2$ is a composite focal length of the second lens unit,
$f_w$ is a focal length of the entire system at a wide-angle limit, and
$\omega_w$ is a half view angle at a wide-angle limit.

2. The zoom lens system as claimed in claim 1, wherein the following conditions (III-2), (III-3), (III-4), (III-5) and (III-6) are satisfied:

$$n12 > 1.91 \quad \text{(III-2)},$$

$$v12 < 29 \quad \text{(III-3)},$$

$$n11 > 1.50 \quad \text{(III-4)},$$

$$v11 > 35 \quad \text{(III-5), and}$$

$$n12 - n11 > 0.10 \quad \text{(III-6)},$$

where,
n12 is a refractive index of the image side lens element of the first lens unit,
v12 is an Abbe number of the image side lens element of the first lens unit,
n11 is a refractive index of the object side lens element of the first lens unit, and
v11 is an Abbe number of the object side lens element of the first lens unit.

3. The zoom lens system as claimed in claim 1, wherein the following condition (III-7) is satisfied:

$$T1/d12 > 2.0 \quad \text{(III-7)},$$

where,
T1 is a center thickness of the first lens unit, and
d12 is a center interval between the object side lens element and the image side lens element of the first lens unit.

4. The zoom lens system as claimed in claim 1, wherein the following condition (III-8) is satisfied:

$$T2/Y > 0.8 \quad \text{(III-8)},$$

where,
T2 is a center thickness of the second lens unit,
Y is a maximum image height of the zoom lens system, is represented by $Y = f_T \times \tan(\omega_T)$,
$f_T$ is a focal length of the entire system at a telephoto limit, and
$\omega_T$ is a half view angle at a telephoto limit.

5. The zoom lens system as claimed in claim 1, wherein the third lens unit is composed of one lens element.

6. The zoom lens system as claimed in claim 1, wherein the object side surface of the most object side lens element that constitutes the second lens unit is aspheric, and wherein the second lens unit, in order from the object side to the image side, comprises one set of positive cemented lens element and one positive lens element, or alternatively comprises one positive lens element, one set of cemented lens element, and one positive lens element, or alternatively comprises two sets of positive cemented lens elements.

7. An imaging device for converting an optical image of a photographic object into an electric image signal and then outputting the signal, the imaging device comprising:
a zoom lens system that forms the optical image of the photographic object with variable magnification of a factor of 3 or greater; and
an image sensor that converts the optical image formed by the zoom lens system into the electric image signal, wherein:
the zoom lens system, in order from an object side which is the photographic object side to an image side, comprises:
a first lens unit having negative optical power;
a second lens unit having positive optical power; and
a third lens unit having positive optical power,
in zooming from a wide-angle limit to a telephoto limit, the first, second and third lens units move respectively along an optical axis in such a manner that an interval between the first lens unit and the second lens unit decreases while an interval between the second lens unit and the third lens unit varies so that the variable magnification is achieved, the first lens unit is composed of one object side lens element and one image side lens element, in the first lens unit, the object side lens element has negative optical power while the image side lens element has positive optical power, and the following conditions are satisfied:

$$1.5 < f_2/f_w < 2.8 \quad \text{(III-1), and}$$

$$\omega_w > 36,$$

where, $f_2$ is a composite focal length of the second lens unit, $f_w$ is a focal length of the entire system at a wide-angle limit, and $\omega_w$ is a half view angle at a wide-angle limit.

8. A camera for shooting a photographic object and then outputting its image as an electric image signal, the camera comprising an imaging device including a zoom lens system that forms the optical image of the photographic object with variable magnification of a factor of 3 or greater and an image sensor that converts the optical image of the photographic object formed by the zoom lens system into the electric image signal, wherein:

the zoom lens system, in order from an object side which is the photographic object side to an image side, comprises:

a first lens unit having negative optical power;

a second lens unit having positive optical power; and a third lens unit having positive optical power, in zooming from a wide-angle limit to a telephoto limit, the first, second and third lens units move respectively along an optical axis in such a manner that an interval between the first lens unit and the second lens unit decreases while an interval between the second lens unit and the third lens unit varies so that the variable magnification is achieved, the first lens unit is composed of one object side lens element and one image side lens element, in the first lens unit, the object side lens element has negative optical power while the image side lens element has positive optical power, and the following conditions are satisfied:

$$1.5 < f_2/f_w < 2.8 \quad \text{(III-1), and}$$

$$\omega_w > 36,$$

where, $f_2$ is a composite focal length of the second lens unit, $f_w$ is a focal length of the entire system at a wide-angle limit, and $\omega_w$ is a half view angle at a wide-angle limit.

* * * * *

UNITED STATES PATENT AND TRADEMARK OFFICE
CERTIFICATE OF CORRECTION

PATENT NO. : 8,179,611 B2
APPLICATION NO. : 12/581561
DATED : May 15, 2012
INVENTOR(S) : Tomoko Iiyama et al.

It is certified that error appears in the above-identified patent and that said Letters Patent is hereby corrected as shown below:

In the Claims:

At column 48, claim number 4, line 29 it currently reads

"The zoom lens system as claimed in claim 1, wherein the following condition (III-8) is satisfied:

$T2/Y > 0.8$ ••• (III-8), where,

T2 is a center thickness of the second lens unit,

Y is a maximum image height of the zoom lens system, is represented by $Y = f_T \times \tan(\omega_T)$, $f_T$ is a focal length of the entire system at a telephoto limit, and $\omega_T$ is a half view angle at a telephoto limit.", but it should read,

--The zoom lens system as claimed in claim 1, wherein the following condition (III-8) is satisfied:

$T2/Y > 0.8$ ••• (III-8), where,

T2 is a center thickness of the second lens unit,

Y is a maximum image height of the zoom lens system, <u>which</u> is represented by $Y = f_T \times \tan(\omega_T)$, $f_T$ is a focal length of the entire system at a telephoto limit, and $\omega_T$ is a half view angle at a telephoto limit.--

Signed and Sealed this
Eighteenth Day of December, 2012

David J. Kappos
*Director of the United States Patent and Trademark Office*